(12) United States Patent
Ryan et al.

(10) Patent No.: US 12,468,951 B2
(45) Date of Patent: Nov. 11, 2025

(54) UNSUPERVISED OUTLIER DETECTION IN TIME-SERIES DATA

(71) Applicant: Ciena Corporation, Hanover, MD (US)

(72) Inventors: Sid Ryan, Montreal (CA); Petar Djukic, Nepean (CA); Todd Morris, Stittsville (CA)

(73) Assignee: Ciena Corporation, Hanover, MD (US)

( * ) Notice: Subject to any disclaimer, the term of this patent is extended or adjusted under 35 U.S.C. 154(b) by 1307 days.

(21) Appl. No.: 16/540,414

(22) Filed: Aug. 14, 2019

(65) Prior Publication Data

US 2020/0387797 A1 Dec. 10, 2020
US 2021/0089927 A9 Mar. 25, 2021

Related U.S. Application Data

(63) Continuation-in-part of application No. 16/430,808, filed on Jun. 4, 2019, now Pat. No. 11,620,528.

(60) Provisional application No. 62/683,889, filed on Jun. 12, 2018.

(51) Int. Cl.
*G06N 3/088* (2023.01)
*G06N 3/045* (2023.01)
*G06N 3/047* (2023.01)

(52) U.S. Cl.
CPC ............ *G06N 3/088* (2013.01); *G06N 3/045* (2023.01); *G06N 3/047* (2023.01)

(58) Field of Classification Search
CPC ........ G06N 3/088; G06N 3/045; G06N 3/047; G06N 3/084; G06F 11/0754; G06F 11/3006; G06F 11/3013; G06F 11/3058; G06F 11/3409; G06F 11/3447; G06F 2201/835; G06F 17/18
See application file for complete search history.

(56) References Cited

U.S. PATENT DOCUMENTS

| | | | |
|---|---|---|---|
| 8,887,217 B2 | 11/2014 | Salem et al. | |
| 9,819,565 B2 | 11/2017 | Djukic et al. | |
| 9,838,271 B2 | 12/2017 | Djukic et al. | |
| 10,015,057 B2 | 7/2018 | Djukic et al. | |

(Continued)

OTHER PUBLICATIONS

Li ("Anomaly Detection with Generative Adversarial Networks for Multivariate Time Series") arXiv:1809.04758v3 [cs.LG] Jan. 15, 2019 (Year: 2019).*

(Continued)

*Primary Examiner* — Shahid K Khan
*Assistant Examiner* — Su-Ting Chuang
(74) *Attorney, Agent, or Firm* — Clements Bernard Walker; Christopher L. Bernard; Devin Cummins

(57) ABSTRACT

Systems and methods for detecting patterns in data from a time-series and for detecting outliers in network data in an unsupervised manner are provided. In one implementation, a method includes the steps of obtaining network data from a network to be monitored and creating a window from the obtained network data. The method also includes the step of detecting outliers of the obtained data with respect to the window using an unsupervised deep learning process (e.g., using a Generalized Adversarial Network (GAN) learning technique and/or a Bidirectional GAN (BiGAN) learning technique) for enabling the learning of a data distribution. The unsupervised process, for example, does not require manual intervention.

13 Claims, 42 Drawing Sheets

(56) References Cited

U.S. PATENT DOCUMENTS

| | | |
|---|---|---|
| 10,270,564 B2 | 4/2019 | Djukic et al. |
| 2016/0112327 A1 | 4/2016 | Morris et al. |
| 2017/0230267 A1 | 8/2017 | Armolavicius et al. |
| 2019/0230046 A1 | 7/2019 | Djukic et al. |

OTHER PUBLICATIONS

Hsu ("Unsupervised Learning via Meta-Learning") arXiv:1810.02334v6 [cs.LG] Mar. 21, 2019 (Year: 2019).*

Frid-Adar ("GAN-based synthetic medical image augmentation for increased CNN performance in liver lesion classification") Neurocomputing vol. 321, Dec. 10, 2018, pp. 321-331 (Year: 2018).*

Donahue ("Adversarial Feature Learning") arXiv:1605.09782v7 [cs.LG] Apr. 3, 2017 (Year: 2017).*

Yang ("A Novel Concept Drift Detection Method for Incremental Learning in Nonstationary Environments") IEEE Transactions on Neural Networks and Learning Systems, vol. 31 Date of publication Mar. 26, 2019 (Year: 2019).*

Li2 ("Trend Modeling for Traffic Time Series Analysis: An Integrated Study") IEEE Transactions on Intelligent Transportation Systems ( vol. 16, Issue: 6, Dec. 2015) (Year: 2015).*

Zhou ("Ensemble-Based Algorithm for Synchrophasor Data Anomaly Detection") IEEE Transactions on Smart Grid, vol. 10, No. 3, May 2019 2979 (Year: 2019).*

Ren ("Time-Series Anomaly Detection Service at Microsoft") KDD '19: Proceedings of the 25th ACM SIGKDD International Conference on Knowledge Discovery & Data Mining Jul. 2019 (Year: 2019).*

Deepika ("A meta-learning framework using representation learning to predict drug-drug interaction") Journal of Biomedical Informatics 84 (2018) 136-147 (Year: 2018).*

Rattadilok ("Self-learning data processing framework based on computational intelligence enhancing autonomous control by machine intelligence") 2014 IEEE Symposium on Evolving and Autonomous Learning Systems (EALS) (Year: 2014).*

George ("Glitch Classification and Clustering for LIGO with Deep Transfer Learning") arXiv:1711.07468v2 [astro-ph.IM] Dec. 11, 2017 (Year: 2017).*

Pan ("Domain Adaptation via Transfer Component Analysis") IEEE Transactions on Neural Networks, vol. 22, No. 2, Feb. 2011 (Year: 2011).*

Rubin ("Recognizing Abnormal Heart Sounds Using Deep Learning") abnorarXiv: 1707.04642v2 [cs.SD] Oct. 19, 2017 (Year: 2017).*

Cao ("Voila: Visual Anomaly Detection and Monitoring with Streaming Spatiotemporal Data") IEEE Transactions on Visualization and Computer Graphics, Date of publication Aug. 28, 2017; date of current version Oct. 1, 2017 (Year: 2017).*

Feng ("Deep Representation for Abnormal Event Detection in Crowded Scenes") MM '16, Oct. 15-19, 2016, Amsterdam, Netherlands (Year: 2016).*

Chen ("InfoGAN: Interpretable Representation Learning by Information Maximizing Generative Adversarial Nets") arXiv:1606.03657v1 [cs.LG] Jun. 12, 2016 (Year: 2016).*

Das ("Spatio-temporal anomaly detection") The Ohio State University 2009 (Year: 2009).*

Liu ("Generative Adversarial Active Learning for Unsupervised Outlier Detection") IEEE Transactions on Knowledge and Data Engineering, vol. 32, No. 8, Aug. 2020 Date of publication Mar. 18, 2019 (Year: 2019).*

Kyle Hsu et al., Unsupervised Learning Via Meta-Learning, arXiv:1810.02334v6 [cs.LG] Mar. 21, 2019, Published as a conference paper at ICLR 2019, pp. 1-24.

Shaoqing Ren et al., Faster R-CNN: Towards Real-Time Object Detection with Region Proposal Networks, Microsoft Research, pp. 1-9.

Kaiming He et al., Mask R-CNN, Facebook AI Research (FAIR), 2017, pp. 2961-2969.

Douglas Charlton et al., Field measurements of SOP transients in OPGW, with time and location correlation to lightning strikes, Research Article vol. 25, No. 9 | May 1, 2017 | Optics Express 9689, pp. 1-8.

* cited by examiner

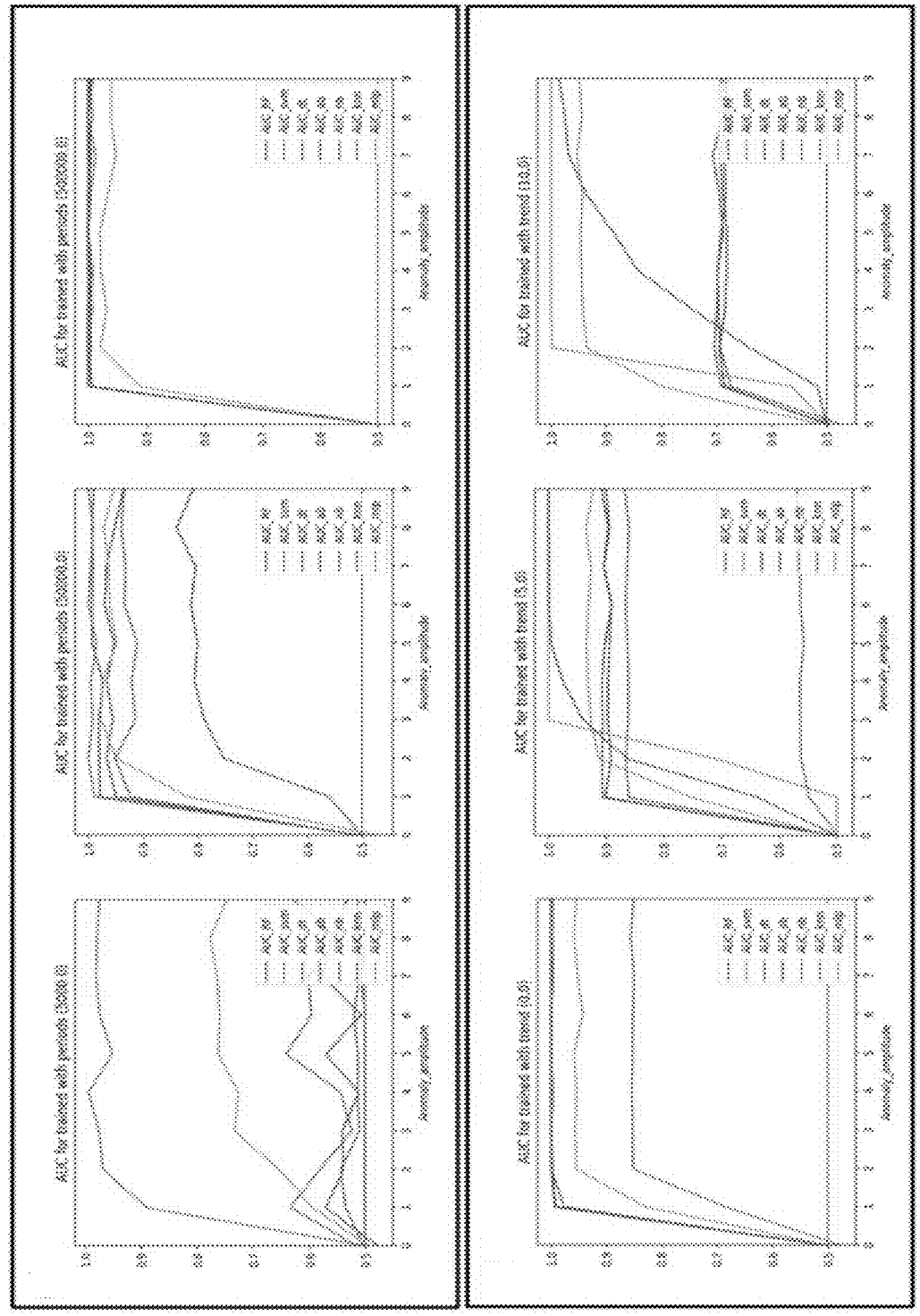

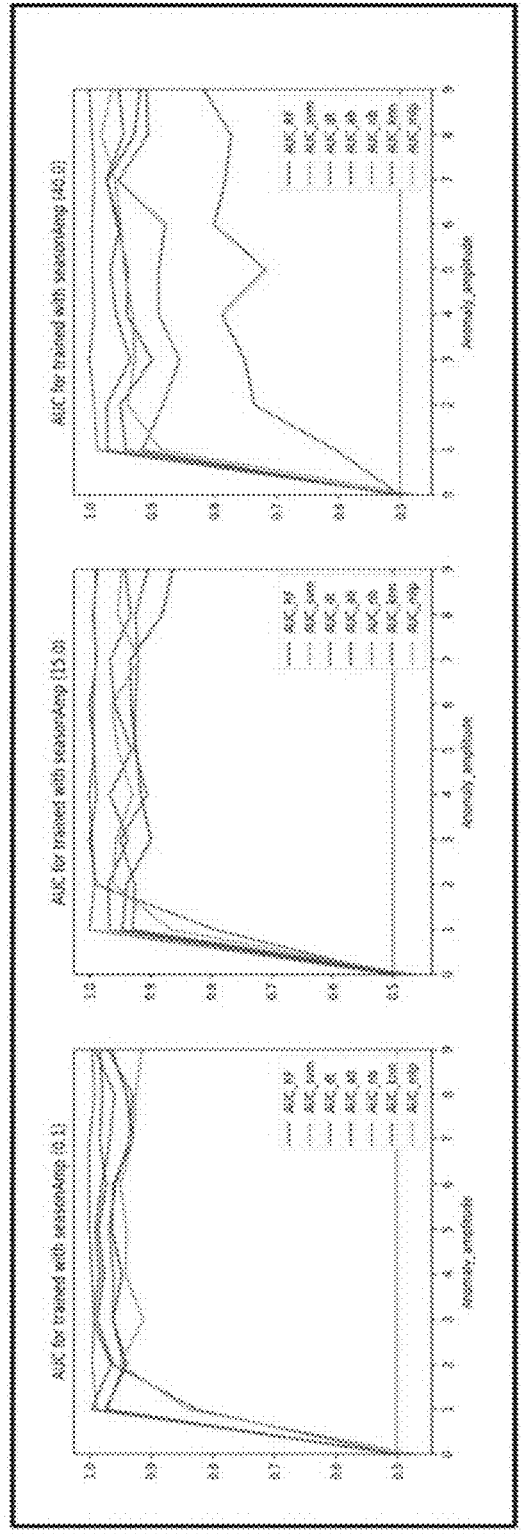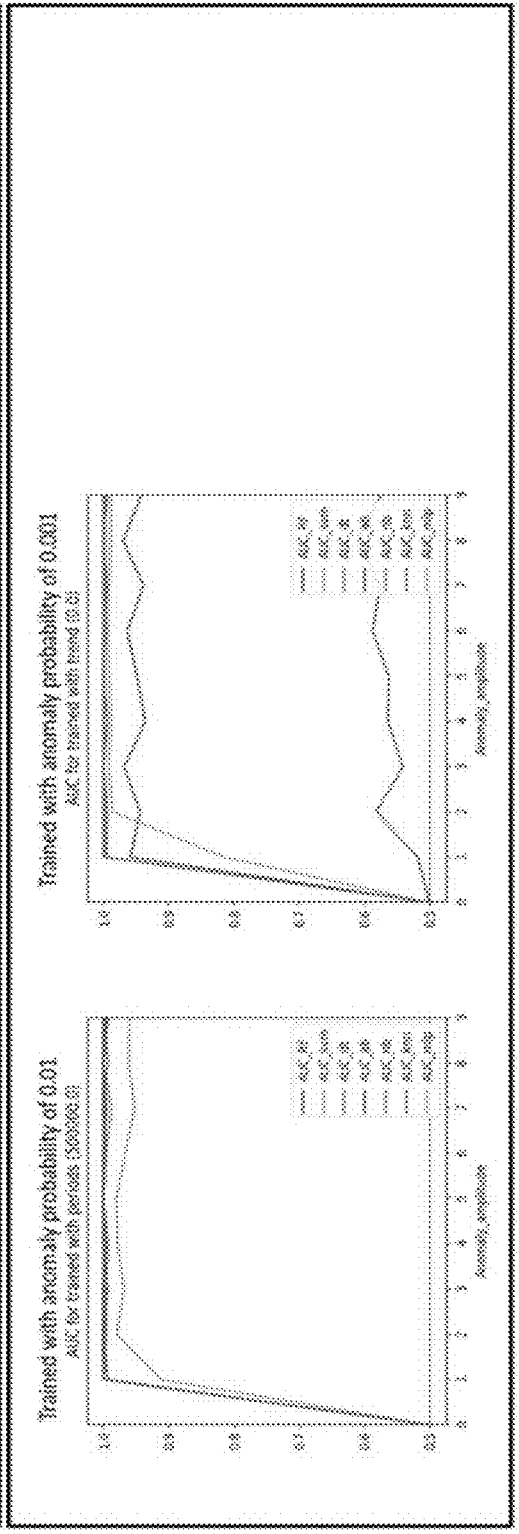
FIG. 17C
FIG. 17D

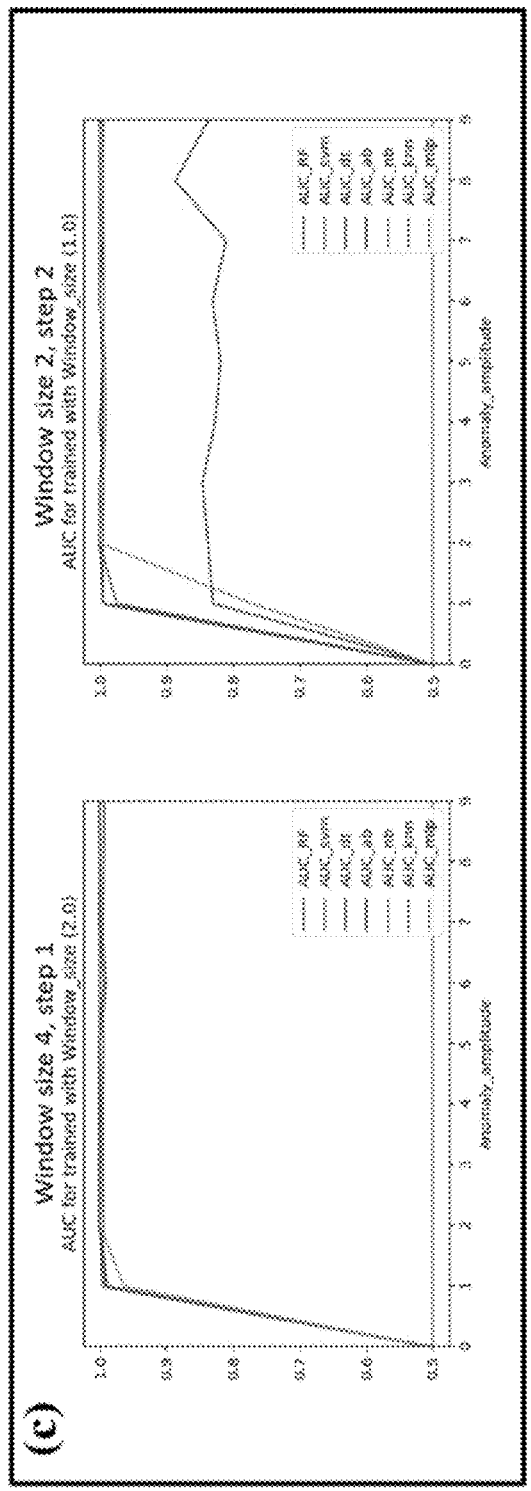
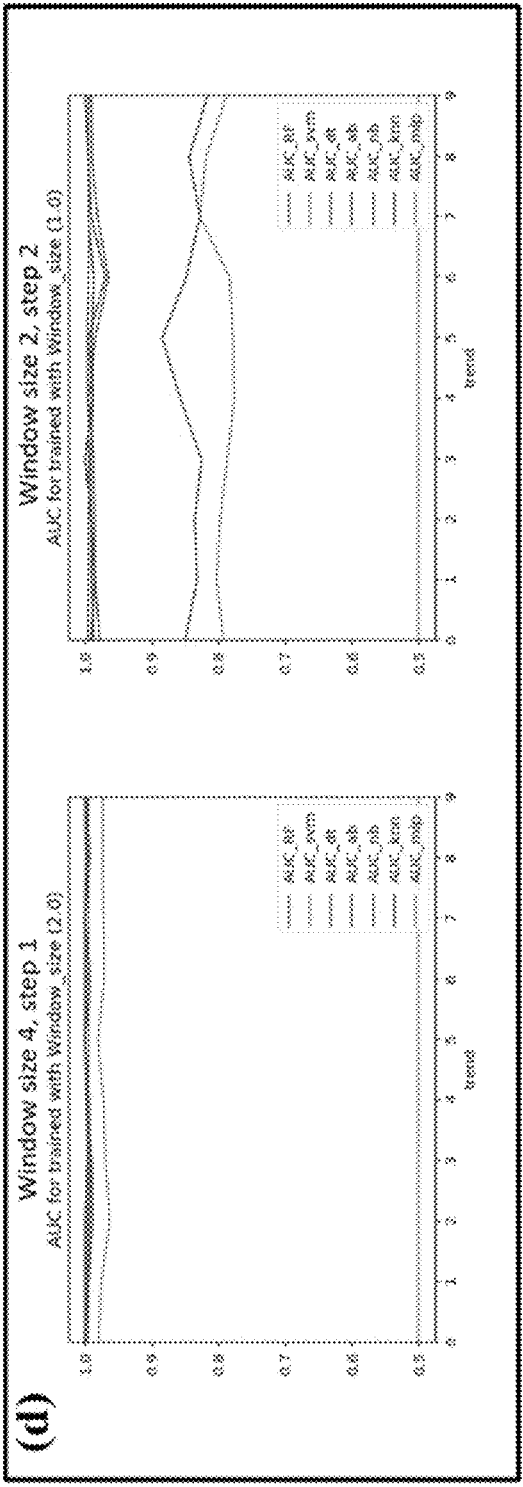
FIG. 18C
FIG. 18D

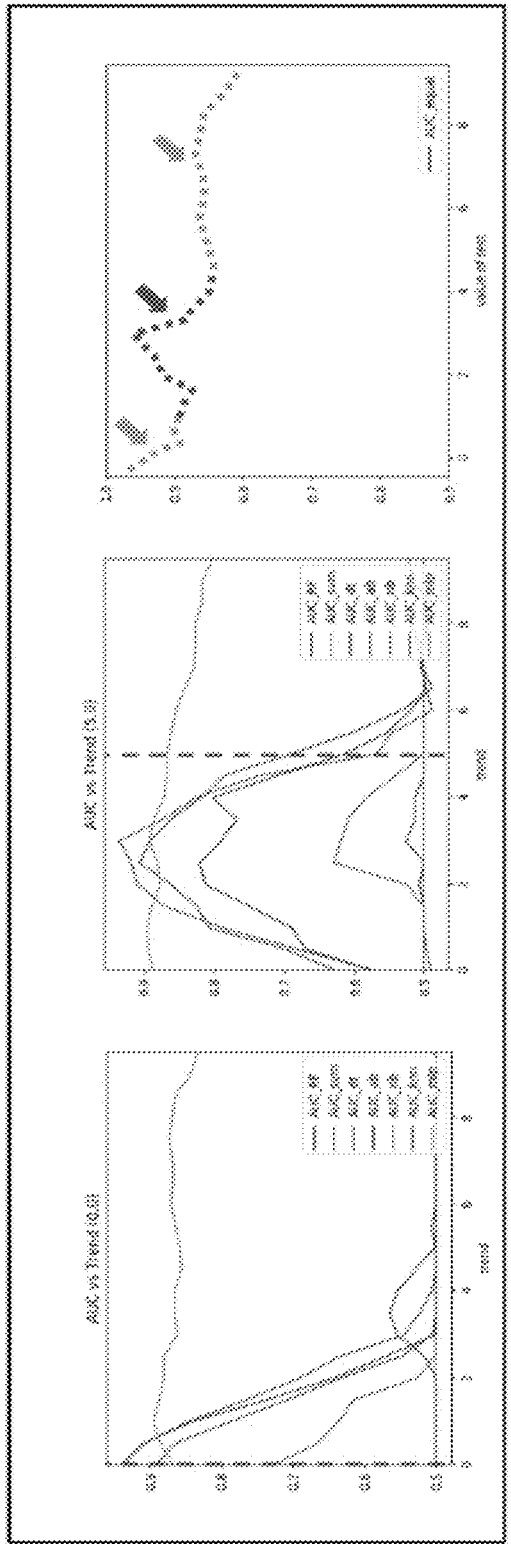
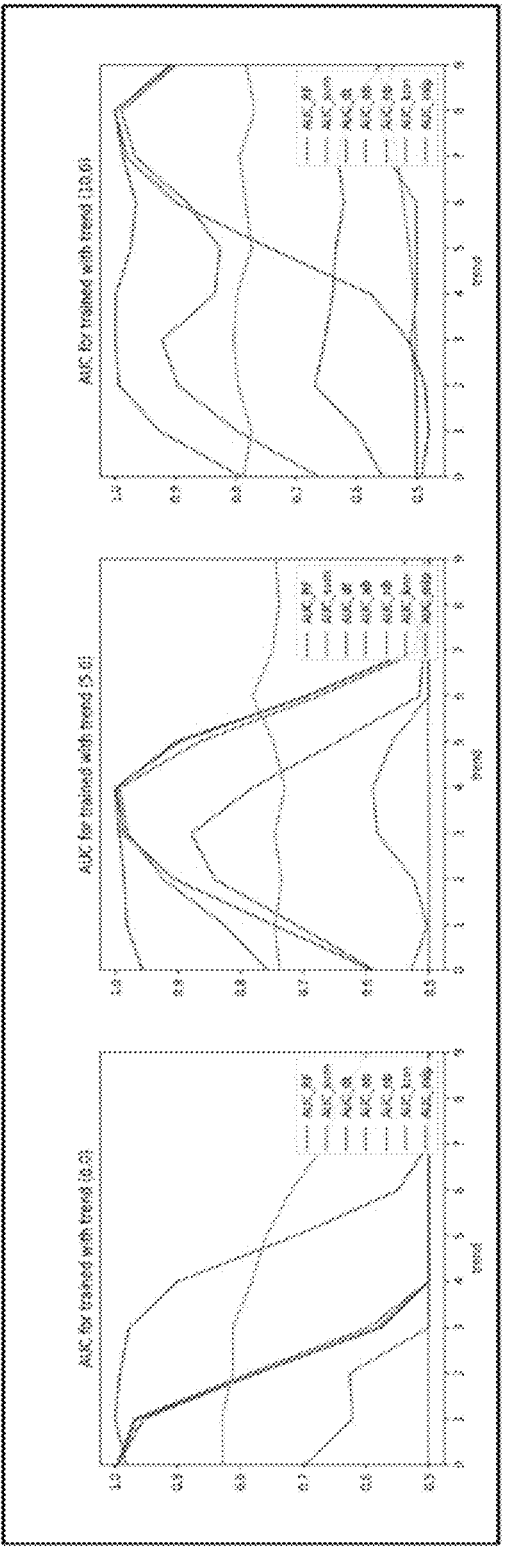
FIG. 19A
FIG. 19B

UNSUPERVISED OUTLIER DETECTION IN TIME-SERIES DATA

CROSS-REFERENCE TO RELATED APPLICATION(S)

The present application is a continuation-in-part of U.S. patent application Ser. No. 16/430,808, filed Jun. 4, 2019, and entitled "Pattern detection in time-series data," the contents of which are incorporated by reference.

FIELD OF THE DISCLOSURE

The present disclosure generally relates to performance monitoring. More particularly, the present disclosure relates to systems and methods for performing unsupervised outlier detection in time-series data, such as network time-series data.

BACKGROUND OF THE DISCLOSURE

Conventionally, performance monitoring, problem detection, and root cause analysis are performed in a manual fashion after a failure has occurred. This approach is taken across various application areas, such as manufacturing, vehicle maintenance, airplane maintenance, healthcare, building maintenance, road and other infrastructure maintenance. This manual approach is very expensive, time-consuming and requires a human expert with the knowledge of the given system to debug the problem after the failure. At the same time, the number of monitors is increasing, as the Internet of Things (IoT) is now connecting things to the network, which would not conventionally be connected or monitored. The manual approach to performance monitoring with the failure and debug cycle is not feasible. At the same time, it would be desirable to decrease the cost even in current manual approaches by introducing machine learning methodologies for pattern detection to enable new approaches to detecting and forecasting faults before they occur and to find patterns in time-series that can be used to pin point the causes of failures.

As an example, network performance monitoring is described, but the approaches provided here can be applied to any of the areas mentioned above. Conventionally, problem detection (i.e., anomaly detection) in networks is implemented after a failure has occurred. Specifically, following a failure in a network, an operator or technician would log into the system, perform a manual investigation, and provide remediation. Of course, this approach is reactive and typically involves a traffic hit, traffic loss, protection switching, etc., followed by network maintenance. Another approach to anomaly detection is to re-implement the failure scenario via a piece of software that can run and analyze the scenario in an offline manner. For a handful of Performance Monitoring (PM) metrics relating to the problem, alarms would be raised if any given PM crosses some pre-defined threshold. This is typically achieved using a rule-based engine with hard-coded "if . . . then . . . else . . . " statements specified by a human expert.

Disadvantageously, with these conventional approaches, the reaction time is slow, engineering time is expensive, and experts are rare. Also, this approach only finds known failures that are also easy to specify. The approach presumes that the human expert is able to articulate the specific reason for a network failure and that this network failure happens due to the threshold crossing at one point. The approaches cannot and are not used to finding failures that span multiple network elements, links, etc. Further, these approaches do not scale with large and complex networks. Also, these conventional approaches require a lot of expertise, work, and time to implement. Further, defining and updating complex "if . . . then . . . else . . . " rules is complicated and time-consuming, and there is limited accuracy if limited to simple rules, such as one-dimensional thresholding.

Conventional approaches using PM metrics focused on trends from individual PM metrics, such as simple linear fits and relying on subject matter experts to interpret the values of the trends. Of course, these conventional approaches do not use all available information, result in lower accuracy, and require expertise to interpret trend values.

Current approaches in pattern detection are limited to finding objects in images, recognizing letters, speech-to-text conversion, text or speech translation, etc. Pattern recognition in audio has some similarities to network applications, but these approaches only ever use Recurrent Neural Networks (RNNs). The vast majority of currently published network anomaly detection algorithms are not based on machine learning. Typically, these approaches use Principal Component Analysis (PCA), or its derivatives, to find outliers in multi-dimensional data. As shown by a large body of previous literature, this approach does not work with typical time-series data since the data is not stationary and the distribution at each time sample is not normally distributed.

To detect outlier data, supervised and unsupervised methods can be used. A supervised method is one in which data sets are manually labelled. In other words, an expert in the field of network management would go through network traces and network logs. From the traces and logs, the expert would then need to label the times when the outliers (e.g., network anomalies) have occurred.

As opposed to a supervised method, an unsupervised method for detecting outlier data does not require the involvement of a network expert. There are generally two ways to detect outliers using unsupervised learning. The first way includes model-based dimensionality reduction based on a well-understood statistical model. One example would be using PCA, or an autoencoder, to detect anomalies. The second way includes model-based distribution modelling, where the parameters of a distribution are learned during training. One example of this second technique uses Kernel Density Estimation (KDE) to model the distribution as a multi-variate normal distribution.

Existing unsupervised methods have low outlier detection performance due to their low capacity. For example, considering KDE, which assumes that the underlying network data is Gaussian in nature, its capacity to generalize is limited by this assumption, which is not true in practice. Also, existing unsupervised methods are susceptible to decreased performance during periods of concept drift when the network data is changing.

Therefore, there is a need for an unsupervised method that is capable of effectively detecting outliers or network anomalies. Unsupervised methods capable of providing improved performance with respect to existing methods would also be desirable in the field of network monitoring.

BRIEF SUMMARY OF THE DISCLOSURE

The present disclosure explores new problem areas for machine learning. The typical use cases in networking include forecasting threshold crossing of Performance Monitoring (PM) data, forecasting alarms, forecasting Quality-of-Experience (QoE), anomaly detection, etc. Conventionally, these use cases are addressed with regression techniques. Regression techniques are the classical "forecasting" algorithms. Forecasting algorithms require a high touch approach where an expert in the use of these algorithms is able to choose the approach best suited for the forecasting, based on their observations about the time-series. Another problem with the regression approaches is their low capacity. Capacity is informally defined as the ability of the algorithm to fit a wide variety of functions. For example, linear regression has a low capacity as it cannot fit a highly varying time-series. Also, a higher order polynomial regression will typically overfit the time-series due to its low ability to generalize.

According to one implementation of the present disclosure, a method for pattern detection is provided. The method includes obtaining data in a time-series and creating one-dimensional or multi-dimensional windows from the time-series data. The one-dimensional or multi-dimensional windows are created either independently or jointly with the time-series. The method also includes training a Deep Neural Network (DNN) with the one-dimensional or multi-dimensional windows utilizing historical and/or simulated data to provide a neural network model. The method further includes processing ongoing data from a network with the neural network model to detect one or more patterns of a particular category in the ongoing data and localizing the one or more patterns in time.

According to another implementation, a non-transitory computer-readable medium configured to store a program executable by a processing system is provided. The program includes instructions to cause the processing system to obtain time-series data and create one-dimensional windows from the time-series data. The program also causes the processing system to train and optimize hyper-parameters of one or more machine learning algorithms with the one-dimensional windows obtained from historical data to create one or more machine learning models. Also, the program causes the processing system to determine an algorithm among the one or more machine learning algorithms with the best performance. The program further causes the processing system to utilize the machine learning model created from the algorithm determined to have the best performance to classify future windows as containing a pattern of a particular category and localize the pattern in time in ongoing data.

According to yet another implementation, a method comprises the steps of obtaining network data from a network to be monitored and creating a window from the obtained network data. The method also comprises the step of detecting outliers of the obtained data with respect to the window using an unsupervised learning process that learns data distribution, wherein the unsupervised process does not require human intervention.

Another implementation of the present disclosure includes a non-transitory computer-readable medium configured to store a program executable by a processing system. The program includes instructions configured to cause the processing system to obtain network data from a network to be monitored, create a window from the obtained network data, and detect outliers of the obtained data with respect to the window using an unsupervised learning process that learns data distribution. The unsupervised process does not require human intervention.

Still another implementation includes a system for detecting outliers of network data. The system comprises one or more processors and a memory in communication with the one or more processors. The memory is configured to store instructions for detecting outliers of network data. The instructions, when executed, cause the one or more processors to obtain network data from a network to be monitored, and create a window from the obtained network data. The instructions further cause the one or more processors to detect outliers of the obtained data with respect to the window using an unsupervised learning process including one or more of a Generalized Adversarial Network (GAN) learning technique and a Bidirectional GAN (BiGAN) learning technique, whereby the unsupervised process does not require human intervention.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 17A-D are graphs with a first-difference estimator applied: (a) the effect of the size of a dataset on performance of algorithms—the X-axis demonstrates the amplitude of anomalies (notice the higher performance of simpler algorithms when data is limited); (b) data with 0.0, 0.5 and 10.0 percent trend; (c) change of seasonality amplitude consequences 0.1, 15 and 40 multiplied to the original seasonality; and (d) the effect of probability of existence of anomaly (1% and 0.1%) in the data;

FIGS. 18A-D are graphs with the First-difference estimator applied: (a) comparison of Area Under the Curve (AUC) with using different window sizes, from left to right sizes 24, 48 and 96 used—the smaller sliding window sizes have higher performance; (b) the overlap sizes of sliding window effects on the AUC—the smaller strides result in higher AUC; (c) the comparison between window size and sliding steps when amplitude of anomalies are changing—higher overlap results a better performance than windows size; and (d) comparing effects of window size and overlap with various trends in the test-set;

FIGS. 19A-B are graphs of a comparison of the performance of machine learning algorithms on different trends with (a) 50000 samples of data 80 percent for training—the left plot belongs to model trained with no trend in training data and tested against different data with various trends—the middle plot trained with 5 percent trend in training data and tested with various percentage of trends in test datasets—and the right plot is the performance that can be obtained using meta-learning method; and (b) 500000 time stamps data used for training and test with similar portion;

DETAILED DESCRIPTION OF THE DISCLOSURE

Figure 1:
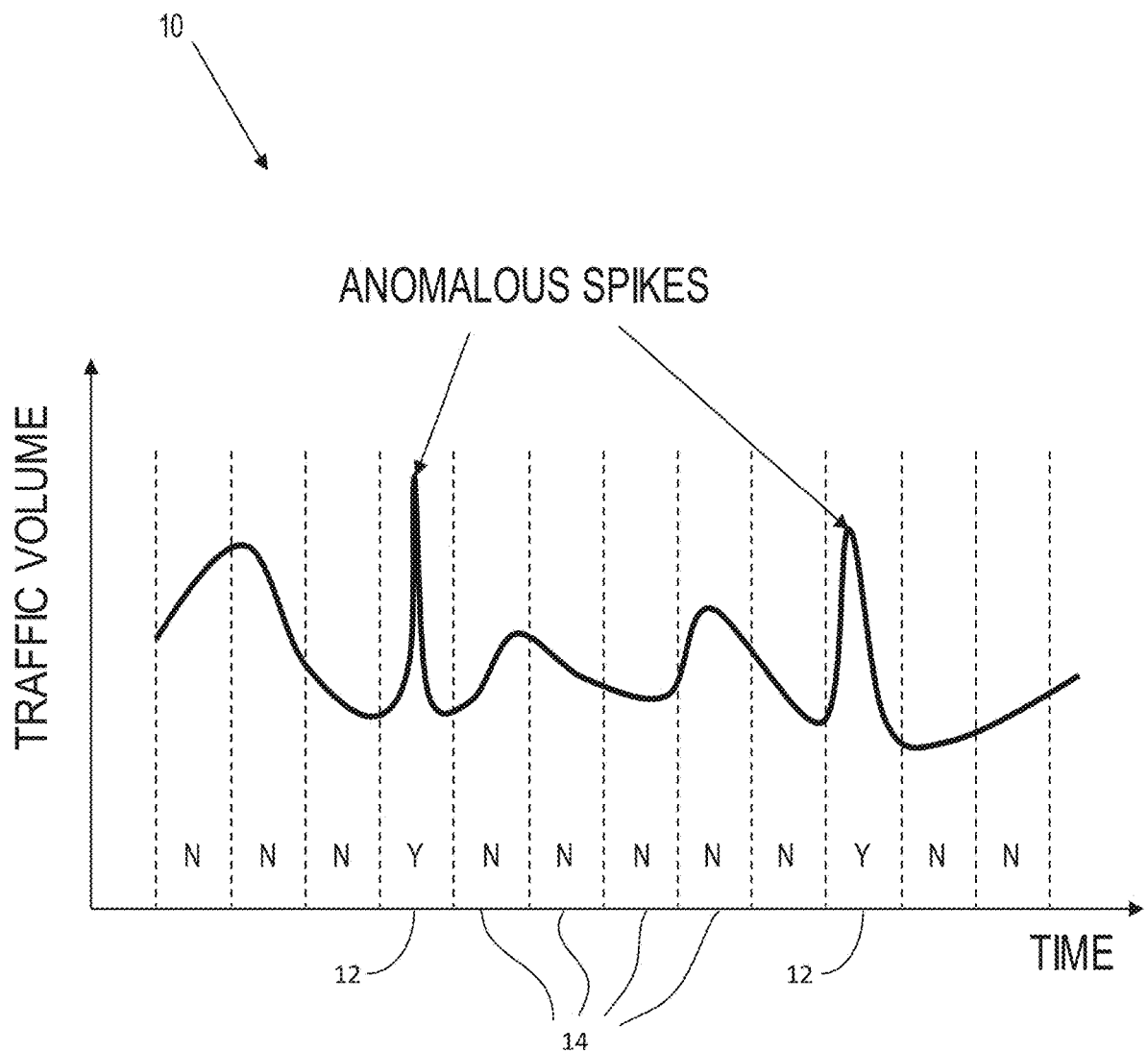
FIG. 1 is a graph of traffic volume plotted over time illustrating example anomalies.

In various embodiments, the present disclosure relates to systems and methods for pattern detection, and more particularly relates to pattern detection in time-series data. Conventional systems may be used to detect patterns, but typically do not detect patterns in data obtained specifically from a time-series. Pattern detection in a time-series, according to the present disclosure, may be used in the field of Machine Learning (ML) for networking applications, telecommunications, as well as many other applications. For example, in the field of networking applications, pattern detection can be used in the following use cases: for forecasting threshold crossings, for forecasting alarms, for forecasting quality-of-experience (QoE), for network anomaly detection, among others. Pattern detection can also be used in other areas (e.g., forecasting engine failure or tire deflation in cars from engine- or tire-collected information, forecasting bridge failure by detecting patterns in a time-series associated with bridge sensors, detecting earthquakes or tsunamis by detecting patterns in seismological time-series data, recognizing that a person is having a heart-attack from heart rate measurements collected by a smart watch, forecasting traffic congestion on streets by detecting patterns in a time-series from video cameras on streets, cars, or traffic detection sensors, etc.).

Time-series data can also be one-dimensional or multi-dimensional. For example, multiple sensors can provide data at about the same time, whereby this sensor data can be stacked together to provide a time-series that has multiple types of measurements associated with each time point. The patterns described here are detected across this potentially multi-dimensional time-series.

Pattern detection techniques described herein are based on machine learning algorithms. Pattern detection has two distinct life stages. The first life stage includes (a) the training of the underlying machine learning algorithm and (b) in the case of classical approaches, optimization of the hyper-parameters. The second life stage is the real-time, online use of the algorithm for pattern detection applied on new data.

In particular, the systems and methods of the present disclosure may include classical machine learning algorithms (C4.5, regression trees, Bayesian nets, etc.) and Deep Neural Networks, such as Convolutional Neural Networks (CNN), to detect patterns in time-series. Based on testing, it has been determined that CNN-based pattern detection is much simpler and quicker to train and has a better detection performance than the classical approaches. It is proposed that recurrent neural networks (RNNs) be used on time-series due to their ability to hold past values, despite the fact that CNNs have a much larger capacity (and therefore better performance) and has the ability with the Regional Convolution Neural Network (R-CNN) approach to detect multiple co-existing patterns.

First, the approach used in the present disclosure includes a "windowing" technique to create inputs for CNN and R-CNN Deep Neural Networks. Conventional ML system do not use this present windowing technique, which utilizes Deep Neural Networks (CNN, R-CNN) on data over a time-series. More specifically, the present systems and methods may include utilizing Deep Neural Networks with a transformed time-series for pattern detection in time-series data. Second, the windowing approach allows localization of anomalies in time, whereby the present systems and methods perform localization to overcome conventional problems with pattern detection in time-series. Third, the present systems and methods use machine learning for pattern detection in time-series, which is a new application of this type of machine learning. Fourth, the windowing approach also works on one-dimensional windows using a classical approach and hyper-parameter optimization. Fifth, the approach can be used for pattern detection across multiple time-series, jointly. Sixth, pattern detection is provided for the use cases described herein, which were only ever addressed with regression forecasting techniques.

Pattern Detection Use Cases

Again, examples of use cases in networking applications may include forecasting threshold crossings, forecasting alarms, forecasting quality-of-experience (QoE), network anomaly detection, among others. Threshold crossing forecasting may be used to solve problems in the context of adaptive modulation technologies in optical networking, which allow an increase in bandwidth if there is sufficient Signal-to-Noise Ratio (SNR) available at the receiver. For example, an operator needs to be confident that increasing the rate will not result in an outage sometime in the future, due to SNR dropping below a Forward Error Correction (FEC) limit for the higher rate modulation. During training, pattern detection for threshold crossing forecasting examines historical time-series (e.g., of SNRs) to discover patterns during a time interval, associated with values of the time-series dropping below the threshold at a later time. If there is a correlation between measurements and subsequent threshold crossings, machine learning may be used to discover this correlation and associate the correlation with a pattern. During online usage of new data, pattern detection functions include examining the time-series to find the previously discovered patterns. If a pattern associated with threshold crossing is not found with high confidence, the threshold crossings will not be detected in the future.

As a contrived example, a pattern may include a downward slope of 0.1 dB/week that results in the value of the SNR dropping 2.0 dB over a period of next 20 weeks, which would be below a prescribed threshold. While the threshold crossing forecast in this example can be solved with linear regression, the power of using machine learning is its ability to (1) discover other unknown patterns and (2) generalize to more complicated patterns than a simple straight line.

Alarm forecasting can be used to give an advanced warning that an event that would result in an alarm is going to happen. This use case enables proactive network maintenance, which can be particularly useful for operators. During training, pattern detection for an alarm forecast examines the time-series of a network measured performance indicator to discover patterns that are associated with future alarms. If there is a correlation between performance indicators and subsequent alarms, pattern detection using machine learning is configured to discover it. During the online phase, pattern detection finds the patterns associated with the failure, which can be used to notify the network operator which equipment to service pro-actively.

A special case of alarm forecasting is if an alarm is triggered due to a threshold crossing, which could be accomplished by using a threshold forecast (see above). However, the advantage of this more general approach is that it is not dependent on the simple well-known causes of alarms and can therefore discover more complex non-obvious network patterns that result in alarms. As an example, the alarm may indicate a Loss of Signal (LOS), which is due to equipment failure. During training, pattern detection uses historical network measurements to discover patterns associated with future loss of signal alarms. During the online phase, pattern detection searches incoming network performance measurements for the previously found patterns and notifies the user if one is found.

One way to detect congestion in a network is by observing users' quality-of-experience (QoE). For example, network congestion may result in re-buffering events at a User Equipment (UE) video player. Pattern detection can be used to give advanced warning when the traffic exceeds network capacity, by associating network traffic measurements with bad quality-of-experience. During training, pattern detection discovers the network pattern of one or more characteristics or parameters (e.g., buffer status, traffic load, etc.) associated with subsequent video player re-buffering events. During the online phase, pattern detection finds the pattern and this knowledge can be used to forecast video player re-buffering. The advanced warning can be used to change the network configuration, so that congestion is avoided, such as by invoking higher rates with liquid spectrum, re-routing traffic, changing overbooking parameters, among other actions.

Examples of anomaly detection may include drops in SNR due to thunder strikes, detection of traffic pattern shifts (from packet counter data and call admission control data), network intrusion detection (from an examination of packet counter data), equipment failure prediction (from performance monitoring data), etc. Pattern detection for anomaly detection associates labeled anomaly periods with the anomalous measurements in the time-series. During the training phase, pattern detection learns the patterns of anomalies, which it can use later during the online phase. The foregoing description assumes anomaly detection as a primary embodiment for developing pattern detection on time-series. However, other use cases, not limited to the ones mentioned herein, are also contemplated.

In addition to the use of pattern detection techniques for detecting patterns in the field of networks and telecommunications, the pattern detection techniques described in the present disclosure may also be used in multiple other fields as well. For example, a heart monitor (e.g., a wearable wristband or other suitable monitoring device) may monitor the heart rate of a person over time. Historically, certain patterns in the heart rate may be representative of an imminent heart attack. In this case, an alarm can be sent to the user or to medical personnel so that preventative measures can be taken to prevent or treat the person's heart condition in a timely manner.

In the field of monitoring vehicular traffic, patterns may be detected in the roadways to identify problem areas. For example, time-series data from previous trips may be used to detect pot holes or other undesirable road conditions at certain points along the roads, and then using the obtained time-series information to warn the driver or take evasive self-driving maneuvers to avoid the problem spots. Also, blind areas may be detected to alert the driver to use caution at these areas. Vehicular data may also be used for measuring lanes of traffic or other patterns.

In the field of finances, the pattern detection techniques of the present disclosure may use time-series data to determine spending patterns of a person. If credit card activity is detected as an anomaly with respect to the person's regular spending patterns, alerts can be provided to further monitor whether or not current purchases are authorized. A known spending pattern associated with suspicious activity such as a set of suspicious purchases (a spending signature) can be used as for training a machine learning model to recognize these suspicious patterns in customer data. These and other fields of technology may benefit from the machine learning methods for training neural network models described in the present disclosure and utilizing these models with current (online) time-series data for detecting patterns and anomalies.

In general, the approach of setting up machine learning for pattern detection is to identify and associate two elements during the training of the machine learning algorithms: (1) the time-series that contains the pattern and (2) the indicator to be associated with the pattern. A time-series is used to define training instances using the windowing approach, defined in more detail below, while the indicator is used to associate a class with the instance. Due to the classification capacity of Deep Neural Networks (DNNs), it is not necessary to be precise with selection of the duration of the time-series. With sufficient training, the network can self-adjust to find the pattern. In the example of pattern detection in SNR analysis, the time-series included measurements and the indicator was the threshold crossing. Notice that the indicator can be something completely different from the time-series, such as the loss of a video signal, when the time-series relates to the fill level of network buffers. For example, for the car example, the time-series can be measurements from the engine, while the indicator may be that the car does not turn on. In addition to network use cases and the use cases described above, pattern detection using data obtained from a time-series can have other applications, as will become evident from an understanding of the description in the present disclosure.

The systems and methods of the present disclosure provide an improvement over classical machine learning algorithms, which do not perform particularly well with regard to time-series data, especially since time-series data includes certain characteristics that most algorithms are not designed to handle. However, the models or algorithms that may be developed according to the teachings of the present disclosure may use image processing techniques for processing the time-series data. By processing the time-series data a certain way, the present systems and methods can produce an image, such as a feature map or color map, and utilize the image information to detect patterns. Thus, it has been discovered that patterns in the time-series may show up as an object in the image generated from the time-series data. By using object detection methods, it is possible to detect patterns in the data.

FIG. 1 is a graph 10 of time-series data of network traffic volume shown over time. The graph 10 of the network traffic volume also illustrates examples of anomalies in the data. Pattern detection is trained with historical data and anomalies can be identified and labeled. For example, windows 12 are labeled with "Y" to indicate the existence of an anomaly and windows 14 are labeled "N" to indicate an absence (or non-existence) of an anomaly. Multiple anomaly types can be encoded by using more than a binary classifier of "Y" and "N." In some cases, multiple anomaly types can be detected in the same windows 12, 14 to indicate other types of anomalies or other patterns.

Figure 2:
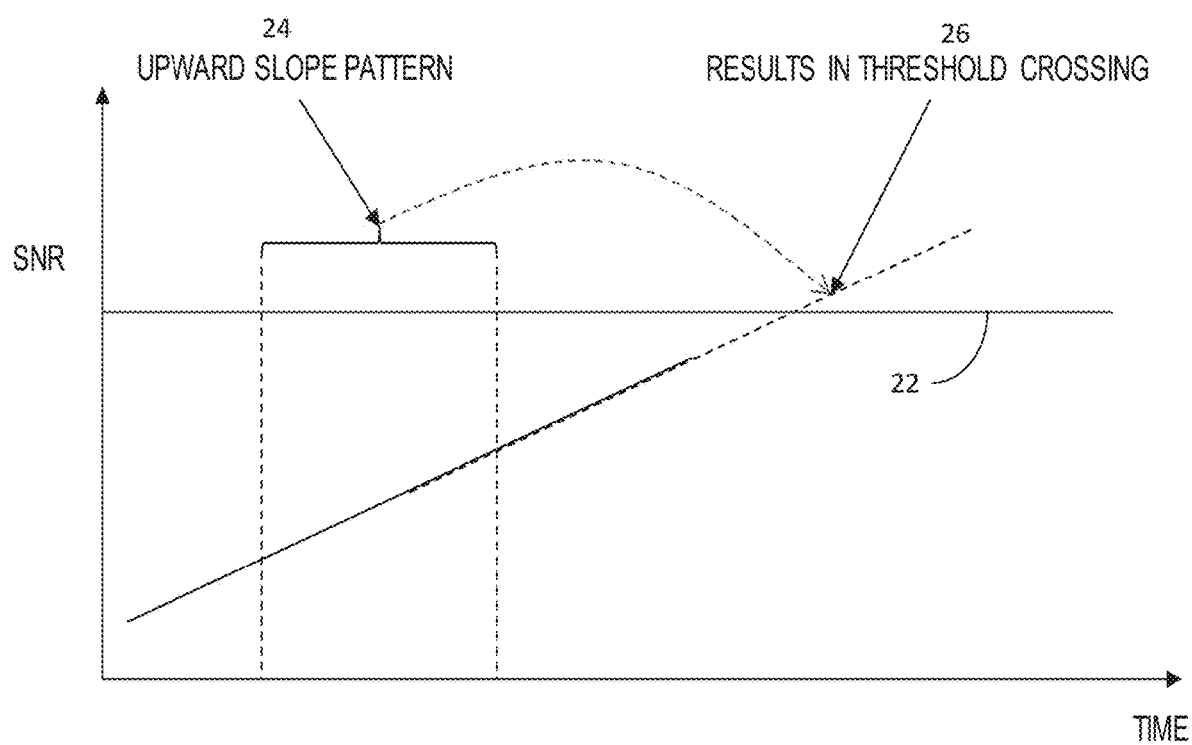
FIG. 2 is a graph for predicting threshold crossings with pattern detection.

FIG. 2 is a graph 20 of time-series data where Signal-to-Noise Ratio (SNR) measurements are taken over time. A pattern detection model that is modeled from the historical training data can be used with new data for predicting when the SNR curve crosses over a threshold 22. Using the pattern detection model, new data can be plotted, and patterns may be detected to predict when the SNR in the future may cross the threshold 22. Pattern detection may include analyzing an upward slope pattern 24 or other curve characteristic to predict a future result 26 of a threshold crossing.

Figure 3:
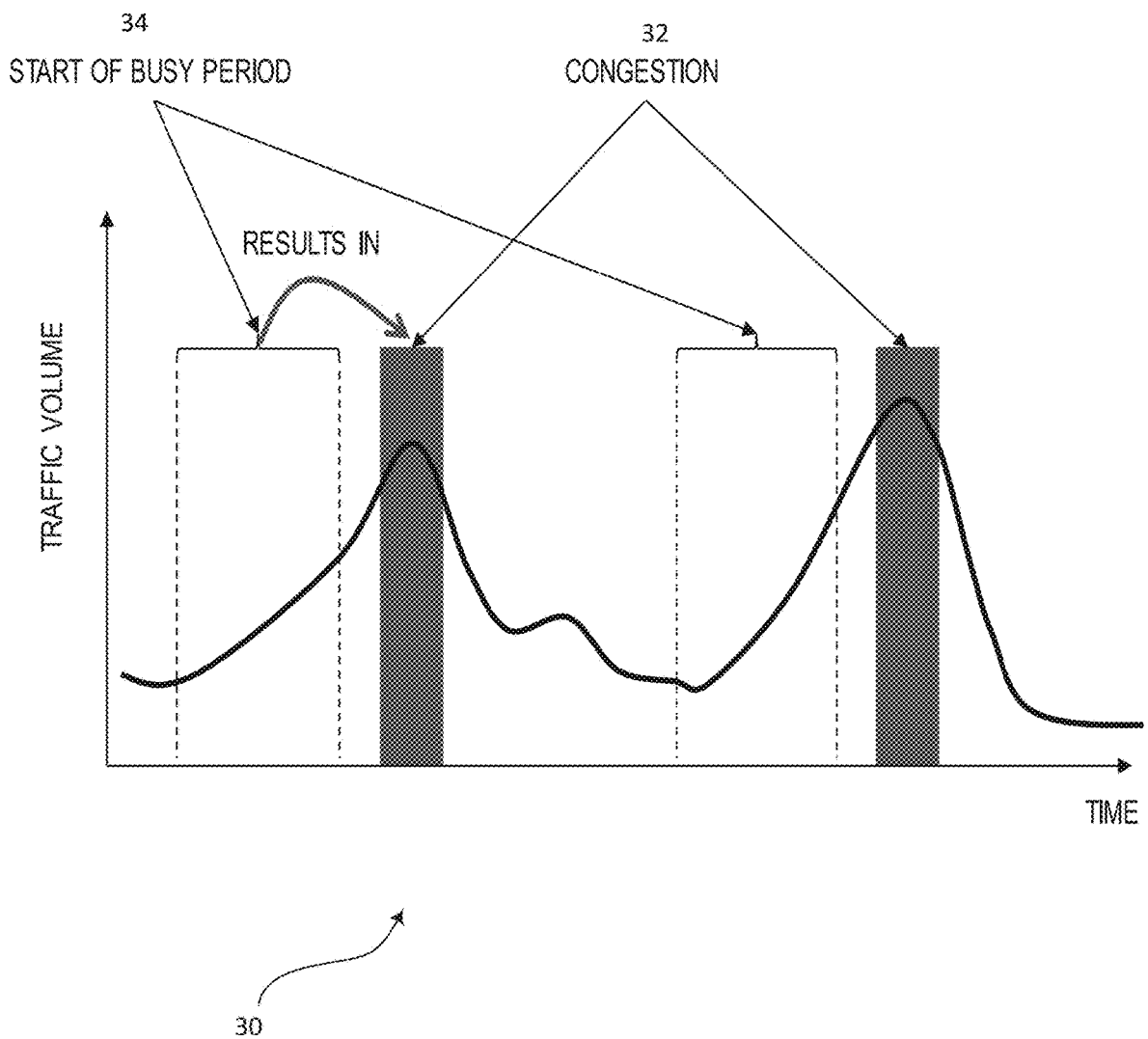
FIG. 3 is a graph for predicting congestion with pattern detection.

FIG. 3 is another graph 30 of traffic volume (e.g., in a network) over time. The data may be analyzed with pattern detection for predicting congestion events 32 (e.g., when traffic volume exceeds a threshold for an extended length of time). Pattern detection is trained with traffic measurements (or CPU utilization measurements) and labeled on graph 30 as patterns 34 that represent a "start of busy period," which may be indicative of or may result in congestion 32 in the future. One set of data (e.g., queue sizes) can be used for measurements, while another (e.g., end-to-end performance) can be used to generate labels (e.g., "congestion" or "no congestion"). Patterns can then be further correlated with the network at the time for root cause analysis. Congestion 32 can be periods of time when packets are dropped or latency increases beyond a bound. In a virtualized network setting (e.g., 5G), CPU utilization may be a greater indicator of congestion 32 than packet queues. Traffic other than packet data can be used to detect congestion 32 such as video re-buffering events at a player device (e.g., User Equipment (UE)).

Figure 4:
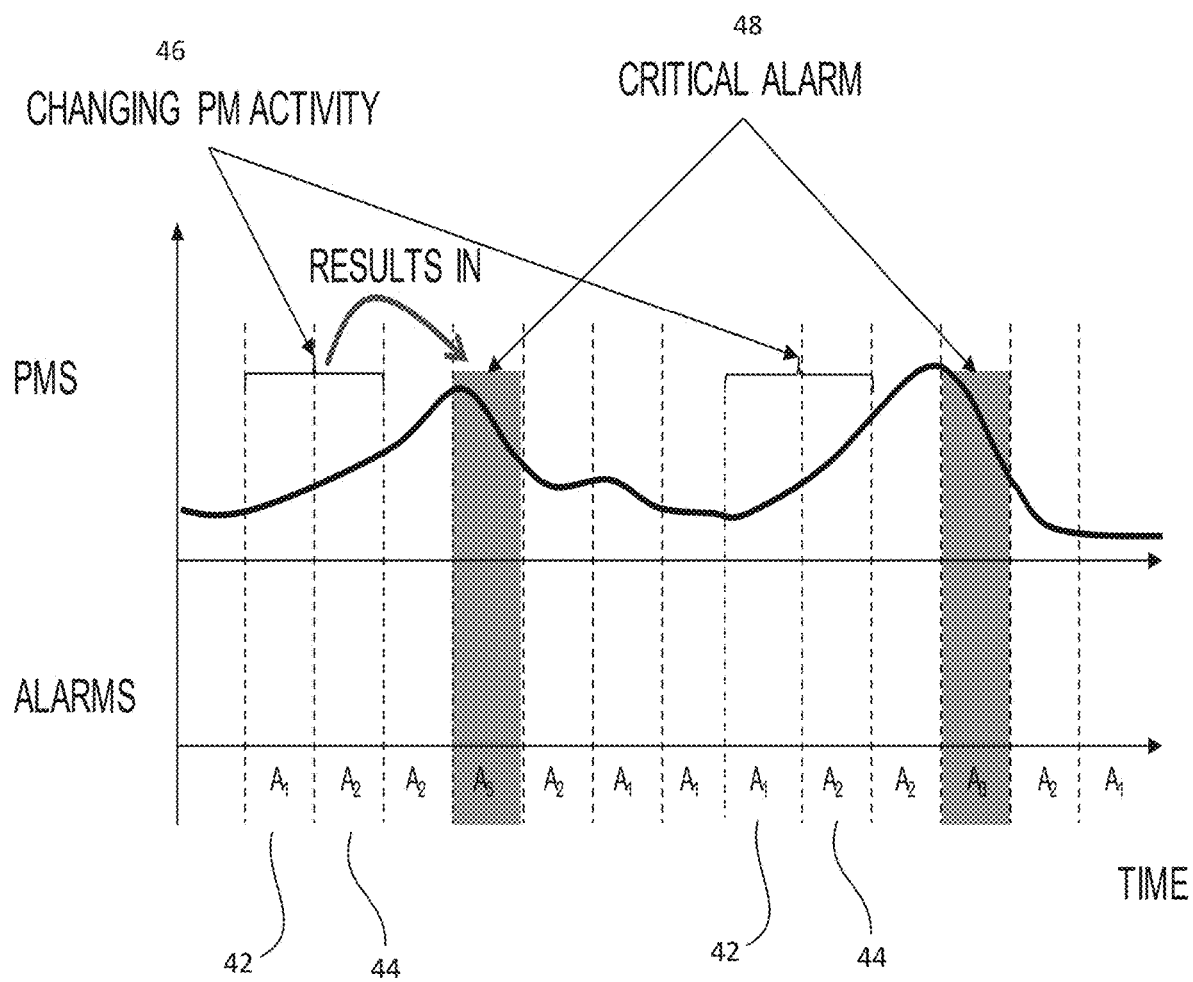
FIG. 4 is a graph for predicting critical alarm conditions with pattern detection.

FIG. 4 is a graph 40 of performance monitoring (PM) and associated alarms over time. The data of graph 40 may be used for predicting alarms before they happen. Pattern detection may be trained with traffic measurements and labeled as patterns (e.g., windows $A_1$, labeled 42, followed by windows $A_2$, labeled 44). These changes 46 (e.g., from window $A_1$ to window $A_2$) in PM activity may be analyzed in pattern detection analysis to predict a start of congestion in the future, corresponding to alarm $A_3$, which may be a critical alarm 48. One set of data (e.g., queue sizes) can be used for measurements, while another (e.g., end-to-end performance) can be used to generate labels. Patterns can then be further correlated with the network at the time for root cause analysis.

Data

A variety of data sources can be employed to obtain information about every component of the network, from the physical (or virtual) devices, to the communication channels, the usage patterns, the environment, and the business context. Network devices (e.g., network elements) generate Performance Monitoring (PM) information, alarms, and/or logging data. These include things like power levels, error counters, received, transmitted or dropped packets, Central Processing Unit (CPU) utilization, geo-coordinates, threshold cross, etc. Communication channels (or "services") also generate PM data, for all layers of the Open Systems Interconnection (OSI) model (ISO/IEC standard 7498-1, 1994). For instance, layer-3 network performance is characterized by bandwidth, throughput, latency, jitter, and error rate. Data from end-users, from the environment, or from businesses may typically come from third-party databases.

Each time any of the above data is collected, it is useful to record a timestamp associated with it. Time is unique in that it can be used to correlate independent data sources. For instance, data from different sources can be associated if they were all taken during the same time interval, to define a "snapshot." Furthermore, sorting data in chronological order is frequently used to measure time-series trends to anticipate future events.

Most communication networks connect to a plurality of device types. Also, different types of devices from different equipment vendors tend to produce different data in different formats. Hence, communication networks are said to generate a wide variety of data. In addition, the frequency at which the above data is collected (a.k.a. Velocity) can vary for each source. Likewise, the amount of time during which the data is kept in storage can also vary. When networks contain a large number of devices and services, with high-frequency data-collection and/or long storage periods, the result is large data volumes. The combined Variety, Velocity, and Volume is often referred as "Big Data."

Equipped with sufficient infrastructure, a common approach is to collect and store all available data and enable ad-hoc analysis after the fact (i.e., in a reactive manner). When this is not possible, tradeoffs have to be made to only pick the most relevant data for the targeted application(s). For example, an optical networking effect was explained more accurately when using additional inputs such as weather data (see D. Charlton et al., "*Field measurements of SOP transients in OPGW, with time and location correlation to lightning strikes*", Optics Express, Vol. 25, No. 9, May 2017). However, with the systems and methods described herein, wider variety, larger velocity, and larger volumes of data will broaden the coverage and increase the accuracy of ML-driven applications.

The software applications of the present systems and methods may use relevant Performance Monitoring (PM) data along with other data to describe the behavior of a telecommunications network. The network can include an optical layer (e.g., Dense Wavelength Division Multiplexing (DWDM), etc.), a Time Division Multiplexing (TDM) layer (e.g., Optical Transport Network (OTN), Synchronous Optical Network (SONET), Flexible Ethernet (FlexE), etc.), a packet layer (e.g., Ethernet, Multiprotocol Label Switching (MPLS), Internet Protocol (IP), etc.), and the like. Those skilled in the art will recognize actual network implementations can span multiple layers. The present software applications can operate at a single layer or concurrently at multiple layers. Each of these layers can include associated PM data which describes the operational status over time at the layer.

Examples of PM data include, without limitation, optical layer data, packet layer data, service and traffic layer data, alarms, hardware operating metrics, etc. The optical layer data can include pre-Forward Error Correction (FEC) Bit Error Rate (BER), post-FEC BER (estimate), number of corrected errors, chromatic dispersion, Polarization Dependent Loss (PDL), Estimated Optical Signal to Noise Ratio (OSNR), latency, TX power, RX power (total, individual channels), power loss, Q factor, fiber type and length, etc. The packet layer data can include port level information such as bandwidth, throughput, latency, jitter, error rate, RX bytes/packets, TX bytes/packets, dropped packet bytes, etc. The service and traffic layer data can be Time Division Multiplexing (TDM) Layer 1 (L1) PM data such as Optical Transport Network (OTN). The packet layer data can be associated with a device port while the service and traffic layer data can be associated with a particular L1 connection/service. The alarm data can be various types of alarms supported by a network element (e.g., chassis, MPLS, SECURITY, USER, SYSTEM, PORT, SNMP, BGP-MINOR/WARNING/MAJOR/CRITICAL, etc.). The hardware operating metrics can include temperature, memory usage, in-service time, etc. Video quality metrics may include the number of re-buffering events, number of video codec rate changes, or data submitted by users such as thumbs up or thumbs down after a video conference call.

Throughout, the term "network element" (NE) can interchangeably refer to any of a variety of network devices, such as nodes, shelves, cards, ports, or even groups of such NEs. Regardless of the identity of the elements, however, the technique described herein for determining the normalcy of their behavior remains similar and remains valid as long as the relevant data for each element is accessible to the anomaly detection software application.

The systems and methods of the present disclosure include building a single trend from multiple PM data time-series and using the single trend to predict network anomalies for proactive actions. Both these techniques can be implemented in a machine learning engine that can use arbitrary PM data from any device type, any vendor, etc.

The following Table 1 provides some example PM data which can be used herewith:

| | |
|---|---|
| CV-PCS | Code violation, physical coding sublayer |
| DFR-E | Discarded frames, Ethernet |
| DROPGAINAVG-OTS | Drop Gain Average - Optical Transmission Section |
| DROPGAINMAX-OTS | Drop Gain Maximum - Optical Transmission Section |
| DROPGAINMIN-OTS | Drop Gain Minimum - Optical Transmission Section |
| DROPGAIN-OTS | Drop Gain - Optical Transmission Section |
| ES-E | Errored seconds, Ethernet |
| ES-ODU | Errored seconds, optical channel data unit |
| ES-OTU | Errored seconds, optical channel transport unit |
| FC-ODU | Failure count, optical channel data unit |
| FCSERR-E | FCS errors, Ethernet |
| FEC-OTU | Forward error correction, optical channel transport unit |
| HCCS-OTU | High correction count seconds, optical channel transport unit |
| INFRAMES-E | In frames, Ethernet |
| INFRAMESERR-E | In errored frames, Ethernet |
| OPINAVG-OTS | Optical Return Loss Average (in dB) - Optical Transmission Section |

-continued

| | |
|---|---|
| OPINMAX-OTS | Optical Return Loss Maximum (in dB) - Optical Transmission Section |
| OPINMIN-OTS | Optical Return Loss Minimum (in dB) - Optical Transmission Section |
| OPIN-OTS | Optical Return Loss (in dB) - Optical Transmission Section |
| OPOUTAVG-OTS | Optical Power Output Average (in dBm) - Optical Transmission Section |
| OPOUTMAX-OTS | Optical Power Output Maximum (in dBm) - Optical Transmission Section |
| OPOUTMIN-OTS | Optical Power Output Minimum (in dBm) - Optical Transmission Section |
| OPOUT-OTS | Optical Power Output (in dBm) - Optical Transmission Section |
| OPRAVG-OCH | Optical power received Average - Optical Channel |
| OPRMAX-OCH | Optical power received Maximum - Optical Channel |
| OPRMIN-OCH | Optical power received Minimum - Optical Channel |
| OPRN-OCH | Optical power received Normalized - Optical Channel |
| OPR-OCH | Optical power received - Optical Channel |
| OPTAVG-OCH | Optical Power Transmitted Average (in dBm) - Optical Channel |
| OPTMAX-OCH | Optical Power Transmitted Maximum (in dBm) - Optical Channel |
| OPTMIN-OCH | Optical Power Transmitted Minimum (in dBm) - Optical Channel |
| OPTN-OCH | Optical Power Transmitted Normalized (in dBm) - Optical Channel |
| OPT-OCH | Optical Power Transmitted (in dBm) - Optical Channel |
| ORLAVG-OTS | Optical Return Loss Average (in dB) - Optical Transmission Section |
| ORLMAX-OTS | Optical Return Loss Maximum (in dB) - Optical Transmission Section |
| ORLMIN-OTS | Optical Return Loss Minimum (in dB) - Optical Transmission Section |
| ORL-OTS | Optical Return Loss (in dB) - Optical Transmission Section |
| OUTFRAMES-E | Remote out frames, Ethernet |
| OUTFRAMESERR-E | Out errored frames, Ethernet |
| PFBERE-OTU | Post-FEC bit error rate estimate, optical channel transport unit |
| PRFBERMAX-OTU | Max Pre-FEC bit error rate, optical channel transport unit |
| PRFBER-OTU | Pre-FEC bit error rate, optical channel transport unit |
| SEFS-OTU | Severely errored frame seconds, optical channel transport unit |
| SES-E | Severely errored seconds, Ethernet |
| SES-ODU | Severely errored seconds, optical channel data unit |
| SES-OTU | Severely errored seconds, optical channel transport unit |
| UAS-E | Unavailable seconds, Ethernet |
| UAS-ODU | Unavailable seconds, optical channel data unit |
| UAS-PCS | Unavailable seconds, physical coding sublayer |
| BBES | Background Block Errors Seconds |
| BBE-SFE | Background Block Error Section Layer Far End. |
| CORRFEC | Corrected FEC - This is the count of the corrected number of bits |
| CSES | Consecutive Severely Errored Seconds |
| CSESL | Consecutive Severely Errored Seconds Line |
| CV | Coding Violations |
| CVL | Coding Violations Line |
| ES | Errored Seconds |
| ESL | Errored Seconds Line |
| ESS | Errored seconds, Section layer |
| ES-SFE | Errored Seconds Section Layer Far End |
| LBC | Laser Bias Current |
| OPR | Optical Power Received |
| OPT | Optical Power Transmitted |
| SEFS | Severely errored frame second |
| SEMS | Severely errored, multiframed seconds |
| SES | Severely Errored Seconds Line |
| SESL | Severely Errored Seconds Line |
| SESS | |
| SES-SFE | Severely Errored Seconds Section Layer Far End |
| UAS | Unavailable Seconds |
| UASL | Unavailable Seconds Line Layer |
| UASS | |
| CV-ODU | Code violation, optical channel data unit. |
| CV-OTU | Code violation, optical channel transport unit |

Pattern Detection in Time-Series

To detect patterns in a time-series, historical data or training data from the time-series are used and labels associated with time periods are created. There may be several different labels corresponding to different patterns. Historical data and labels are used to train one or more machine learning algorithms resulting in a model. Historical data is windowed and windows are associated with labels. Machine learning algorithms are trained with windows as exemplars and labels as what the output could be. The trained model is used for pattern detection, new data is windowed, and windows are given to the machine learning algorithms whose output is the label.

To prevent errors due to distortion, the window is selected to be large enough to contain the pattern, which introduces the problem of localizing the pattern in the window where it was detected. The problem can be solved with a "sliding window" approach. A sliding window is used to generate a sequence of inputs to the trained machine learning algorithm. The pattern is localized by detecting which windows in the sequence contains the pattern.

Machine learning algorithms cannot be used out of the box for pattern detection in time-series. Aspects of the systems and methods of the present disclosure include:

(1) processing time-series data and creating an input for pattern detection;
(2) training machine learning algorithms for use cases, as indicated above, and
(3) in the case of classical machine learning algorithms, optimizing their hyper-parameters and selecting the best algorithm among the optimized algorithms, given the current network context.

Figure 5A:
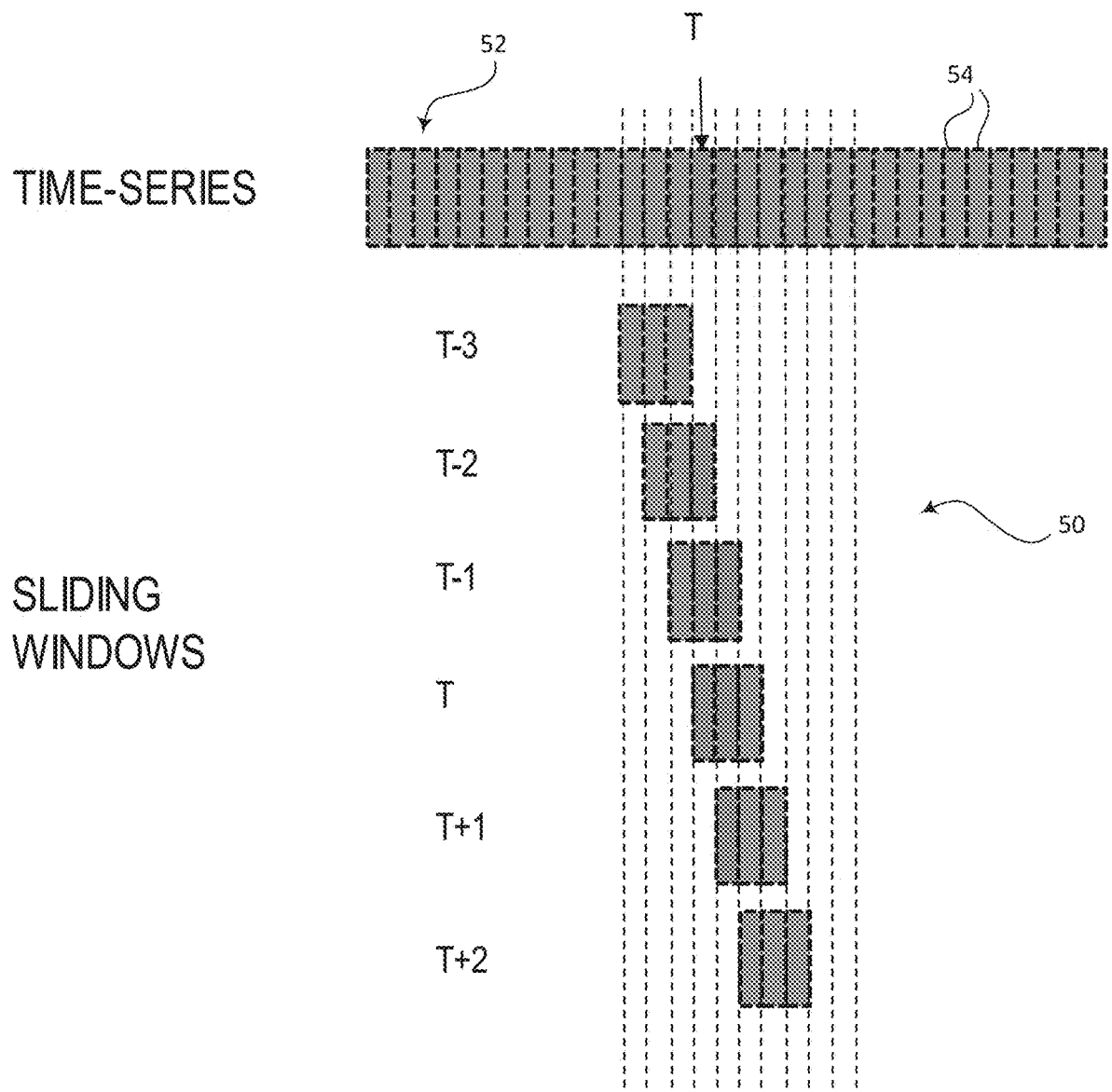
FIG. 5A is a diagram of a one-dimensional sliding (or moving) window, according to various embodiments.

FIG. 5A is a diagram of a one-dimensional (e.g., one variable) sliding window. Sliding windows 50 are stepped through/passed over the time-series 52 resulting in a sequence of related, overlapping windows. For each window in the sequence of windows (T−3, T−2, T−1, T, T+1, T+2), a figure of merit is found (i.e., the probability that an anomaly or other significant pattern is present in that window). The sequence of figures of merit is examined for overlapping segments. In the example of FIG. 5A, the pattern may have the highest figure of merit, for instance, in windows T−1 and T. The conclusion is that the anomaly exists in the overlapping windows T and T+1.

Figure 5B:
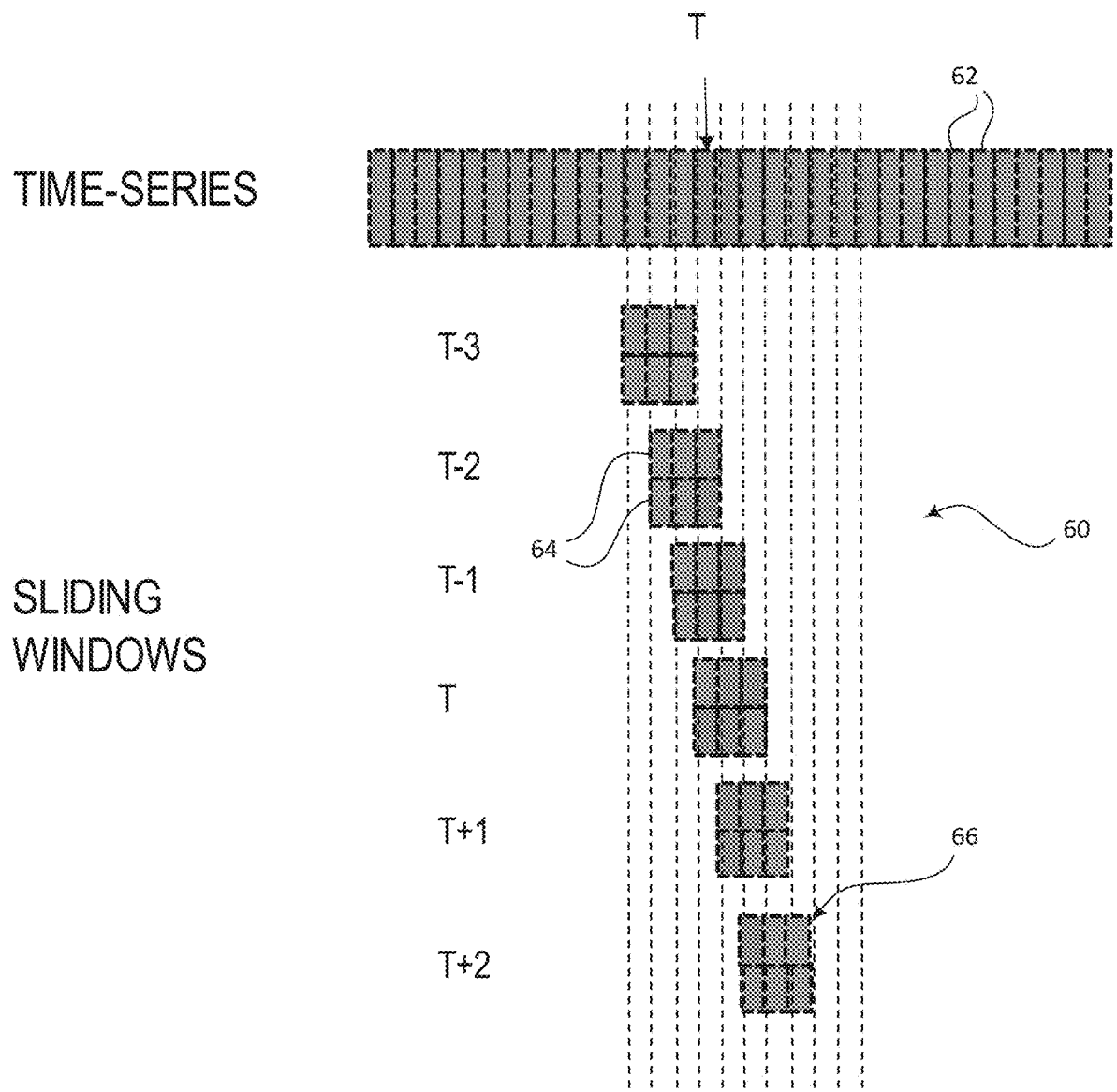
FIG. 5B is a diagram of a two-dimensional sliding window.

FIG. 5B is a diagram of a two-dimensional (e.g., two variables) moving (sliding) window. The sliding windows 60 are stepped through/passed over the time-series resulting in a sequence of related windows, which are stacked together to form two-dimensional matrices. FIG. 5B illustrates stacking of two rows 64, but multiple rows (e.g., multiple variables) can also be stacked together. For each matrix in the sequence, a figure of merit is found (e.g., probability that an anomaly or other pattern is present). A sequence of matrices is examined to detect the matrix with the highest value and the figures of merit are examined for overlapping segments. In the example of FIG. 5B, the pattern with the highest figure of merit, for instance, may be in windows T−1 and T. Thus, the conclusion is that the anomaly exists in the overlapping windows T and T+1.

For illustration, pattern detection is shown using two-dimensional windows 60 over the time-series and Deep Neural Networks. An aspect that enables pattern detection in network time-series is the way the data is windowed to obtain the chunks of time-series and then combine this into two-dimensional windows, applicable to pattern detection.

In addition, FIG. 5B illustrates the process of obtaining two-dimensional windows from time-series data. The time-series is sampled with even samples that are Δ seconds apart. A time window 62 of length m is stepped through/passed over the time-series with a lag l, obtaining a series of horizontal vectors with length m. The horizontal vectors are grouped in groups of n (where n=2 in the example of the two-dimensional matrices) and then stacked to obtain matrices of size m×n. A matrix is obtained for every lag, resulting in a series of overlapping matrices $i_k$, which can be referred to as images and can be processed using image processing techniques.

The systems and methods use the two-dimensional windows and a DNN such as a Convolutional Neural Network (CNN) for pattern detection. The pattern detection training procedure can be summarized as follows: (1) obtain two-dimensional windows from the time-series, (2) use a back-propagation algorithm to train a CNN with the windows, details of which are well known in the machine learning area. The pattern detection online procedure can be summarized as follows: (1) upon receipt of a new time-series, obtain new two-dimensional window and pass it to the trained CNN, which provides the classification at its output.

In one embodiment, image pattern recognition CNN is used. This means that the time-series is converted to an image. FIG. 5A shows how the windowing is performed. The time-series is shown with vertical bars 54, where each bar 54 may correspond to a time-series sample. If a multi-dimensional time-series is used, the vertical bar 54 may be a column vector. A sliding window 50 is used to select a subset of time-series values, which are close together in time.

In FIG. 5B, two-dimensional sliding windows are shown for times T−3, T−2, T−1, T, T+1, T+2. A two-dimensional sliding window 60 can be obtained from multiple one-dimensional time-series windows 50 by stacking consecutive windows on top of each other to obtain matrices 66, as shown in FIG. 5B.

A special feature of the windowing procedure, combined with machine learning, is that it can be used to localize the pattern in time. In FIG. 5B, the windowing procedure obtains several windows T−3 to T+2. As the pattern may be mostly localized in window T in this example, the conditional probability of the anomaly or pattern presence is the highest in that window, thus localizing the pattern as starting at time T.

A procedure can be devised on top of this procedure to search for the optimum window size as well. That procedure will repeat the search for the pattern using a number of window sizes W for each of the time slots T. The window size W with the highest conditional probability at time T is the best window size for the anomaly. This procedure is used during the training of the classifier, so in fact the classifier is trained with multiple window sizes W on the training data set and the windowing procedure T is used on the testing set to select the best W by picking the combined classifier and window size.

Going beyond a simple CNN, a similar procedure can be used with a regional convolutional neural network (R-CNN), which may be one of the preferred implementations. The R-CNN conceptually takes the two-dimensional image 66, separates out multiple non-overlapping image regions and applies pattern detection to each region in parallel. Using this approach, it is possible to examine the time-series for multiple different overlapping patterns. The training and usage procedure for R-CNN is the same as for the CNN, but instead of training and using a CNN, R-CNN is used. Since the conceptual version may be computationally expensive, other R-CNN procedures such as "faster R-CNN" and "mask R-CNN" may be used instead, but with the same general functionality. For example, the concept of "faster R-CNN" is defined in *Faster R-CNN: towards real-time object detection with region proposal networks*, by Shaoqing Ren, Kaiming He, Ross Girshick, and Jian Sun, Proceedings of the 28th International Conference on Neural Information Processing Systems—Volume 1 (NIPS'15), 2015, C. Cortes, D. D. Lee, M. Sugiyama, and R. Garnett (Eds.), Vol. 1, MIT Press, Cambridge, MA, USA, 91-99. Also, the concept of "mask R-CNN" is defined in *Mask R-CNN*, by K. He, G. Gkioxari, P. Dollár and R. Girshick, IEEE International Conference on Computer Vision (ICCV), Venice, 2017, pp. 2980-2988, doi: 10.1109/ICCV.2017.322.

Generally speaking, mask R-CNN has the highest pattern detection capabilities. It uses the special structure of the underlying CNN to find a very precise border around the pattern in the image. This contrasts with the CNN or other R-CNN procedures, which uses\ a square bounding box, which may introduce noise. Other advantages of using a mask R-CNN is that it can examine larger two-dimensional windows and find multiple types of patterns. The larger window may result in better precision. While finding multiple patterns is possible with a CNN, this must be done in series. One advantage of the R-CNN is that it can find multiple patterns in parallel.

The approach in creating two-dimensional windows can be used to create multi-dimensional matrices (e.g., tensors) as well. A tensor is obtained when two-dimensional windows 64 are stacked on top of each other. This can be used to discover patterns that exist across multiple time-series. For example, suppose that it is determined that congestion occurs if two or more related or dependent actions occur at the same time, such as if a first group of specific buffers are over 80% utilization and another specific buffer is over 40% utilization. An approach that examines buffer time-series independently would not discover this correlation resulting in congestion.

Figure 6:
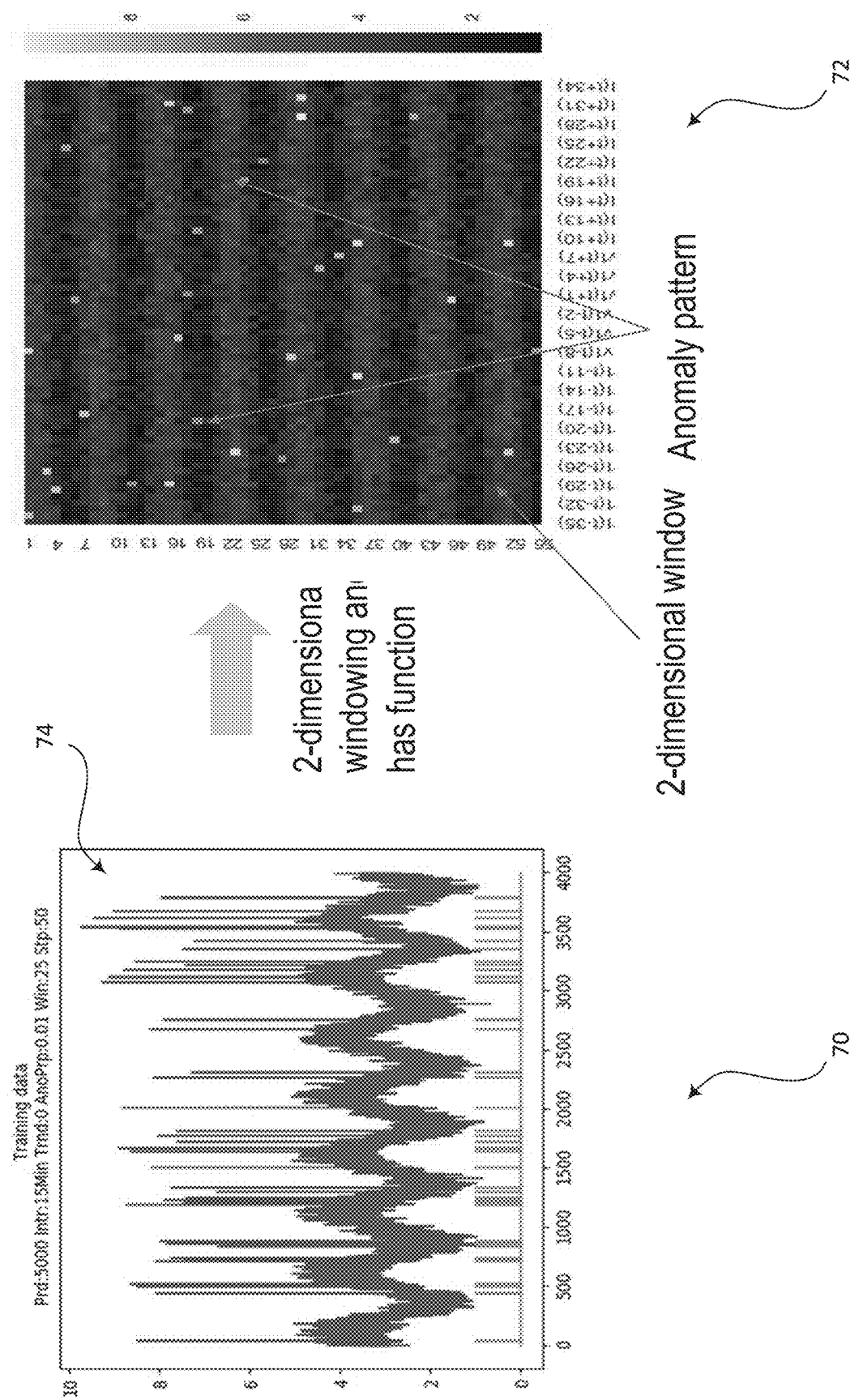
FIG. 6 is a diagram of pattern detection with object identification in images.

FIG. 6 is a diagram of a graph 70 using pattern detection with object identification in images. FIG. 6 shows how the sliding window can be used to detect patterns in time-series. For the purposes of an example, a hash function is used to convert real number values into 3-color (shaded) pixels using a color map 72. The spikes 74 on the graph 70 show up as bright spots on the color map 72. The dark horizontal areas on the color map 72 correspond to the seasonality shown on the graph 70. Other functions (e.g., Fourier transforms) are also possible.

Pattern Detection Training and Real-Time Detection

Figure 7:
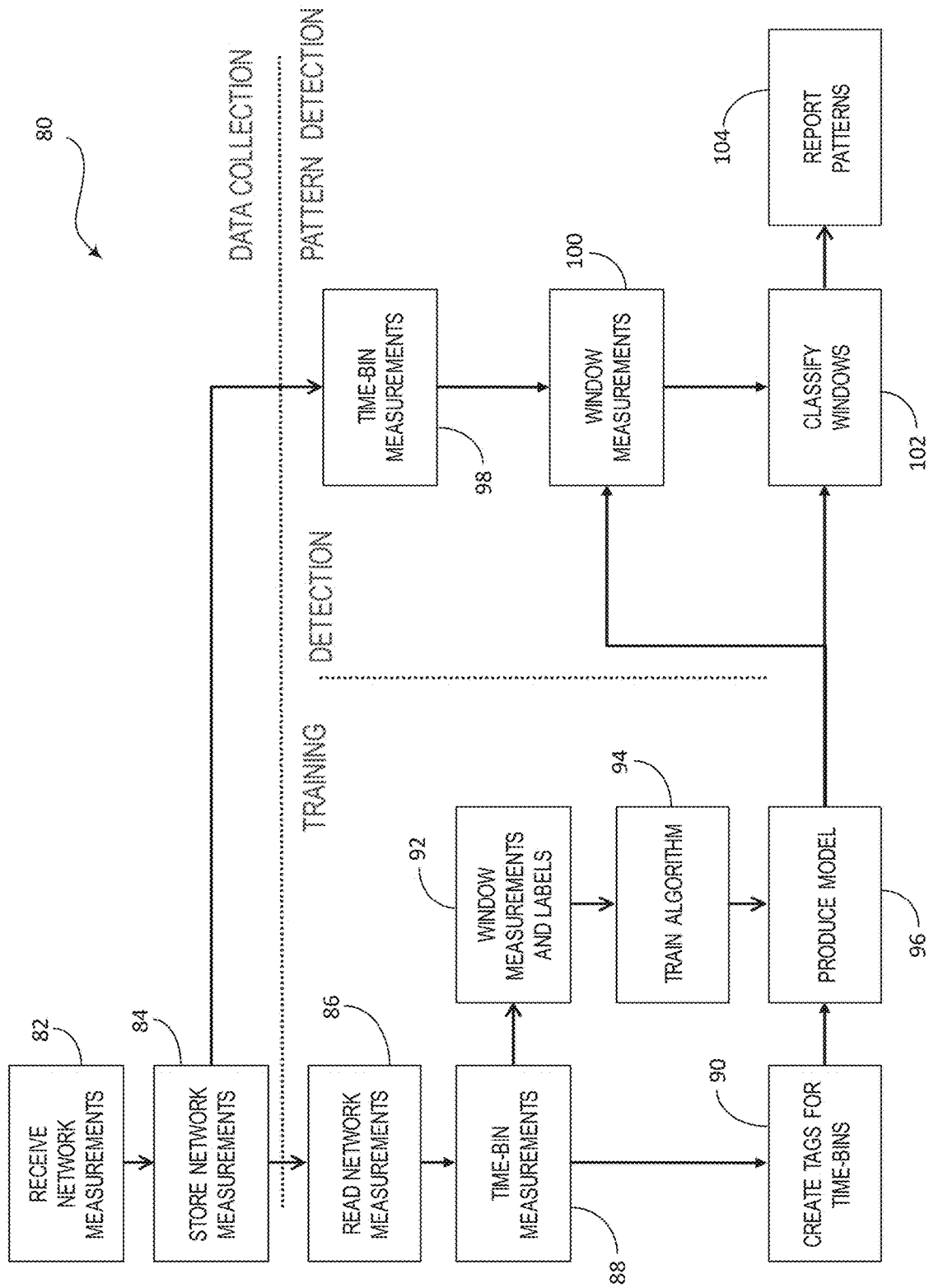
FIG. 7 is a flowchart of pattern detection and real-time detection.

FIG. 7 is a flowchart showing a method 80 of pattern detection and real-time detection. The method 80 includes receiving network measurements (step 82). The network measurements are stored (step 84). Steps 82 and 84 represent a data collection phase. After storing measurements, as indicated in block 84, the method 80 branches into two parts of a pattern detection phase. A first part of pattern detection includes training and a second part includes detection.

In training, the method 80 includes reading network measurements (step 86) and time-bin measurements 88. For time-bin measurements, tags are created (step 90). Also, window measurements are performed, and labels are added (step 92). The method 80 also includes training an algorithm (step 94). From creating tags (step 90) and training the algorithm (step 94), the method 80 includes producing a model (step 96).

In the detection portion of the pattern detection phase, the method 80 includes obtaining time-bin measurements (step 98) of new data. From the model produced in block 96 and the time-bin measurements 98, window measurements (block 100) are performed. From the model (block 96) and window measurements (block 100), the method 80 includes classifying windows (step 102). Then, the patterns may be reported (block 104).

It is noted that other kinds of training are also possible. For example, unsupervised and supervised training could be combined to reduce the number of labeled data samples required to get good DNN performance, as defined in Unsupervised Learning via Meta-Learning, by Hsu, Levine, and Finn, https://arxiv.org/abs/1810.02334. In this training regime, one would use unsupervised training first. The unsupervised training first clusters the unlabeled time-series windows based on their similarity and creates temporary labels matching the clusters. The clustered images are used to train the DNN with images in each cluster being labelled by the cluster label. This process is repeated many times for many different clusters. The objective of the approach is to condition the neural network so that it is easier to train with the labeled samples. After the conditioning, the labelled samples are used to train the network to its best performance on the labelled data.

Search for Optimum Parameters and Transformations

Figure 8:
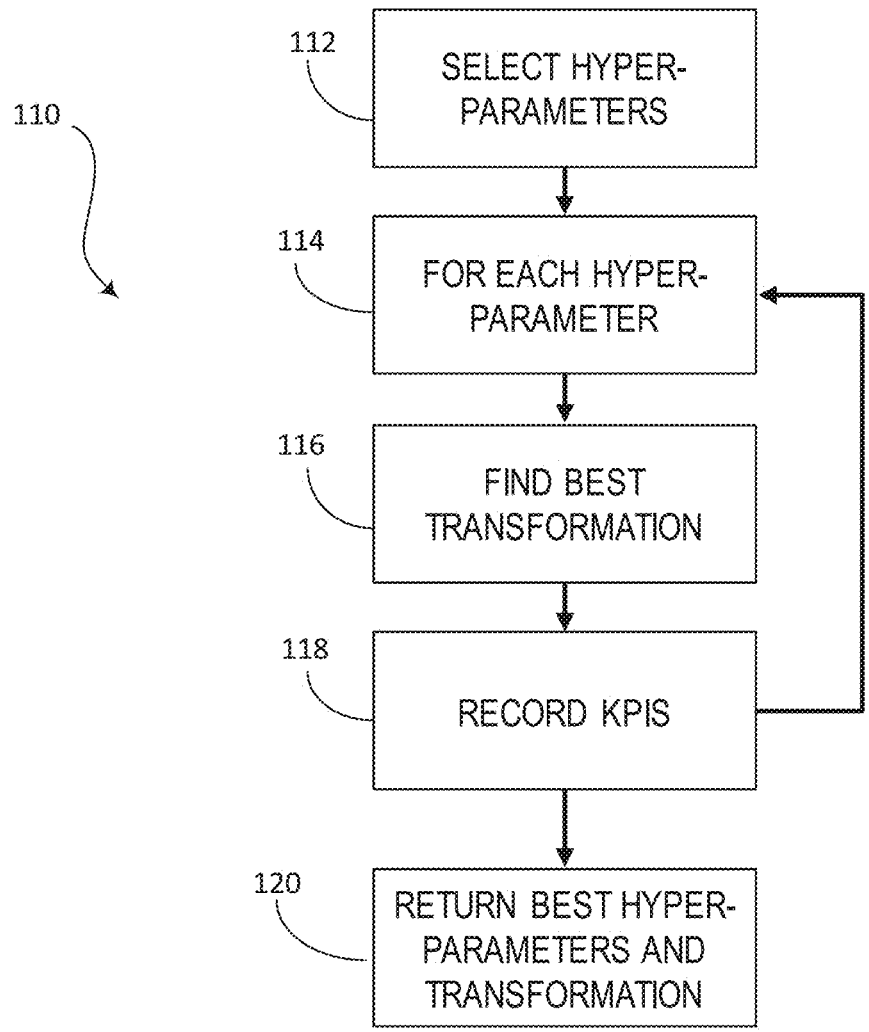
FIG. 8 is a flowchart of a search for optimum hyper-parameters and transformations.

FIG. 8 is a flowchart of a procedure 110 for searching for optimum parameters and transformations. Hyper-parameters of interest are provided to the procedure 110 before pattern detection starts. Transformations are also provided before the procedure 110 starts. The procedure 110 is executed to find the best transformation for optimized hyper-parameters. Key Performance Indicators (KPIs) include Accuracy, confusion matrix (False Positive Rate, False Negative rate), or functions of these.

The procedure 110 includes selecting hyper-parameters (step 112). For each hyper-parameter (block 114), the procedure 110 includes finding the best transformation (block 116) and recording the KPIs (block 118) for the hyper-parameter. The procedure 110 is repeated for each of the hyper-parameters. The best hyper-parameters and transformations are returned (block 120). Transformations, for example, are described with respect to FIGS. 9-12.

Training to Select Single Best Transformation

Figure 9:
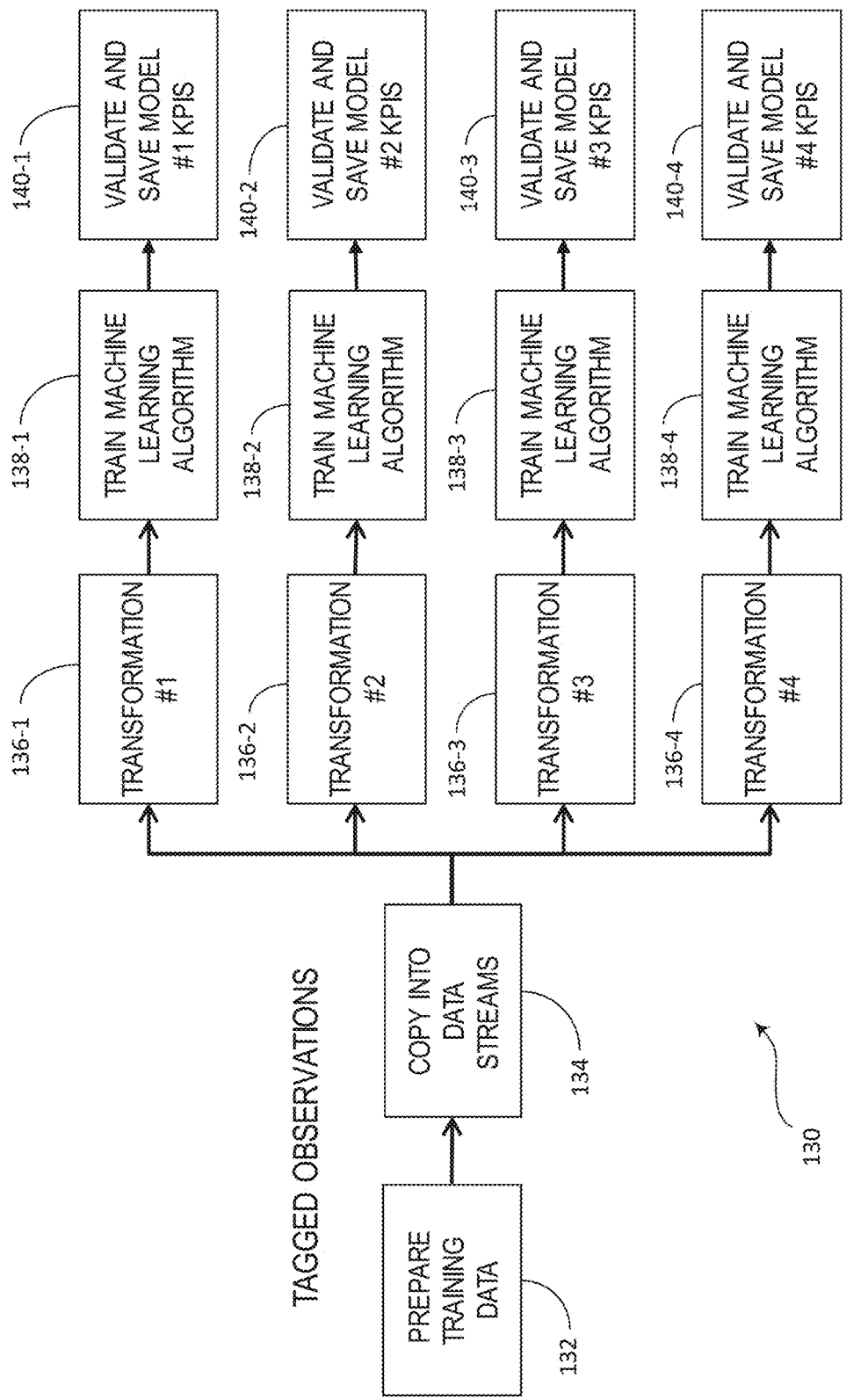
FIG. 9 is a flowchart of training to select a single best transformation.

FIG. 9 is a flowchart showing a method 130 of training to select a single best transformation. Every data transformation is evaluated with the same hyper-parameters given to the machine learning algorithm and the best transformation is chosen for the classification. Note that each training pipeline can be performed in parallel.

The method 130 includes preparing the training data (step 132) and copying the training data into data streams (step 134). In parallel, the method 130 includes performing transformation #1-4 (blocks 136-1 through 136-4), training the machine learning algorithm (blocks 138-1 through 138-4), and validating and saving the model KPIs (blocks 140-1 through 140-4).

Figure 10:
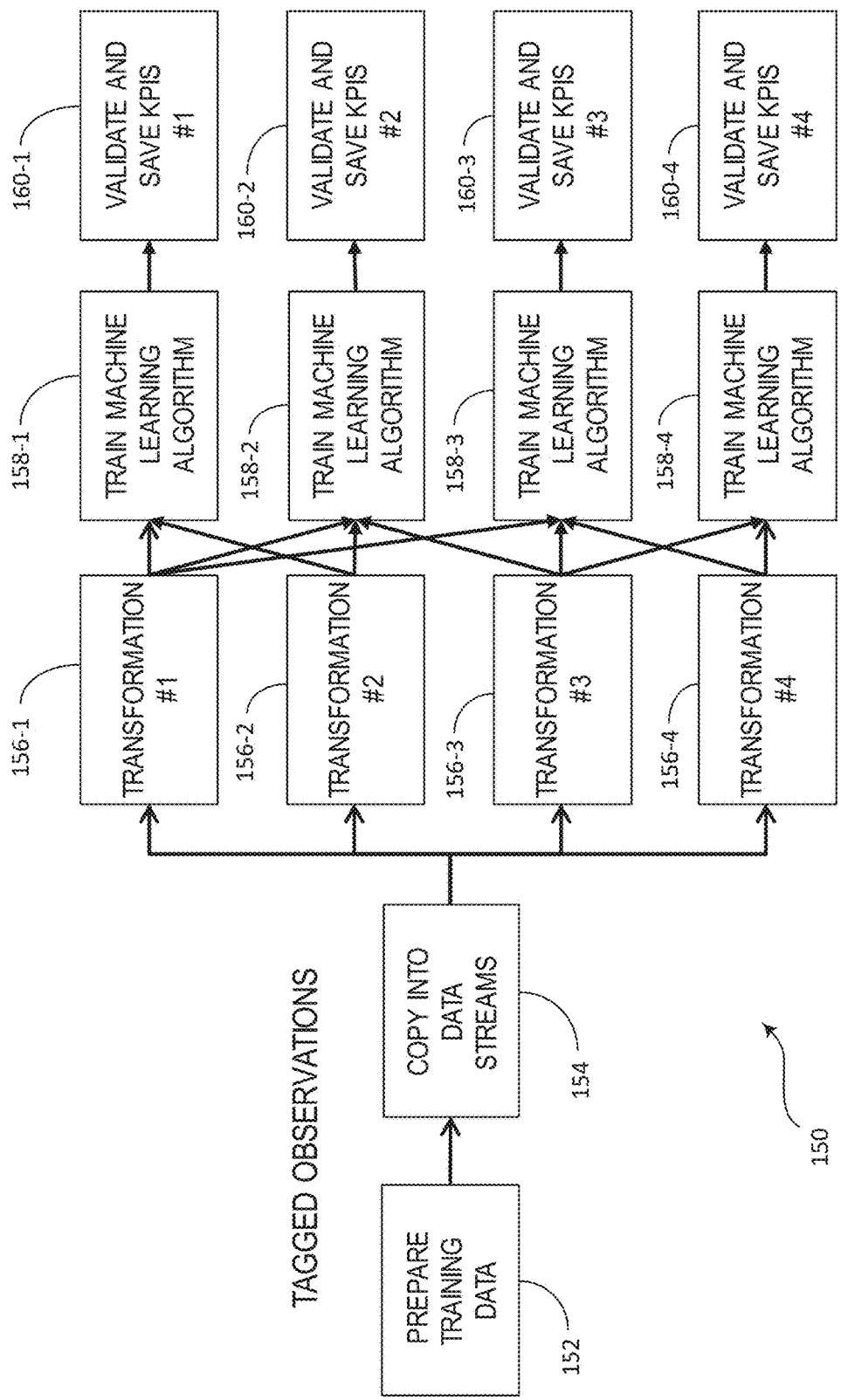
FIG. 10 is flowchart of combining of multiple transformations.

FIG. 10 is a flowchart of a method 150 for combining multiple transformations. The method 150 include preparing the training data (block 152) and copying the data into data streams (block 154). Multiple parallel combinations of data transformation (blocks 156-1 through 156-4) can be used. In this example, the combinations include a first combination (1⊕2) for training a first machine learning algorithm 158-1, a second combination (1⊕2⊕3) for training a second machine learning algorithm 158-2, a third combination (1⊕3⊕4) for training a third machine learning algorithm 158-3, and a fourth combination (3⊕4) for training a fourth machine learning algorithm 158-4. In other embodiments, transformations can be used in series. The method 150 also includes validating and saving the KPIs (steps 160-1 through 160-4) for the four algorithms.

Figure 11:
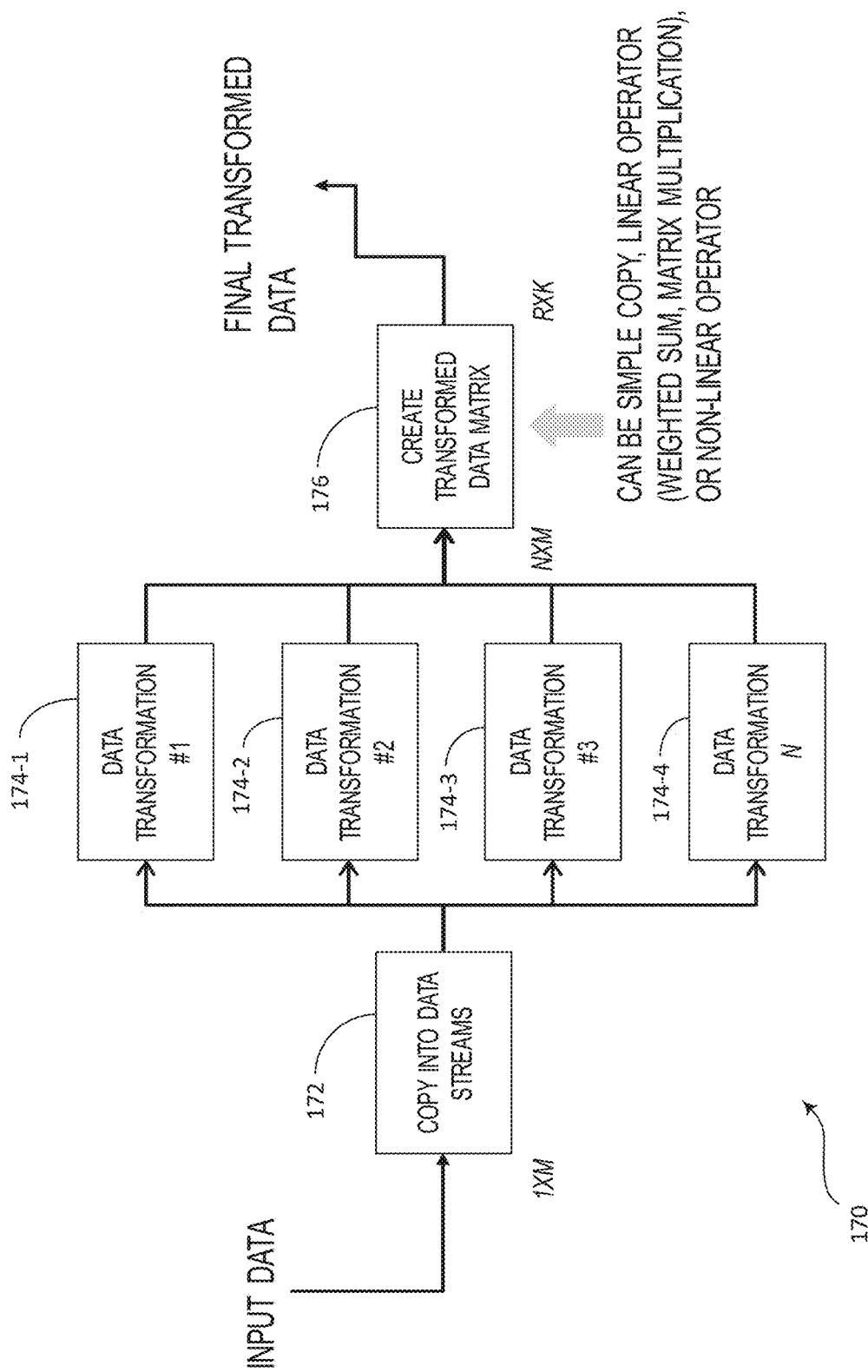
FIG. 11 is a flowchart of combining parallel data transformations.
Figure 12A:
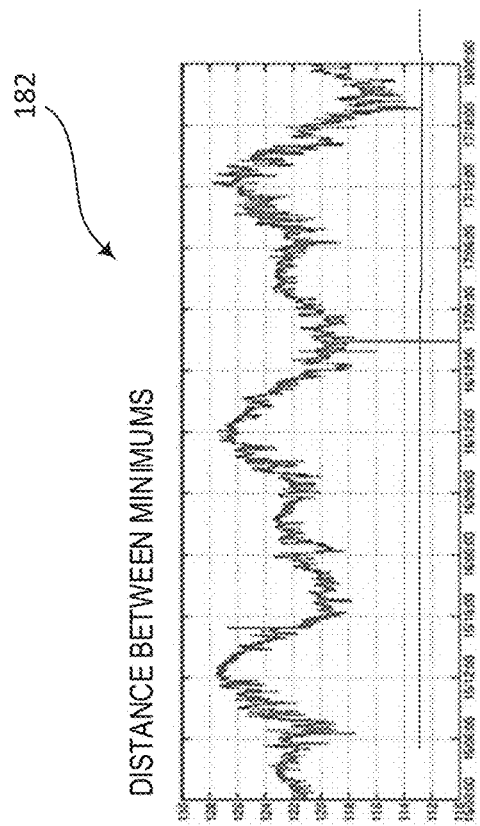
FIGS. 12A-D are graphs of examples of data transformation.
Figure 12B:
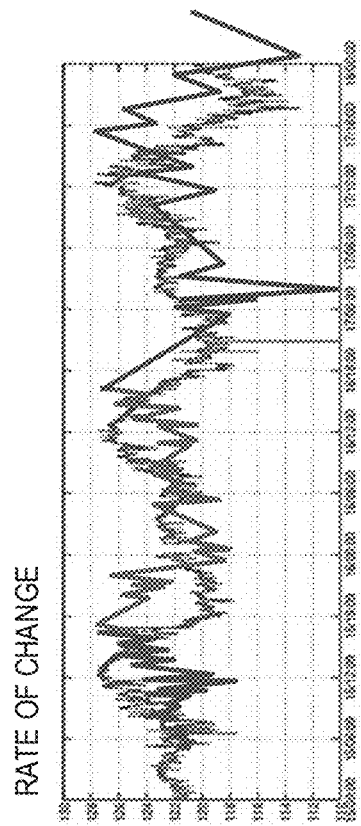
Figure 12C:
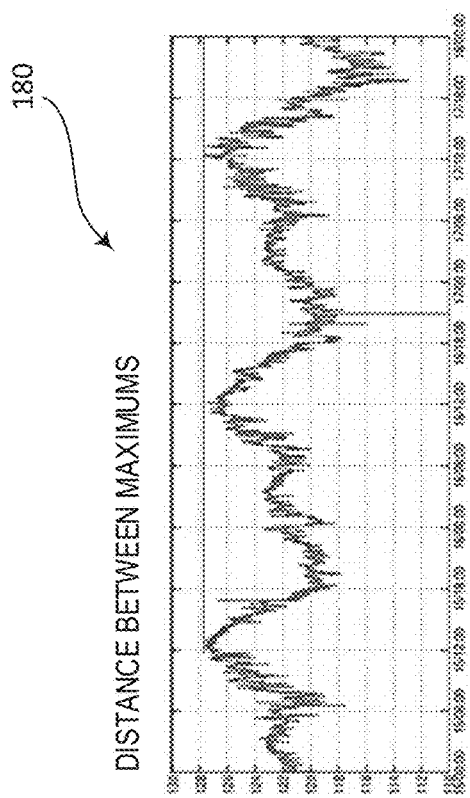
Figure 12D:
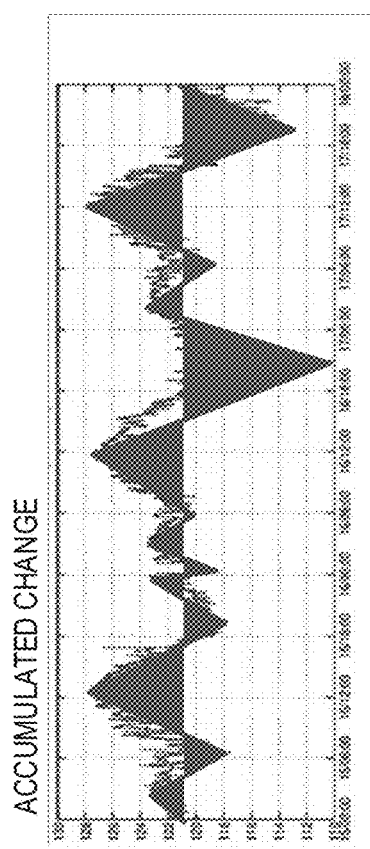

FIG. 11 is a flowchart of a method 170 for combining parallel data transformations. Input data is copied into data streams (block 172). Multiple data transformations (blocks 174-1 through 174-4) can be combined into a single transformed data. Each component data transformation changes the dimensions of the input data, i.e., final data is aligned to the same dimension matrix. Multiple transformations with multiple dimensions may be combined. The method 170 also includes creating (block 176) a transformed data matrix of the data transformations, which can be a simple copy, linear operator (weighted sum, matrix multiplication), or non-linear operator to produce final transformed data.

A preparation step may involve taking the transformed data streams and producing a multi-dimensional stream to be consumed by a machine learning algorithm. The preparation step is selected during the training of the machine learning algorithm. The multi-dimensional scheme may be produced in many ways, such as by:

stacking transformed streams without modifications;
selecting one transformed stream and return it;
obtaining a weighted sum of transformed streams;
multiplying stacked streams by the matrix (multidimensional weighted sum); and
passing stacked streams through a non-linear function (e.g., neural network).

Data Transformation Examples

FIGS. 12A-D show graphs of examples of data transformations. A first graph 180 (FIG. 12A) shows the distance between maximums; graph 182 (FIG. 12B) shows the distance between minimums; graph 184 (FIG. 12C) shows the accumulated change; and graph 186 (FIG. 12D) shows the rate of change. Data transformation includes converting obtained time-series data into a time-series more appropriate for a machine learning algorithm. Other basic transformations may include time-bin measurements, feature extraction (e.g., Principal Component Analysis, or PCA), detecting first difference of samples, etc. FIGS. 12A-D illustrate other example transformations and can be thought of as dimensionality reduction on the time-series data.

Process for Anomaly Detection in Network Data

Figure 13:
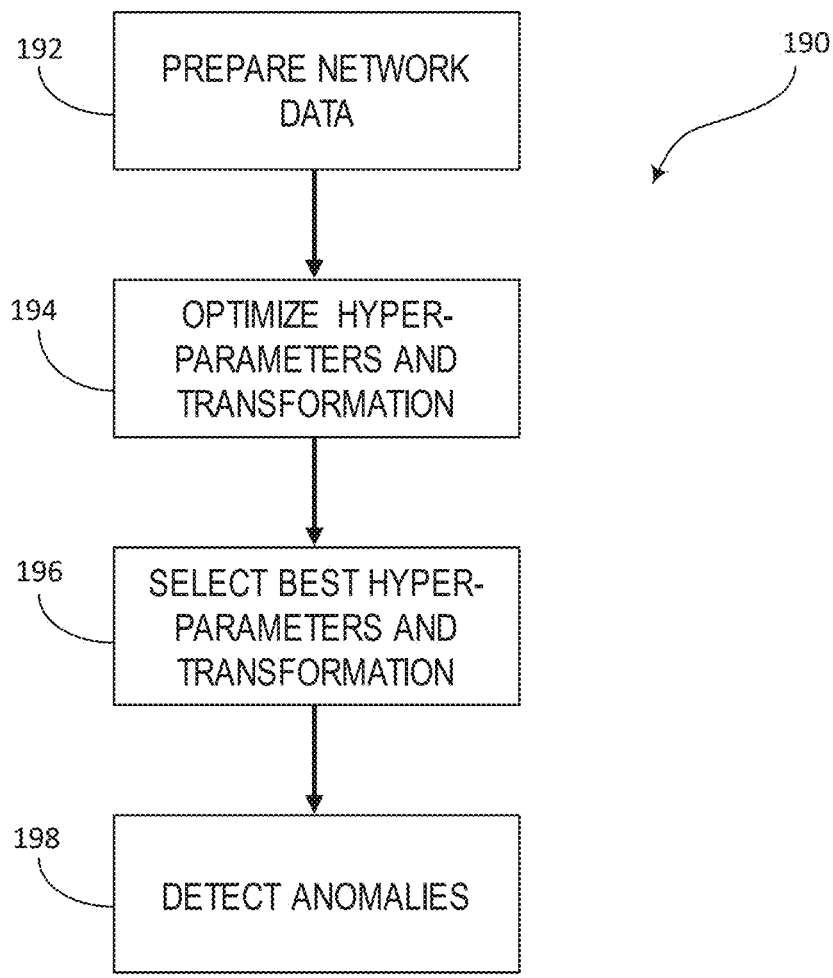
FIG. 13 is a flowchart of a process for anomaly detection in network data.
Figure 14A:
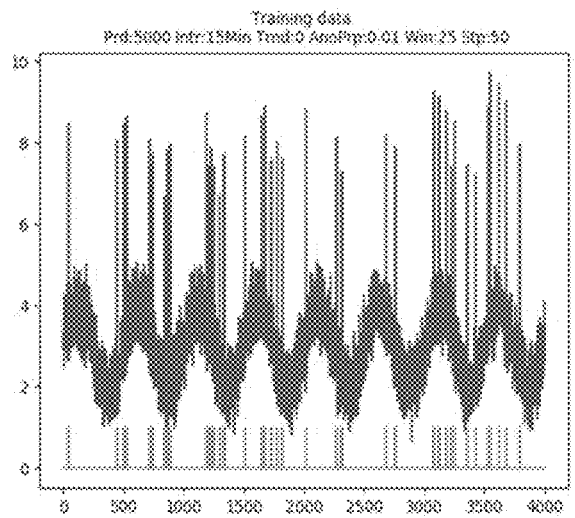
FIGS. 14A-D are graphs illustrating (a) an example of generated, seasonality, and sudden bursts as anomalies are added, with labels indicated for normal and anomalous data; (b) a sliding window applied as a first step of preprocessing; (c) a normal trend added to the data; and (d) data with anomalous abrupt trend change (the representation of sliding window being different for appropriate explanation of concept), a phenomenon known as concept shift.
Figure 14B:
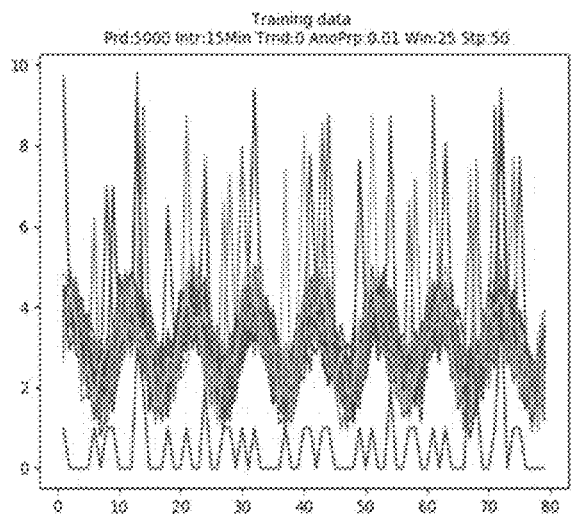
Figure 14C:
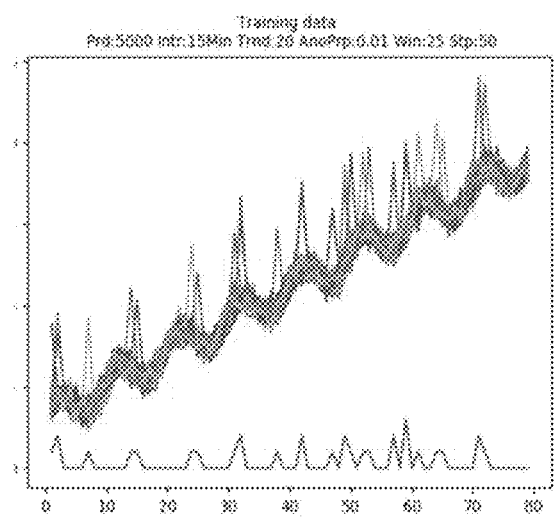
Figure 14D:
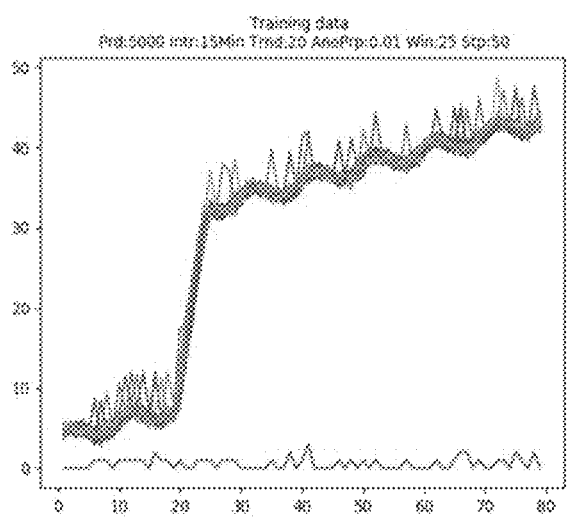

FIG. 13 is a flowchart of a process 190 for anomaly detection in network data. First, network observation data is prepared (block 192). Data may be cleaned to handle missing values, time-bin, etc. Next, optimization or a search is performed for both the hyper-parameters and transformations (block 194). The algorithm is trained with the multiple transformed data. Since many transformed data or their derivatives are given to the algorithm, this may result in multiple models. Data may be transformed into prepared data to improve machine learning performance. A compound data transformation may be constructed from multiple other data transformations. One or more data transformations may be provided to determine, which one, or which combination of them is the best to use with network observations. The machine learning algorithm coupled with a data transformation becomes a new enhanced machine learning algorithm. Third, the best performing model is chosen (block 196). The best model determines the best data transformation, or best combination of data transformations. The best model is selected based on a key performance indicator (KPI) relevant to how the model is going to be used for prediction/classification (e.g. smallest false positive rate, smallest prediction latency, highest true positive rate for a given maximum false positive rate, etc.). It is noted that selecting the model in this way is in fact searched over a hyper-parameter space of models and results in the "optimal" model for the machine learning task at hand. The selection may be performed during the validation stage of the training. Finally, anomalies are detected (block 198) using the best model.

Intelligent Time-Series Pattern Analysis

Time-series data may principally correlate to human behavior, machine dynamics, or any other system that exhibits cyclic patterns. In applications that produce periodic temporal data, effective detection of anomalies generally includes complex, non-trivial, error-prone, and empirical processes. The optimal anomaly detection strategy thus depends on proactive model selection and hyper-parameter optimization by employing meta-learning. Furthermore, deep learning models (i.e., DNNs) create abstract representations that overcome the processing and communication limits and generalize to a variety of data types.

The descriptions herein aim to detect, localize, and classify various anomalies in a large-scale stream constructed by complex and heterogeneous systems, such as network performance monitoring. For comparison, synthetic temporal data was generated and a comprehensive comparison was performed between the performance of meta-learning of machine learning algorithms and deep learning models in detecting anomalies. The findings confirm the necessity of applying meta-learning as an optimal strategy when using traditional models. It has been shown that one-dimensional Convolutional Neural Networks (CNNs) provide an optimal solution for anomaly detection in temporal data as long as the localization of anomaly is not critical. However, to localize the exact boundaries of anomalies, tensors are constructed from time-series data into two-dimensional images format. Moreover, anomaly detection is improved by intuitively adapting state-of-the-art image detection that significantly outperforms prior endeavors. A meta-learning architecture offers a desirable configuration and, combined with deep learning abstraction, exerts ideal solution for anomaly detection and architecture for hybrid meta-learning and lifelong learning that can lead to unsupervised deep learning.

Temporal data often exhibits cyclic patterns that frequently combine with trend and noise as they correlate to humans, machines, or environmental seasonal produced data. Anomalies are deviations from regular patterns of data profiles. Unexpected bursts in time-series data might indicate an engine failure in the context of the Internet of Things (IoT), an intrusion activity or cyber-attack in network traffic data, a heart-attack in ECG data, a record-breaking temperature in winter, etc. Detecting, localizing, and classifying various types of anomalies are important in many applications as they can alarm future failures, protect assets, or change the current path of progress. The real-time anomaly detection in large scale streams constructed by complex and heterogeneous systems is an open research question. The rapid progression of Artificial Intelligence (AI) to a new variety of applications challenges of defining appropriate machine learning solutions in novel environments to leverage interactions with human experts and its associated expenses. Moreover, selecting optimal models and configuring hyper-parameters are generally a complex Nondeterministic Polynomial (NP) hard empirical process, involving an exhaustive search of the entire hyper-parameter space. Commonly, several iterations of trial and evaluation are required to gradually achieve an optimal set-up. However, in temporal data, models become suboptimal as the data can shift drastically. Meta-Learning models have long been suggested in the context of complex hypothesis spaces and to reduce manual intervention. Rudimentary meta-learning models with algorithm ensembles could alleviate the bias and variance of individual models on static data sets. As data sets became dynamic, meta-learning addressed the issue of real-time model selection and auto-configuration through the use of a generalized representational schema. It has been shown that promising results can be provided using meta-learning as a mechanism to incrementally describe the model's architecture and provide more effective and adaptive hyper-parameter optimization.

Recently, DNN processes have drawn researchers' attention to reconsider legacy machine learning approaches. Particularly, the CNNs provide superiority over the traditional models. Notably, the automatic abstraction, learning power, and location invariance are powerful aspects of the method. CNNs produce high-level features by automatically learning the values of filters. The architecture consists of several layers of convolutions often with non-linear activation functions and a finishing classifier layer. DNN learning techniques are described that outperform generic machine learning solutions to localize the exact boundaries of anomalies. It is also shown how to adapt the state-of-the-art masking CNN approach to time-series data and anomaly detection task that exceed prior solutions. Finally, it is shown that a hybrid meta-learning and lifelong learning architecture can lead to achieving a technique for unsupervised deep learning which nevertheless is an open question despite endeavors such as Generative Adversarial Networks (GANs).

Temporal Data

In this section, general guidance is described for an experimental setup and how synthetic time-series data was generated. Further, the properties of temporal data are demonstrated in a simple composition of synthetically generated data and the effects of altering data characteristics on the performance of anomaly detection. Furthermore, it is explained why meta-learning and deep learning are compared for the task of anomaly detection in time-series data.

Temporal and sequential attributes require different treatment compared to the individual time independent instances. The standard approach to demonstrate the performance of anomaly detection in large size time-series data is to first create a controllable abstraction of normal data and then add labeled anomalies. Thus, the properties of the data are specified including the number of sensors, time stamps and interval durations, maximum and minimum range of signals. Next, trend, seasonality, and noise are added to original data and subsequently the probability and amplitude of spikes as anomalies are combined as well as abrupt linear or exponential trend transition, a phenomenon known as concept drift (see FIGS. 14A-D).

As illustrated in FIGS. 14A-D for the preprocessing, a lagging step is employed that slides a window with certain size over the time-series. In order to capture the seasonality correlations, sizes of slides are chosen equal to human behavior activities. For instance, the window sizes could include one day worth of samples, one week worth of samples, one month worth of samples, or samples over any other suitable time period corresponding to the cycles of the signal. Another aspect of defining windows is the decision of how many steps should be taken for each sliding slice which describes the overlap or strides of the window. Additionally, one may want to execute a first difference estimator to eliminate trend and seasonality which might not be an ideal action in case of searching for anomalies that correlate to long-term changes in the time-series of sudden shifts. In the following sections, the disclosure describes the effects of altering data characteristics, preprocessing configuration and models hyper-parameters on the performance of anomaly detection in several machine learning algorithms and various Convolutional Neural Networks to find the optimal set of models and adjustments for every characteristic.

Notation and Background

Theoretical similarities to address using meta-learning or deep learning are the nature of multi-dimensional and heterogeneous streams of temporal data. Limited processing hardware on the edge side, as well as communication traffic and transmitting bandwidth limitations needs an efficient abstraction mechanism. In complex and constantly changing environments, models require adaptation according to the data characteristics. The last but not least issue is a large amount of noisy and unlabeled data.

Solutions in most cases use a raw data process which is not able to reduce dimensionality to representational abstractions. Also, they lack an auto-adaptable real-time system with minimal computational complexity. Moreover, the suggested processes require human intervention which is expensive and do not learn or automatically evolve. Another issue with current solutions is the need for labeled data and are not able to extract labels from knowledge gained from other domains. It is desired to design a dimensionality reduction method that creates abstracted meta-data without losing object, context, or state information. It is desired to define components of an auto-adaptable architecture that performs real-time machine learning on the fly. It is also desired to generalize characterization of data to a meta-model for automatic hyper-parameter adjustment and model selection. Also, methods to transfer knowledge of other experimented domains to the new task or unsupervised labeling of data help in imbalanced datasets anomaly detection problems.

Meta-data abstraction creates an essential representation of information about the data that enables systems to work in a real-time manner. Automatic hyper-parametrization allows the reduction of data-science intervention. Evolution based model selection architecture optimizes the performance based on previous experiences for promising hypothesis spaces. Meta-knowledge transformation brings the knowledge gained from all other experiments and offers solutions to open questions about unsupervised learning.

Searching for anomalous signatures is inefficient and a non-trivial error-prone task which may lead to expensive false alarms. Machine learning methods have long been used to tackle the anomaly detection problems. The main reason is the instance-label nature of supervised algorithms, and attention to individual samples in unsupervised algorithms. Therefore, custom designed preprocessing steps are required to adapt the time-series data characteristics. The same notion applies to model selection and configuration.

Meta-Learning

In a broad type of application that produces sequences or streams of data, machine learning requires continuous adaptation to cope with the data changes over time. Providing models with high accuracy in detecting anomalies is generally a complex Nondeterministic Polynomial (NP) hard empirical process. Models have to be extensively replaced by other algorithms and optimized to avoid under-fitting when the input evolves to a more complex and heterogeneous data. Nevertheless, however, as the data grows with time, the models tend to become more complex and eventually over-fit the data. Techniques to avoid the expansion of data to an explosion point are regularization techniques such as removing old instances or assigning a higher weight to the recent inputs, randomly setting neural network weights to 0 during training, and limiting the magnitude of the weights during training. Occasionally in tasks such as anomaly detection, imbalanced data, or lifelong learning, removing or degradation of old data might not be admissible as the act removes previous rare but valuable instances. In such cases, a better solution is an adaptive model selection and reconfiguration, which is formulated as meta-learning or learning to learn (see FIG. 15).

Figure 15:
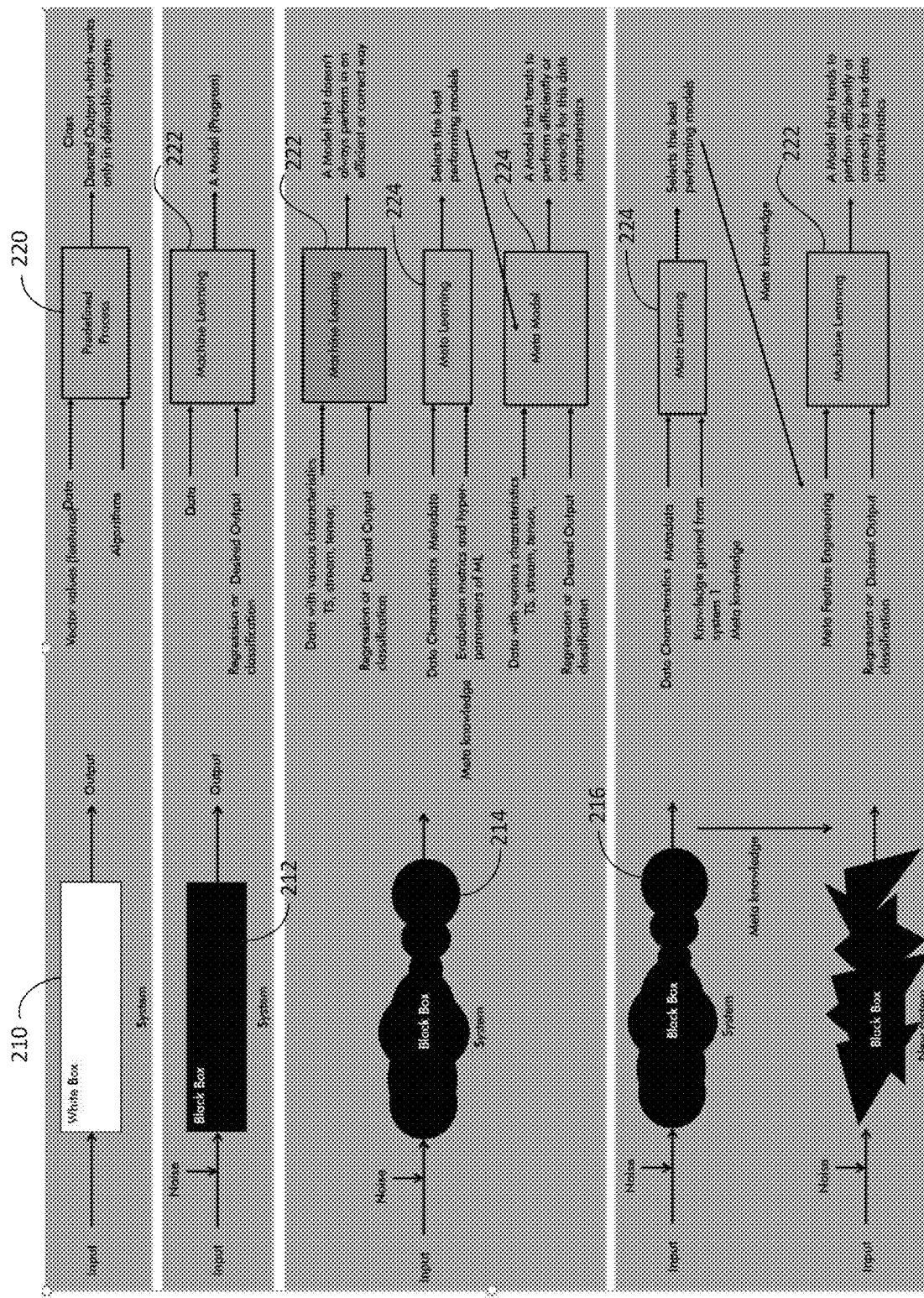
FIG. 15 is a diagram of a comparison of white-box and black-box approaches and the necessity of adaptive systems in complex, heterogeneous, and dynamic systems.

FIG. 15 is a diagram showing a comparison of white-box and black-box approaches and the necessity of adaptive systems in complex, heterogeneous and dynamic systems. For instance, inputs are provided to the white-box 210 and black-boxes 212, 214, 216, 218, which then provide outputs. Noise may be introduced into the inputs to the black boxes 212, 214, 216, 218. The white box 210 may be described as a predefined process 220, which receives data and algorithms and provides desired output which works only in definable system. The black boxes 212, 214, 216, 218 may be described as machine learning 222 and meta learning 224 processes for providing models and selecting the best performing models.

As the real-time detection and the ensuing problem of temporal data abstraction became more pervasive, the need for mechanisms of rapid model configuration became even more accurate. Nevertheless, it is possible to benefit from meta-learning as a solution for model selection and optimization, and then deep learning provides improvements for data abstraction and as an individual model. The time-series object detection and the ensuing problem of abstraction mechanism are pervasive and meta-learning provides solutions for rapid model selection and optimization using the abstracted representation of learned characteristics (as illustrated in FIG. 16).

Figure 16:
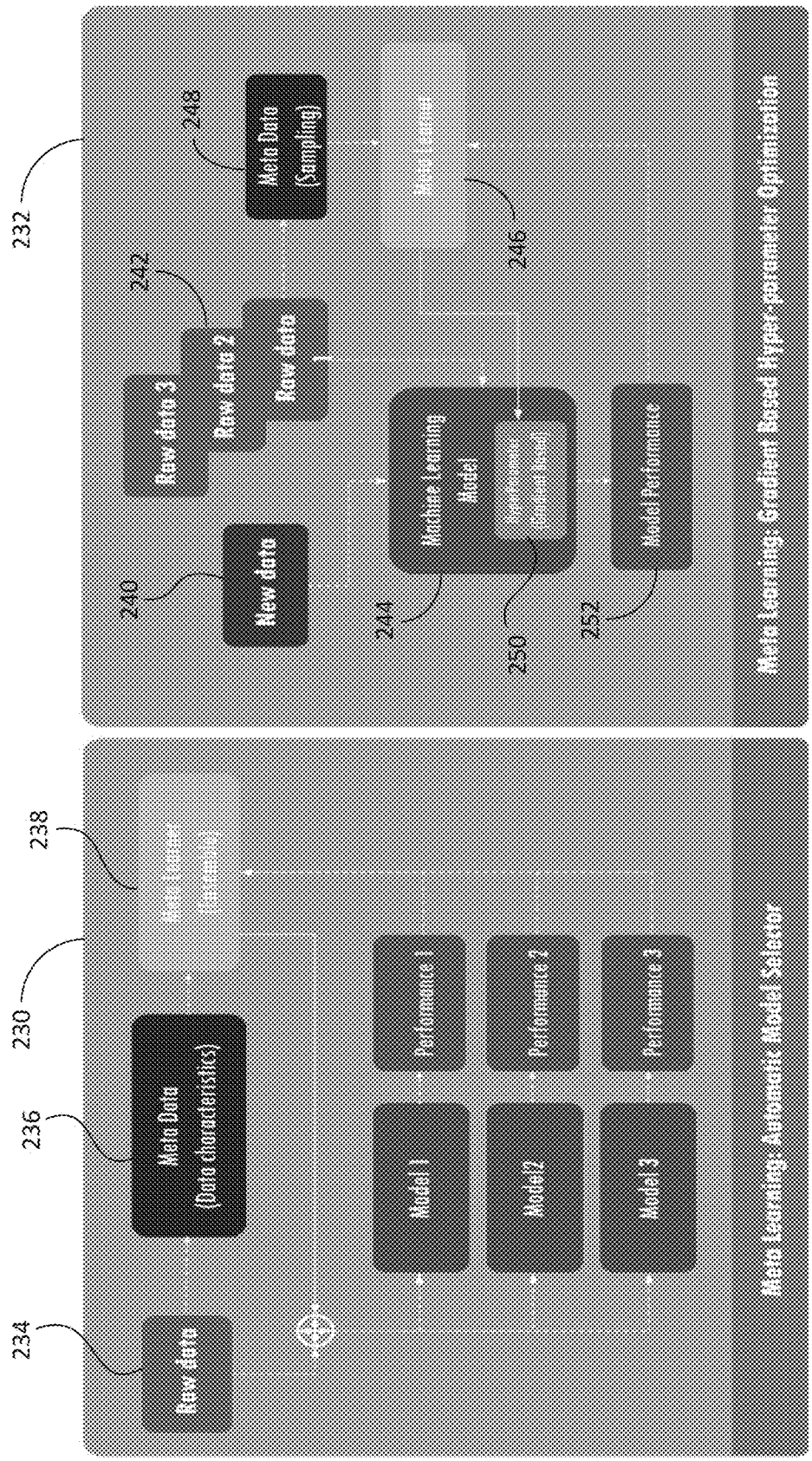
FIG. 16 is a diagram of generic set-ups of meta-learning illustrating the automatic model selection and hyper-parameter optimization which can be gradient based.
Figure 18A:
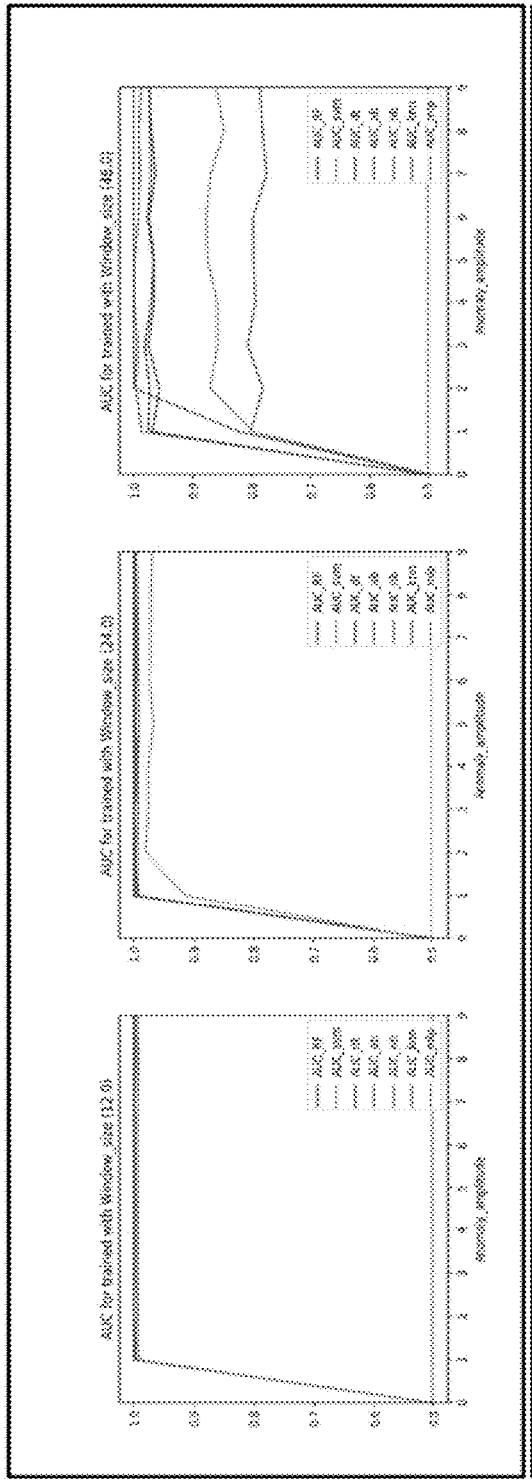
Figure 18B:
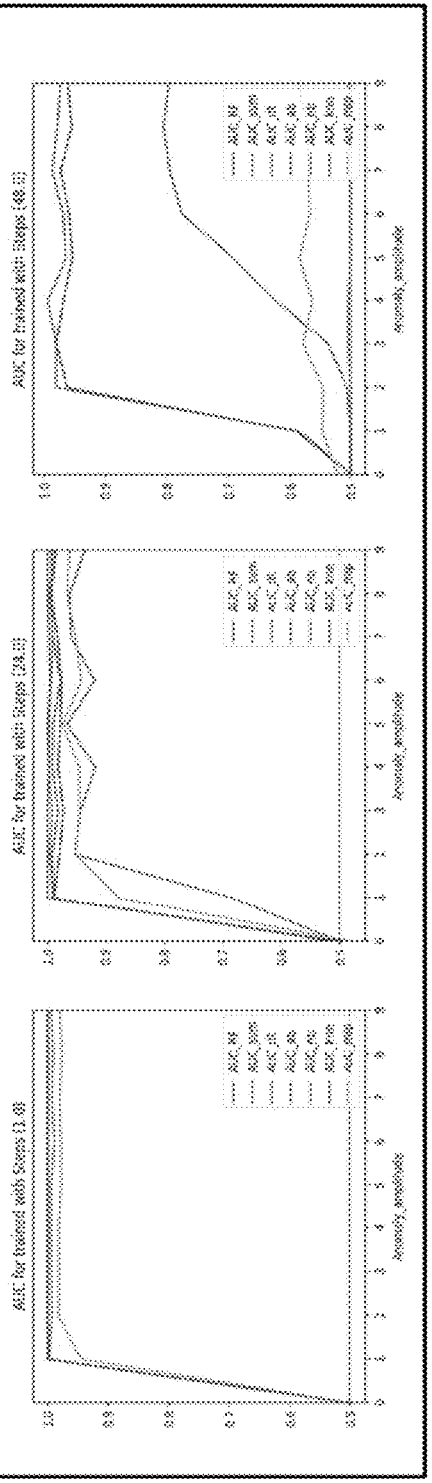

FIG. 16 is a diagram showing generic set-ups of meta-learning systems, which may include an automatic model selection system 230 and a gradient-based hyper-parameter optimization system 232. The automatic model selector system 230 takes raw data 234 and creates meta data (e.g., data characteristics) 236 from the raw data 234. The raw data 234 and meta data 236 are provided to a meta learner module 238. Models 1-3 receive the raw data 234 and the results from the meta learner 238 to provide Performances 1-3, respectively, in parallel. The Performances 103 are also provided to the meta learner 238 for selecting one of the Models 1-3.

The gradient-based hyper-parameter optimization system 232 receives new data 240, sets of raw data 242 (i.e., Raw Data 1, Raw Data 2, Raw Data 3), which are provided to a machine learning model 244. The machine learning model 244 may also receive input from a meta learner 246. Similar to the automatic model selector 230, the meta learner 246 of the gradient-based hyper-parameter optimization 232 receives the Raw Data 242 and Meta Data 248 (e.g., samples). The meta learner 246 then provides an input to the machine learning model 244. The machine learning model 244 may include a hyper-parameter module 250, which may be gradient based. Results of the machine learning model 244 are provided as a Model Performance 252, which is fed back to the meta learner 246.

Configurations-Performance Interaction

Characteristics Effect on Performance: An anomaly detection performance comparison was performed on a simplified version of data to detect the direct effect of changing the configuration on the performance. Seven machine learning algorithms were employed to perform the analogy, including Random-Forest, Support Vector Machine (SVM), Decision Tree, AdaBoost, Naive Bayes, K-Nearest Neighbors, and Multi-Layer Perceptron. In order to eliminate the effects of hyper-parameter configuration on the performance of the model, a Grid-Search was performed over possible ranges for the setting of every hyper-parameter. The First-difference estimator was applied that simplifies the data, but it helps to directly observe the effects of configuration modification on the model performance without worrying about the implications of settings on the characteristics of data and results. The effects of various size of datasets, trends, seasonality amplitude, the probability of the existence of an anomaly in the datasets were used to test the performance of models trained with a certain configuration.

Preprocessing Configuration: Machine learning algorithms require extensive preprocessing steps to be used for pattern detection in time-series. In this part, the effects of various preprocessing configuration are compared on the performance of detecting anomalous instances in temporal data. The use of meta-learning is suggested for automating the manual process of modification.

The plots presented based on models trained with different preprocessing configurations and tested against a variety of data characteristics to define the consequences of each configuration. The Y-axis represents the performance of each algorithm based on Area Under the Curve (AUC) which seems to be an efficient performance score choice for imbalanced data and anomaly detection. The X-axis indicates the data characteristics of the test set. In FIG. 17, the X-axis is the amplitude of anomalies compared to the mean of normal data. In the context of signal processing, it is correlated to SNR. After applying the first-difference estimator, the AUC is compared using different window sizes. Smaller sliding window sizes have higher performance (see FIGS. 17A-B). Also, the comparison between window size and sliding steps shows that higher overlap results in a better performance than windows size (FIGS. 17C-D).

FIGS. 17A-D are graphs with a first-difference estimator applied: (a) the effect of the size of a dataset on performance of algorithms—the X-axis demonstrates the amplitude of anomalies (notice the higher performance of simpler algorithms when data is limited); (b) data with 0.0, 0.5 and 10.0 percent trend; (c) change of seasonality amplitude consequences 0.1, 15 and 40 multiplied to the original seasonality; and (d) the effect of probability of existence of anomaly (1% and 0.1%) in the data;

Meta-Learning

The rapid progression of AI to a new variety of applications uncovered challenges of defining appropriate machine learning solutions in novel environments. Moreover, selecting optimal models and configuring hyper-parameters are generally a complex NP-hard empirical process. Commonly several iterations of trial and evaluation are required to gradually achieve an optimal set-up. However, in temporal data, models become suboptimal as the data can shift drastically. Meta-Learning models have long been suggested in the context of complex hypothesis spaces and to reduce manual intervention. Rudimentary meta-learning models with algorithm ensembles could alleviate the bias and variance of individual models on static data sets. As data sets became dynamic, meta-learning addresses the issue of real-time model selection and auto-configuration through the use of a generalized representational schema.

The following Table 2 illustrates the average of achieved AUC of models compared to meta-learning while the first-difference estimator was applied

|  | Few Data | High Trend | High Amplitude Seasonality | Low Anomaly Probability | Large Window | Large Steps |
| --- | --- | --- | --- | --- | --- | --- |
| Meta-Learning | 92.58 | 90.01 | 94.27 | 99.0 | 98.99 | 92.23 |
| Random Forest | 51.97 | 67.13 | 92.02 | 99.0 | 96.99 | 50.93 |
| SVM | 50.0 | 88.96 | 50.0 | 50.0 | 50.0 | 50.0 |
| DT-C4.5 | 59.79 | 66.57 | 87.23 | 99.0 | 78.57 | 92.16 |
| AdaBoost | 54.38 | 66.50 | 90.04 | 95.89 | 96.87 | 90.71 |
| Naive Bayes | 92.58 | 50.0 | 94.27 | 99.0 | 98.98 | 50.0 |
| kNN | 50.0 | 70.79 | 66.19 | 56.05 | 93.92 | 64.03 |
| MLP | 66.10 | 84.66 | 90.05 | 95.0 | 85.14 | 55.18 |

FIGS. 18A-D are graphs with the first-difference estimator applied. Group (a) of the graphs includes a comparison of Area Under the Curve (AUC) performance metrics using different window sizes (i.e., size 24 for the left chart, size 48 for the middle chart, and size 96 for the right chart of group (a)). According to tests, the smaller sliding window sizes appear to have higher performance. Group (b) of the graphs shows the effect of the overlap sizes of sliding window on the AUC performance metrics. For example, according to testing, the smaller strides appear to result in higher AUC. Group (c) of the graphs shows the comparison between window size and sliding steps when amplitude of anomalies is changing. It appears that higher overlap results a better performance than windows size. Also, the group (d) charts compares the effects of window size and overlap with various trends in the test-set. As FIGS. 18A-D illustrate, the performance of machine learning algorithms trained with particular data characteristics may depend on different trends in test sets. In this example, 50,000 samples of data were used, where the first 80% of the data samples were used for training. Then, a variety of data with different trends was generated and used to account for the last 20% of the test-sets to evaluate the model.

Experiments were conducted on time-series data to evaluate the effects of data characteristics on the performance of different choices of preprocessing and individual machine learning models. After generating synthetic time-series datasets, an experiment compares the performance of different machine learning models trained with a certain data while tested against various characteristics. The probability of existing anomalous incidents in the data and amplitude of anomaly have positive correlations to AUC. The trend in data on the one hand (and seasonality on the other hand) has a negative correlation to AUC.

Preprocessing examinations show negative correlations between size of sliding windows and the performance of algorithms similar correlation observed with steps of slices. Further results show higher effectiveness of smaller steps compared to smaller slices in achieving better AUC, both in case of changing amplitudes of anomalies and trend in data (see FIGS. 19A-B). By using a meta-learning mechanism, a framework is proposed for detecting classified outliers and detecting novel anomalies.

FIGS. 19A-B are graphs of a comparison of the performance of machine learning algorithms on different trends. The graphs in group (a) utilize 50,000 samples of data, where 80% are used for training. The left plot of group (a) shows the results of a model trained with no trend in training data and tested against different data with various trends. The middle plot of group (a) shows a model trained with 5% trend in training data and tested with various percentages of trends in test datasets. The right plot of group (a) is the performance that can be obtained using meta-learning method. In the graphs in group (b), 500,000 time stamp data samples are used for training and testing with similar percentages.

The analysis of Table 2 above reveals interesting effects about the behavior of each algorithm in tackling various data characteristics. There is no algorithm that outperforms others in all cases. Surprisingly, the meta-learning method provides even better results by selecting most successful algorithm according to the data properties. Despite the fact that the first-difference estimator eliminates several important features of data and in several cases it is not a suitable preprocessing step, it still is not able to entirely boost the performance to the maximum in a higher percentage of trend or amplitude of seasonality.

Deep Learning

Deep learning, particularly DNNs such as Convolutional Neural Networks (CNNs), provides improvements for data abstraction and individually offer effective models. Convolutional Neural Networks (CNNs) have become popular for their abstraction power and location invariance. CNNs produce high-level features by automatically learning the values of filters. The architecture includes several layers of convolutions often with non-linear activation functions and a last classifier layer. A comparison is performed between traditional and deep learning techniques in terms of anomaly detection performances and processing requirements.

Detecting Patterns and Anomalies Using CNN

Recurrent Neural Networks make more intuitive sense for time-series data, speech recognition and Nonlinear Programming (NLP) as the structure is sequential, but it turns out that CNNs usually perform much better in these cases. CNNs are fast and efficient in terms of representation as filters are learned automatically. Padding (wide convolution) can be used, when the filter is relatively large compared to the input size. Applying sliding window functions (e.g., kernel, filter, etc.) to the input matrix often for each channel (i.e., RGB or embedding) results in a system with the ability of detecting anomalies regardless to their positions. Multiplying an n*n filter, adding with different or equal weights, and choosing maximums results in achieving compositionality and high-level abstraction with more generalization. Also, edge elements can be detected by adding zero padding. Stride size defines the filter shift at each step, where larger stride sizes lead to fewer applications of the filter and a smaller output size. In the literature, typically stride sizes are one, but large stride sizes behave similarly to an RNNs. Generally, pooling layers apply, after the convolutional layers, to sub-sample their input. The common pooling operation is max-pooling which could pool over the complete output or a window. Pooling provides a fixed size output matrix required for classification, while keeping the most salient information regardless of the size of filters or input. Pooling provides invariance to shifting and rotation and allows use of variable size windows, sentences, etc.

One-Dimensional CNN

Deep learning-based pattern detection is much simpler and quicker to train and has a better detection performance than the classical approaches. Instead of pixels, time-series data, speech signals, sentences, or documents represented as a matrix can be used as inputs. Each row of the matrix corresponds to one window or a token, typically a certain period of time or word. For low-dimensional representations, abstractions such as Fourier transformed signals or word embeddings can be used. A one-dimensional CNN is used for this purpose as the architecture illustrated in FIG. 20, which is a meta-learning based framework for anomaly detection in large-scale networks, and FIG. 21, which is a block diagram of an architecture of a one-dimension CNN for generally detecting anomalies.

Figure 20:
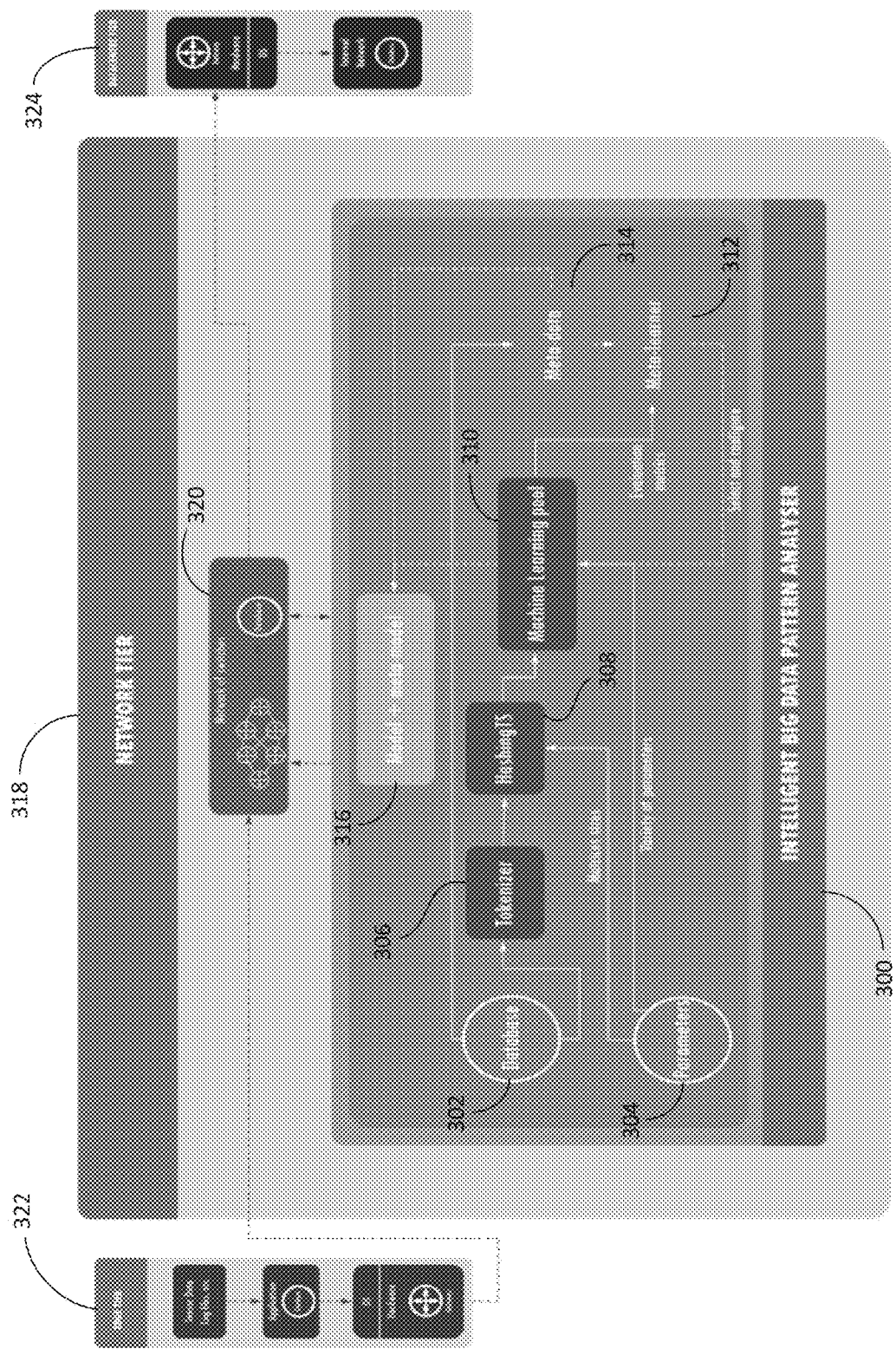
FIG. 20 is a meta-learning based framework for anomaly detection in large-scale networks.

FIG. 20 shows an intelligent big data pattern analyzer 300, which may use data from a database 302 and parameters 304. Data is provided from the database 302 to a tokenizer module 306, a HashingTS module 308, and machine learning pool 310, which provides evaluation metrics to a meta-learner 312. The meta-learner 312 also receives meta-data 314 of data from the database 302 and feeds selection and configuration results back to the machine learning pool 310. Matrices sizes of the parameters 304 are provided to the HashingTS module 308 and a variety of parameters of the parameters 304 are supplied to the machine learning pool 310. A Model+meta-model module 316 receives input from the machine learning pool 310 and meta-data 314. The intelligent big data pattern analyzer 300 may exist in a network tier 318 and be connected to the network through a network of switches 320, which may be connected to an edge tier 322 and a data center tier 324 for detecting patterns of network traffic.

Figure 21:
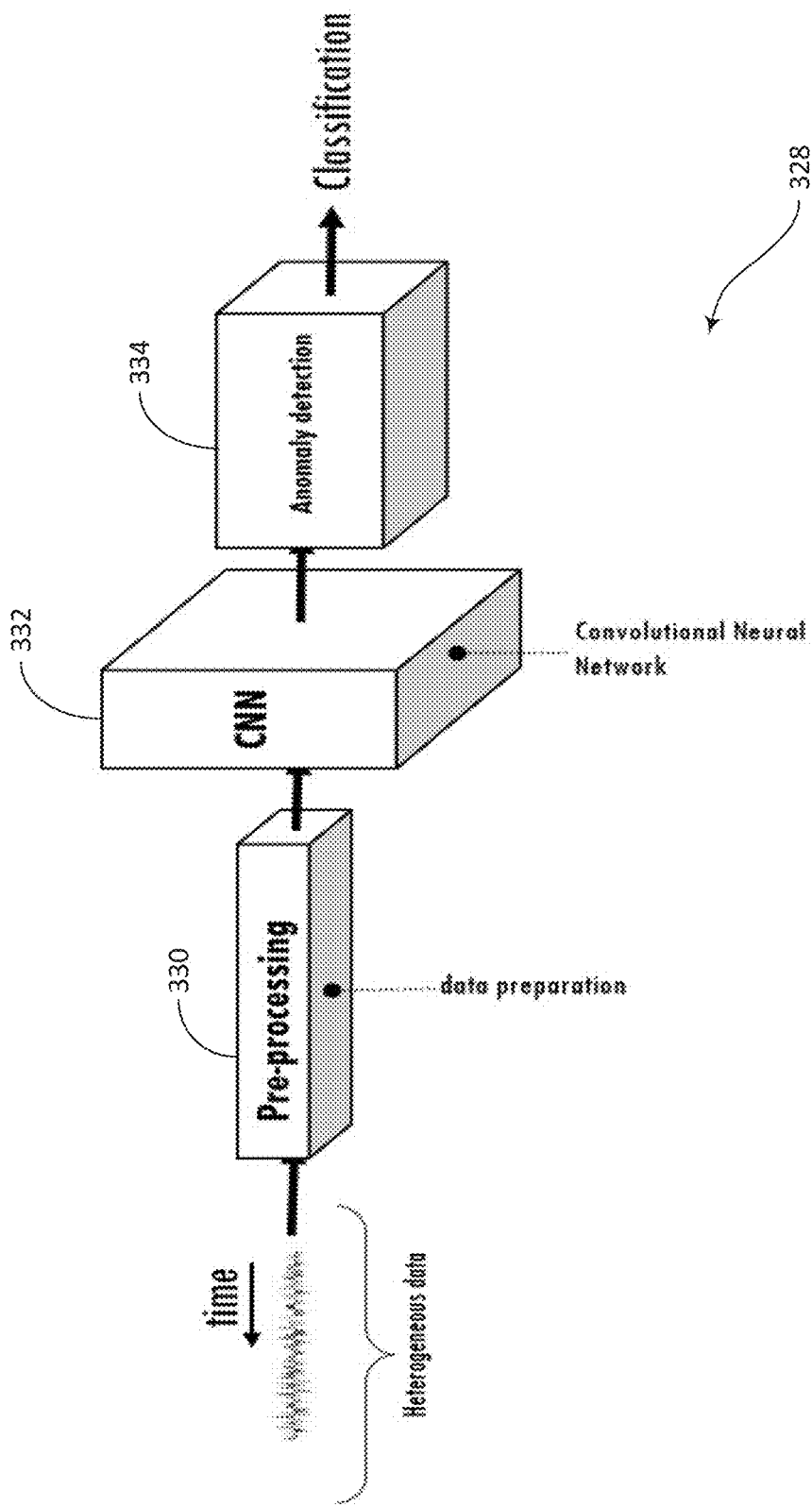
FIG. 21 is a block diagram of an architecture of a one-dimension CNN for detecting anomalies.

In FIG. 21, the 1-D CNN algorithm 328 is shown in block form for detecting patterns in time-series data obtained from a generic system. The generic system, for example, may include a network for analyzing network traffic or any other system in which patterns can be detected from time-series data. As shown in FIG. 21, time series data inputs (e.g., heterogeneous data) may be provided to a preprocessing section 330, which may be used to create slices of the raw data for data preparation. A CNN block 332 learns the representations of normal and anomalous data and generates labels. An anomaly detection block 334 receives the data and labels and may have an adjustable threshold that defines the normal/anomaly points for classification.

Figure 22C:
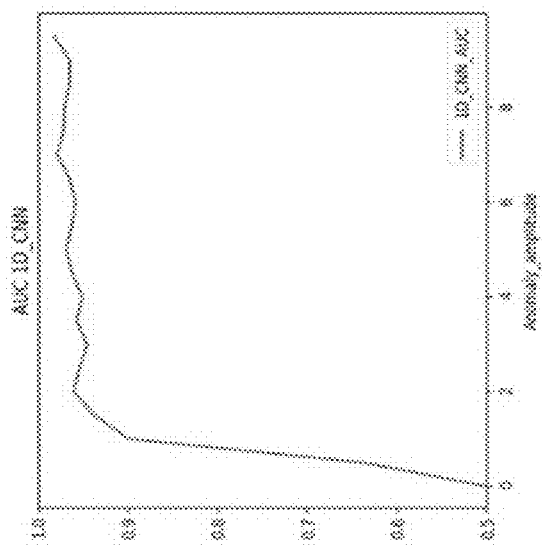
FIGS. 22A-C are graphs—(a) MLP had the most stable performance based on our first section performance comparison, (b-c) one-dimension CNN boosts the performance to a highly stable level of performance. Deep learning wins over the meta-learning method, both in terms of accumulated AUC and stability of results.
Figure 22B:
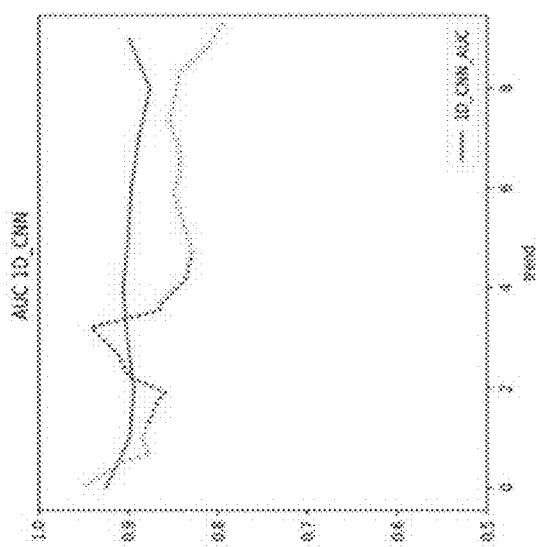
Figure 22A:
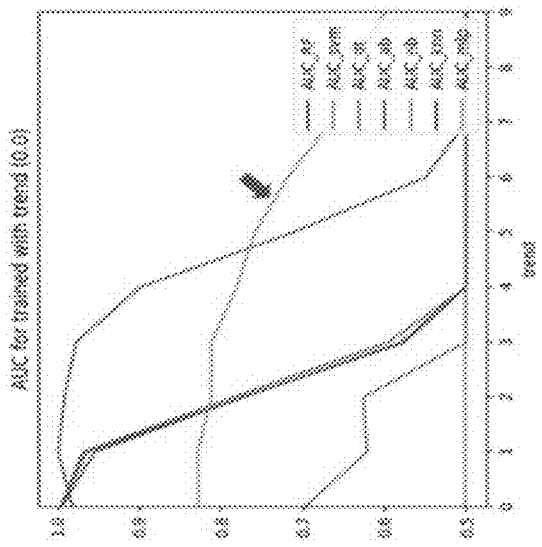

FIGS. 22A-C are graphs showing results of the 1-D CNN algorithm 328 of FIG. 21, where graph (a) charts the results of a Multi-Layer Percetron (MLP) algorithm applied to time-series data. The MLP chart appears to provide the most stable performance based on a section performance comparison. Graphs (b) and (c) plot the results of one-dimension CNN, which appears to boost the performance to a highly stable level of performance. Deep learning may be preferable over the meta-learning method, both in terms of accumulated AUC and stability of results.

As illustrated in FIGS. 22A-C, the graphs show that the deep learning wins the comparison by having a higher performance in detecting anomalies and it provides a very stable detection quality for any data characteristics. CNN-based pattern detection is much simpler and quicker to train and has a better AUC performance than the classical approaches. In general time-series data, 1D-CNNs can be used for features that depend on short consecutive subsequences of the input and in which location of the feature is not important. In anomalies with local relationships and repetitive presence, the structure of CNNs provides high performance in detection. However, it may be important to localize the occurrence of the event. Despite close results for overall AUC performance, deep learning wins the comparison as it provides a very stable detection quality for essentially any data characteristics (see Table 3).

TABLE 3

Meta-Learning Vs. Deep Learning Performance

| Method | AUC (Accumulated) |
|---|---|
| Meta-Learning | 88.98% |
| Deep Learning (1D CNN) | 90.10% |

Localization of Anomalies

In many applications, it may be advantageous to localize the position of the anomaly with higher resolution than only addressing the slice of the sliding window. Time-series classifications such as in supervised Anomaly Detection and Categorization require positional features as the one-dimensional pooling operations lose information about the localization of the sequence. Therefore, a two-dimensional setup may be used, as explained below. The 2D design may also be more intuitive for a human operator as the data and the effects of algorithms can be observed.

Two-Dimensional CNN

Figure 23C:
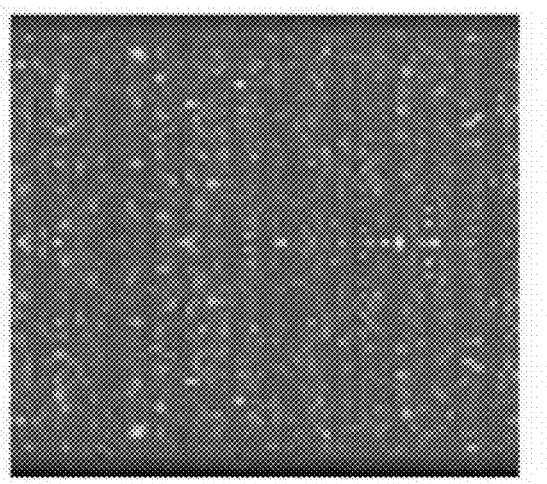
FIGS. 23A-C are graphs of (a) a heat-map of two-dimensional representation of time-series data—seasonality can be seen as vertical shades; and (b-c) Fourier transformed data.
Figure 23B:
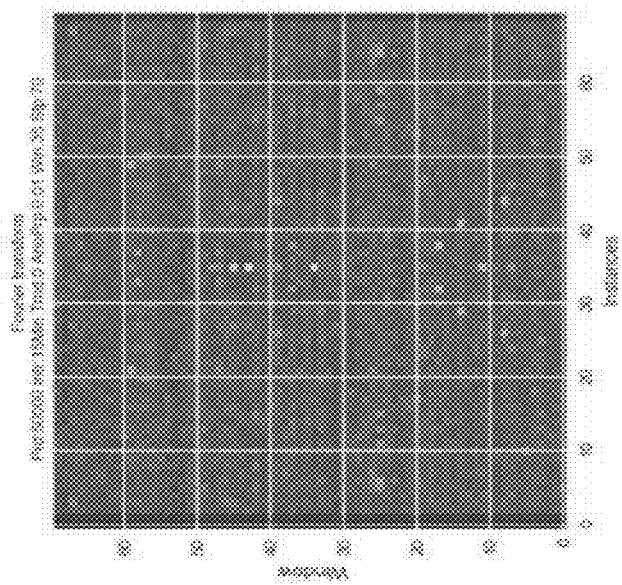
Figure 23A:
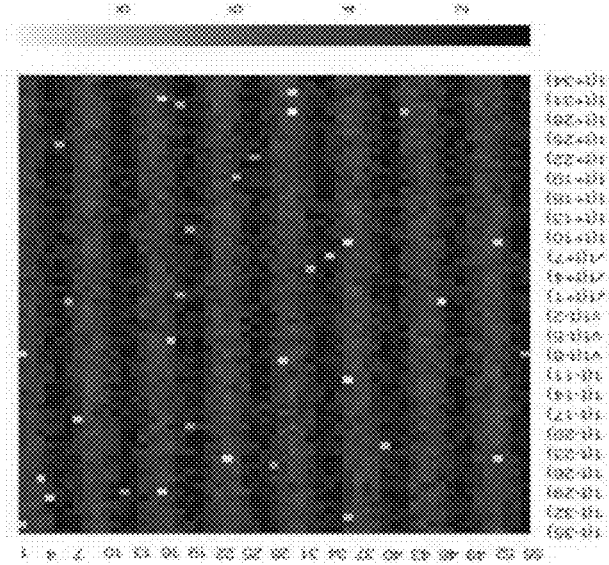

The performance of pattern detection using two dimensional CNN is illustrated. The approach can be applied to tensors of multiple time-series data from several sources. After obtaining two-dimensional windows from the time-series (see FIGS. 23A-C, which are graphs of (a) a heat-map of a two-dimensional representation of time-series data, where seasonality can be seen as vertical shades; and (b-c) Fourier transformed data). A back-propagation algorithm is performed to train a 2D CNN.

Figure 24:
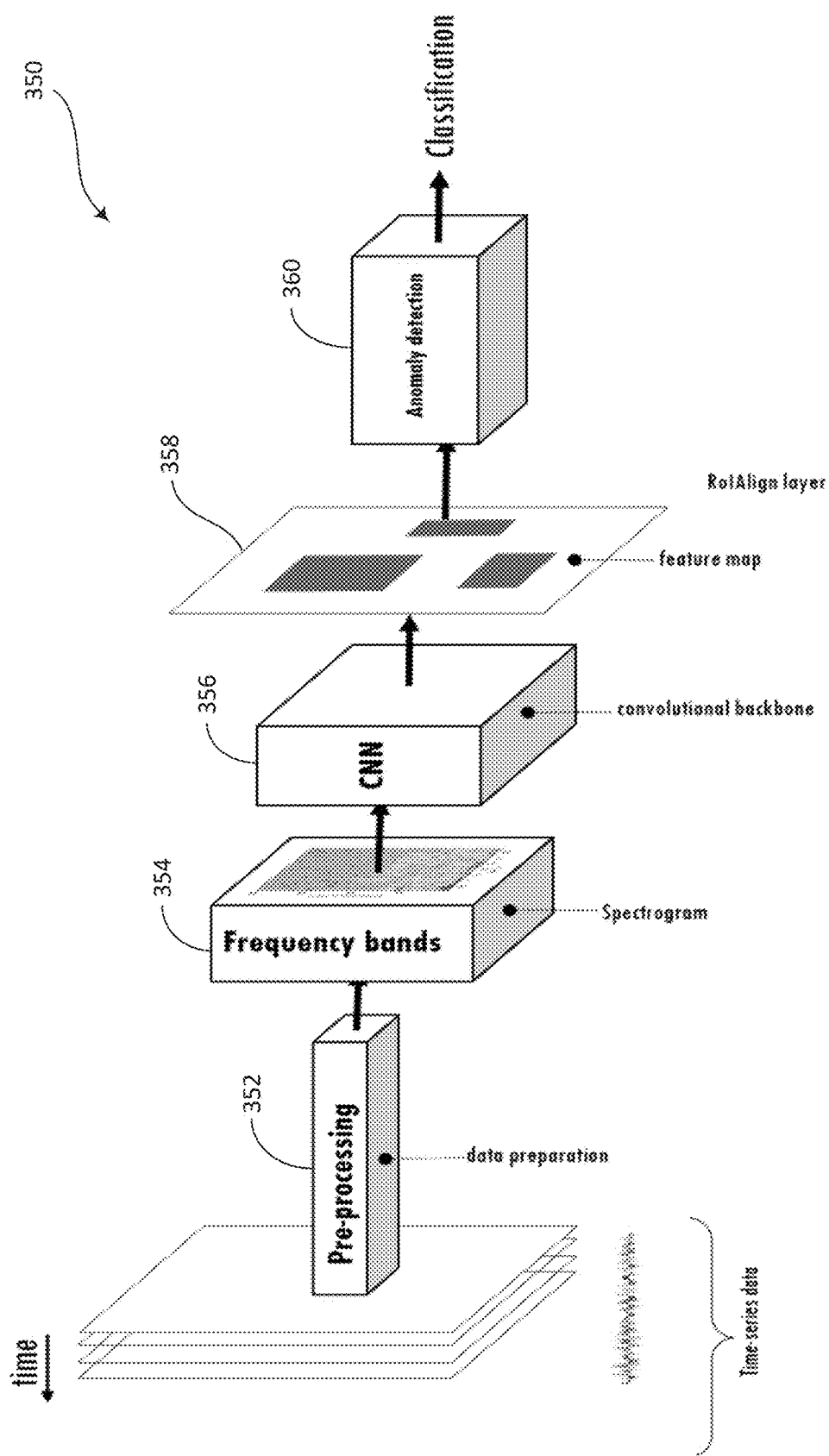
FIG. 24 is a block diagram of the architecture for two-dimensional CNN.

FIG. 24 is a block diagram of the architecture 350 for 2D CNN. A pre-processing block 352 transfers the time-series data in raw format from one or several sensors for data preparation to a two-dimensional representation. A frequency bands block 354 can be employed that applies a Fourier transform, for instance. A two-dimensional CNN module 356, which may be the convolution backbone of the 2D CNN 350, learns the normal and anomalous data. The two-dimensional CNN module 356 creates a feature map 358, which may include rectangular bounds that surround anomalies. An anomaly detection block 360 may be used to define the normal/anomaly threshold for classification. The thresholds can be adjustable by the anomaly detection block 360. Classifications such as supervised Anomaly Detection, Sentiment Analysis, or Topic Categorization can be performed using CNNs, but require positional features for the input as the pooling operations lose information about the localization of the sequence.

Figure 25B:
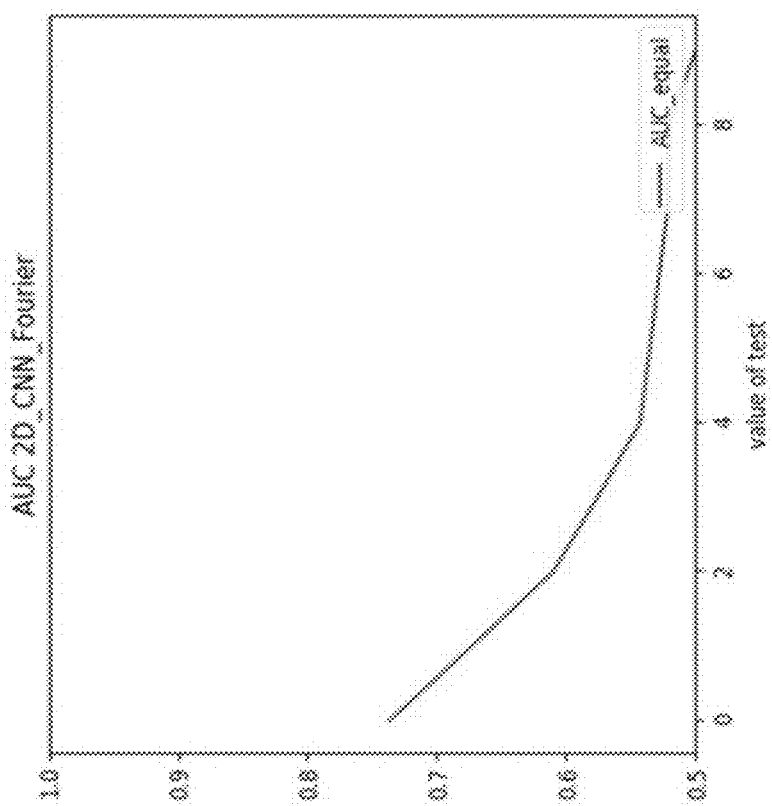
FIGS. 25A-B are graphs of the performance of the two-dimensional CNN of FIG. 24.
Figure 25A:
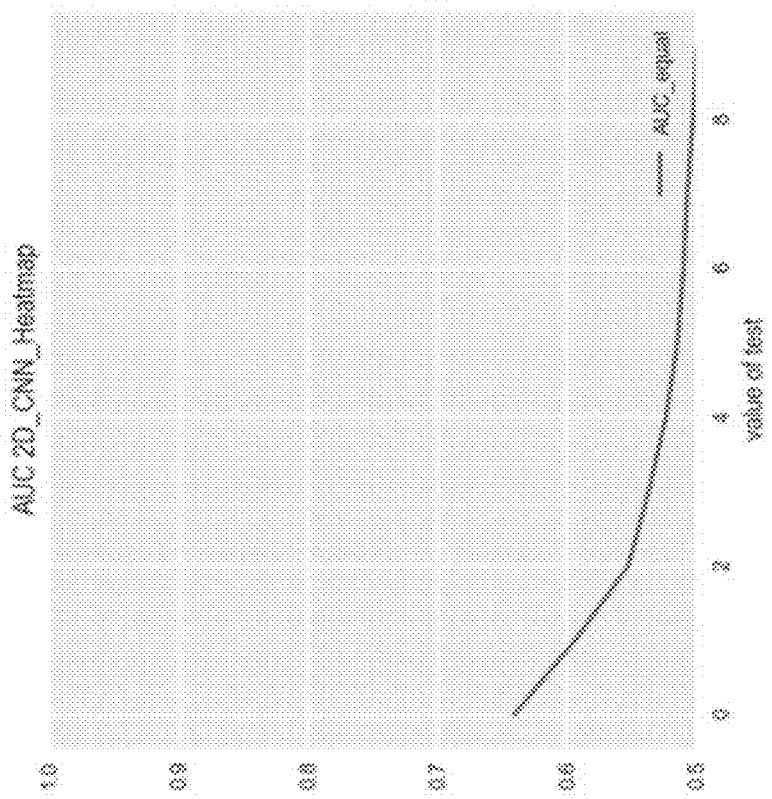

FIGS. 25A-B are graphs of the performance of a two-dimensional CNN, such as the 2D CNN 350 of FIG. 24. The reason for the lower performance of 2D CNN in detecting patterns and anomalies might be the result of the nature of anomalies that are scattered. Therefore, 2D CNN that has a rigid shape of bounds for surrounding anomalies has to create large rectangles and may not be able to efficiently pinpoint individual anomalies. The solution seems to be a method that creates flexible shape bounds. This method is investigated in the next section.

Feature Masking CNN

Going beyond a two-dimensional CNN, a similar procedure can be used with a regional convolutional neural network (R-CNN). The R-CNN conceptually takes the two-dimensional image, separates out multiple non-overlapping image regions and applies pattern detection to each region in parallel. Using this approach, it is possible to examine the time-series for multiple different overlapping patterns. Generally speaking, R-CNN may have the highest pattern detection capabilities. It uses the special structure of the underlying CNN to find a very precise border around the pattern in the image. This contrasts with the CNN, which may typically use a square bounding box, which introduces noise. Another advantage of using an R-CNN is that it can examine larger two-dimensional windows and find multiple types of patterns. The larger window may result in better precision. While finding multiple patterns is possible with a CNN, this must be done in series. The advantage of the R-CNN, however, is that it can find multiple patterns in parallel.

Figure 26:
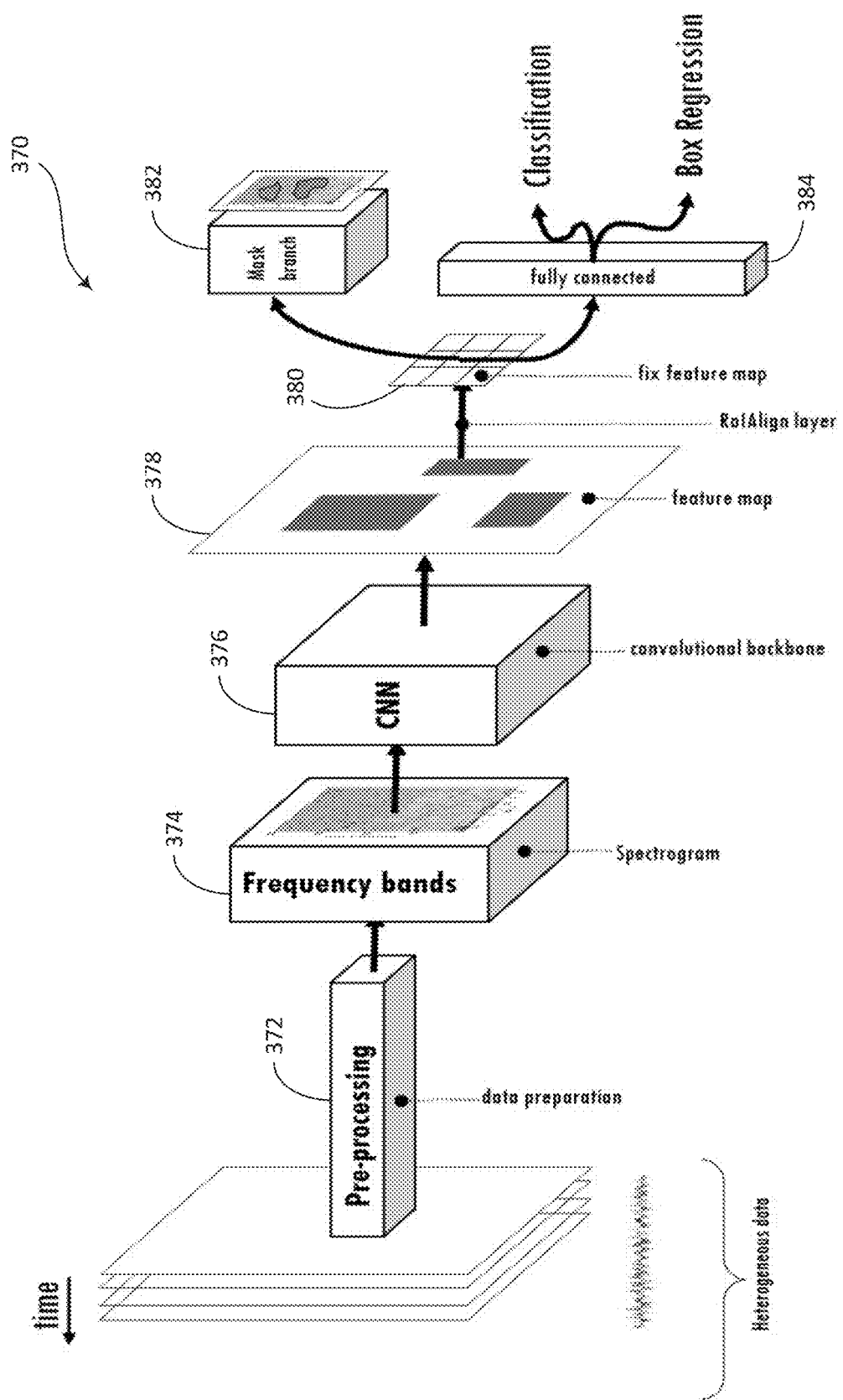
FIG. 26 is a block diagram of a feature-masking convolutional neural networks architecture.

FIG. 26 is a block diagram of a feature-masking convolutional neural network architecture 370. The pre-processing block 372 transfers the time-series data in a raw format from one or several sensors to a two-dimensional representation. A frequency-bands block 374 can be used to apply a Fourier transform. A two-dimensional CNN module 376 learns the normal and anomalous data and creates a feature map 378, which includes rectangular bounding boxes that surround anomalies. The rectangular bounds may be reshaped to fixed squares within a fix feature map 380. A masking branch block 382 creates flexible boundaries that can explicitly surround anomalies. A fully connected block 384 provides classification and box regression.

Figure 27B:
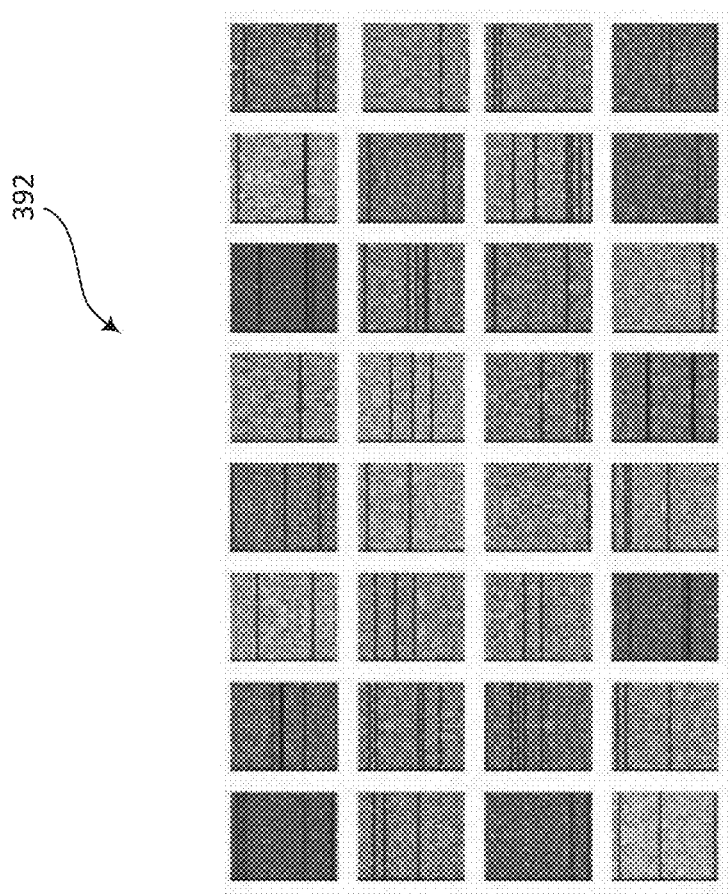
FIGS. 27A-B are graphs illustrating the results of masking using the feature-masking CNN of FIG. 26, the results creating flexible bounding boxes that can explicitly surround anomalies, (a) anomalies explicitly detected and localized on a heat-map representation of time-series data; and (b) the masking CNN applied on a Fourier transformed representation of data.
Figure 27A:
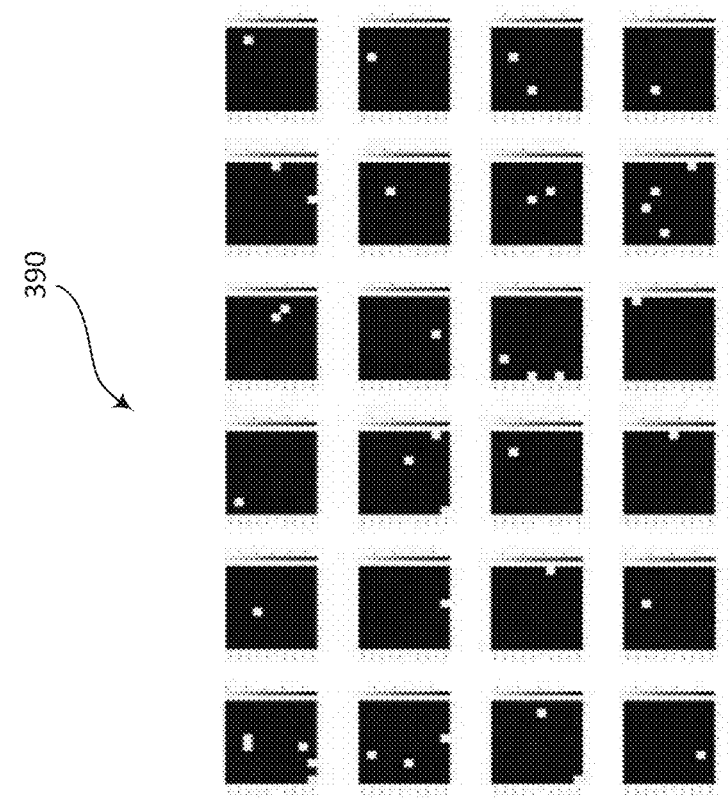

FIGS. 27A-B are graphs illustrating the results of the feature-masking CNN architecture 370 of FIG. 26. Flexible bounds or boundaries can be created that can explicitly surround anomalies. Graph (a) shows anomalies explicitly detected and localized on a heat-map representation 390 of time-series data, and graph (b) shows the results of the masking CNN 370 applied on a Fourier transformed representation of data 392. The anomalies are detected as horizontal bounds.

Experiment and Analysis (Deep Learning)

Table 4 below shows the results of comparing all neural network-based algorithms. Feature masking CNN on the heat-map representation of data has the highest performance of detecting anomalies.

TABLE 4

Comparison of Neural Networks based techniques in detecting anomalies.

| Algorithm | Performance AUC (max) | Optimization Time | Hardware |
|---|---|---|---|
| MLP | 82.72% | 8620 sec | 40 * Xeon 2.5 GHz |
| 1D CNN | 93.09% | 50 sec | GTX 970M |
| 2D CNN | 63.89% | 123 sec | GTX 970M |
| 2D CNN (Fourier) | 73.04% | 97 sec | GTX 970M |
| Masking CNN | 95.89% | 343 sec | GTX 970M |
| Masking CNN (Fourier) | 95.09% | 298 sec | GTX 970M |

Figure 28B:
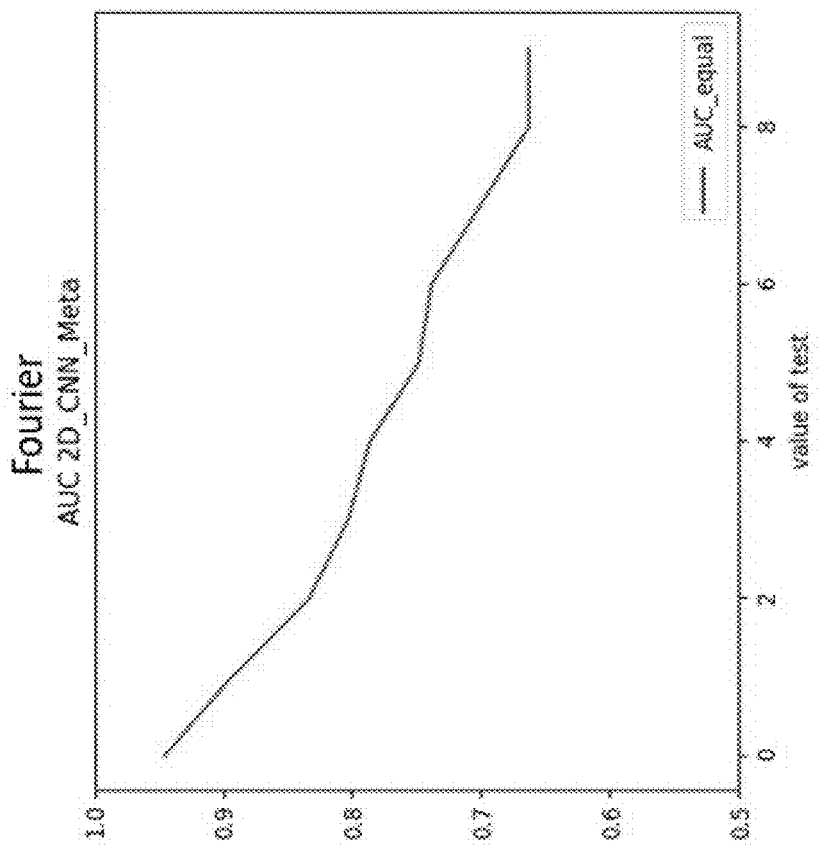
FIGS. 28A-B are graphs illustrating (a) performance of two dimensional CNN in detecting anomalies of heat-map representation of time-series data and (b) performance of 2D CNN in detecting anomalies of Fourier transformed time-series data.
Figure 28A:
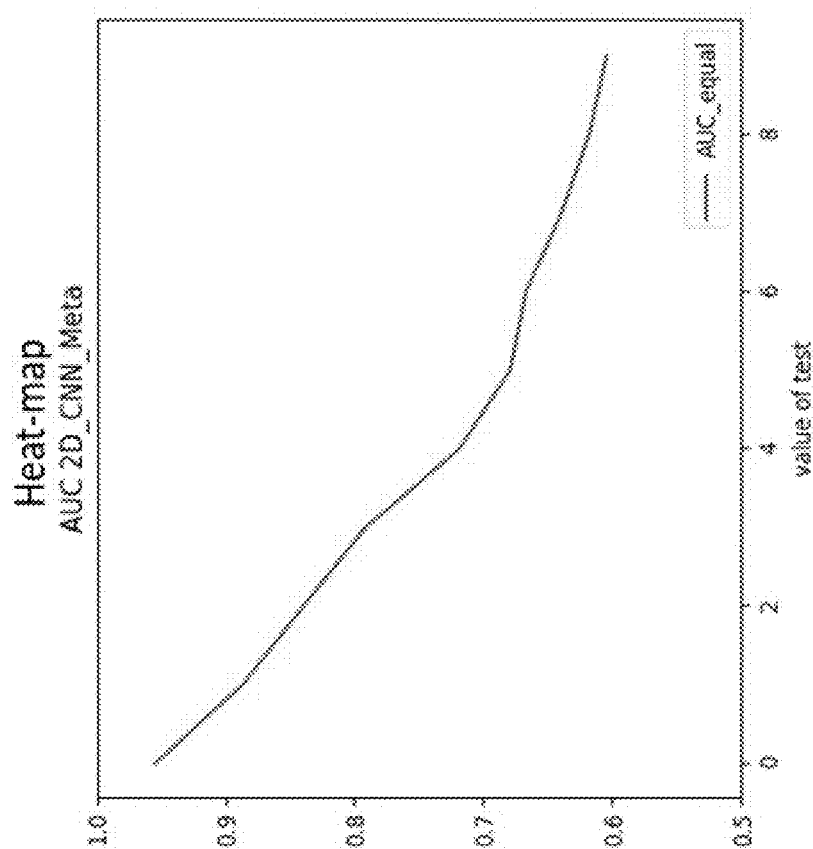

FIGS. 28A-B are graphs illustrating (a) performance of a two-dimensional CNN for detecting anomalies of in a heat-map representation of time-series data and (b) performance of the two-dimensional CNN for detecting anomalies using Fourier transformed time-series data.

Figure 29:
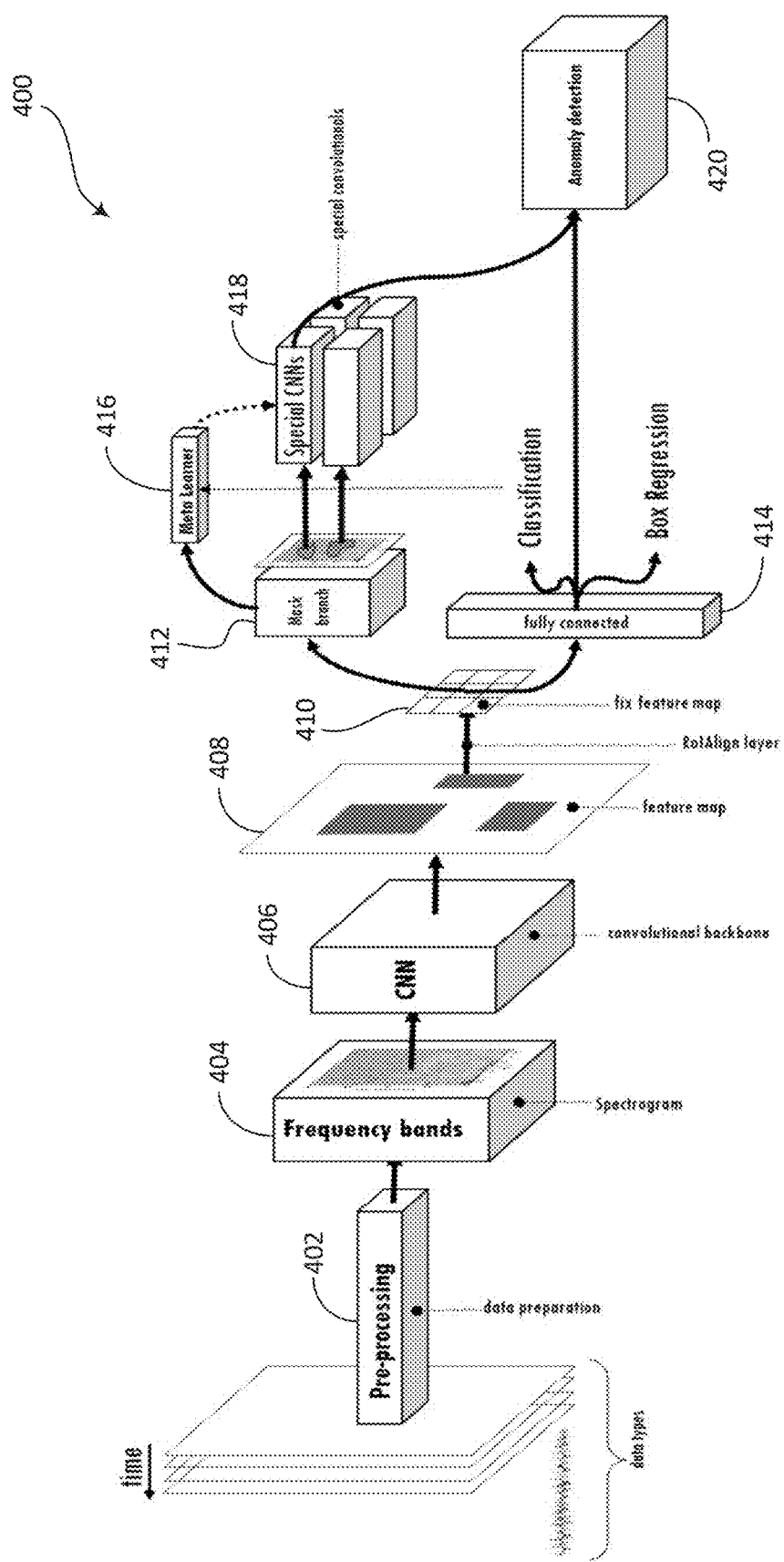
FIG. 29 is a block diagram of another two-dimensional architecture using a Special-Masked CNN (SMCNN), according to various embodiments of the present disclosure.

FIG. 29 is a block diagram of yet another two-dimensional CNN architecture 400, using a special masking technique. The architecture 400 of FIG. 29 may be referred to as a Special-Mask CNN or SMCNN. The pre-processing block 402 transfers the time-series data in raw format from one or several sensors to a two-dimensional representation. The frequency-bands block 404 may be used for applying a Fourier Transform. A two-dimensional CNN block 406 learns the normal and anomalous data. A feature map 408 is created with rectangular bounding boxes that surrounds the anomalies. The rectangular bounds may be reshaped to fixed squares within a fix feature map 410. A masking block module 412 creates flexible boundaries that may explicitly surround the anomalies. A fully connected block 414 provides classification and box regression. A meta learner 416 receives input from the masking branch module 412 and classification from the fully connected block 414 and provides models to one or more special CNNs 418, which may include special convolutions. Output from the special CNNs 418 and fully connected block 414 are provided to an anomaly detection block 420, which may be configured to adjustably define the normal/anomaly threshold of classification.

Figure 30:
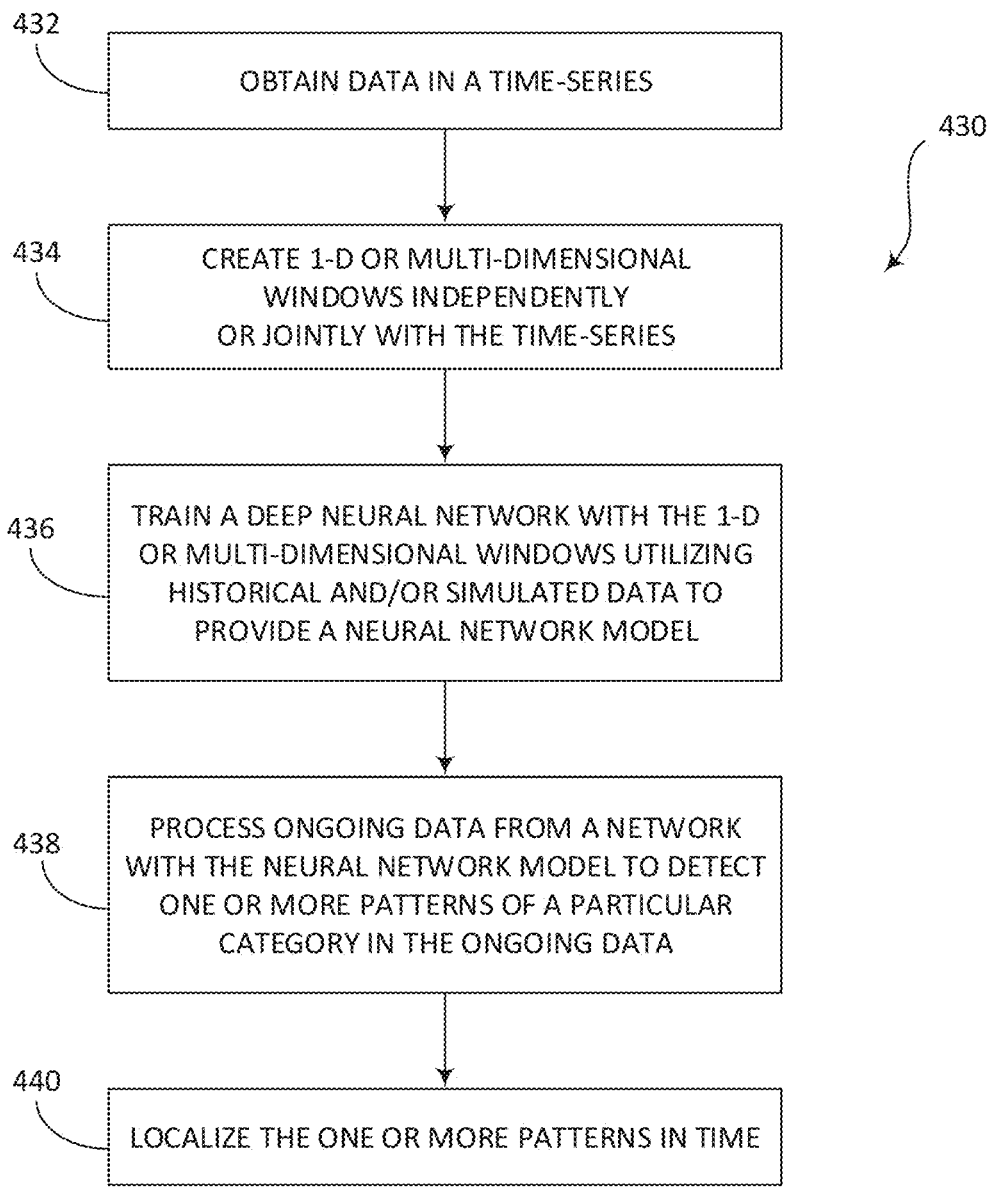
FIG. 30 is a flow diagram of a method for detecting patterns in time-series data.

FIG. 30 is a flow diagram illustrating an embodiment of a method 430 for detecting patterns in data. The method 430 includes obtaining data in a time-series, as indicated in block 432. From the time-series data, the method 430 includes creating one-dimensional or multi-dimensional windows, as indicated in block 434, wherein the one-dimensional or multi-dimensional windows are created either independently or jointly with the time-series. The method 430 further includes the step (block 436) of training a Deep Neural Network with the one-dimensional or multi-dimensional windows utilizing historical and/or simulated data to provide a neural network model. Ongoing data from a network is processed with the neural network model (block 438) to detect one or more patterns of a particular category in the ongoing data. The method 430 also includes localizing the one or more patterns in time, as indicated in block 440.

Figure 31:
FIG. 31 is a table showing results of various algorithms for detecting patterns in time-series data.

FIG. 31 is a table 450 showing the test results of utilizing various algorithms described in the present disclosure. For example, different algorithms were used to detect patterns in a given set of training data to measure the results of each algorithm. The tested algorithms include Multi-Layer Percetron (MLP), Long Short-Term Memory (LSTM), one-dimensional (1D) CNN, two-dimensional (2D) CNN using a heat-map, 2D CNN using Fourier transforms, Special-masked CNN (SMCNN) using a heat-map, and SMCNN using Fourier transforms. The SMCNN using the heat-map, which may correspond to the algorithm depicted with respect to FIG. 26, provided the best results in the test. For example, SMCNN (heat-map) tested with a maximum Area Under the Curve (AUC) performance of 95.89%. A "time" column, representing a time to train and optimize parameters, is provided in the table 450. The segmentation is the pattern localization in time. The SMCNN algorithm may perform segmentation without any data processing. The strengths and vulnerabilities of each of the algorithms are also depicted in the table 450.

Server

Figure 32:
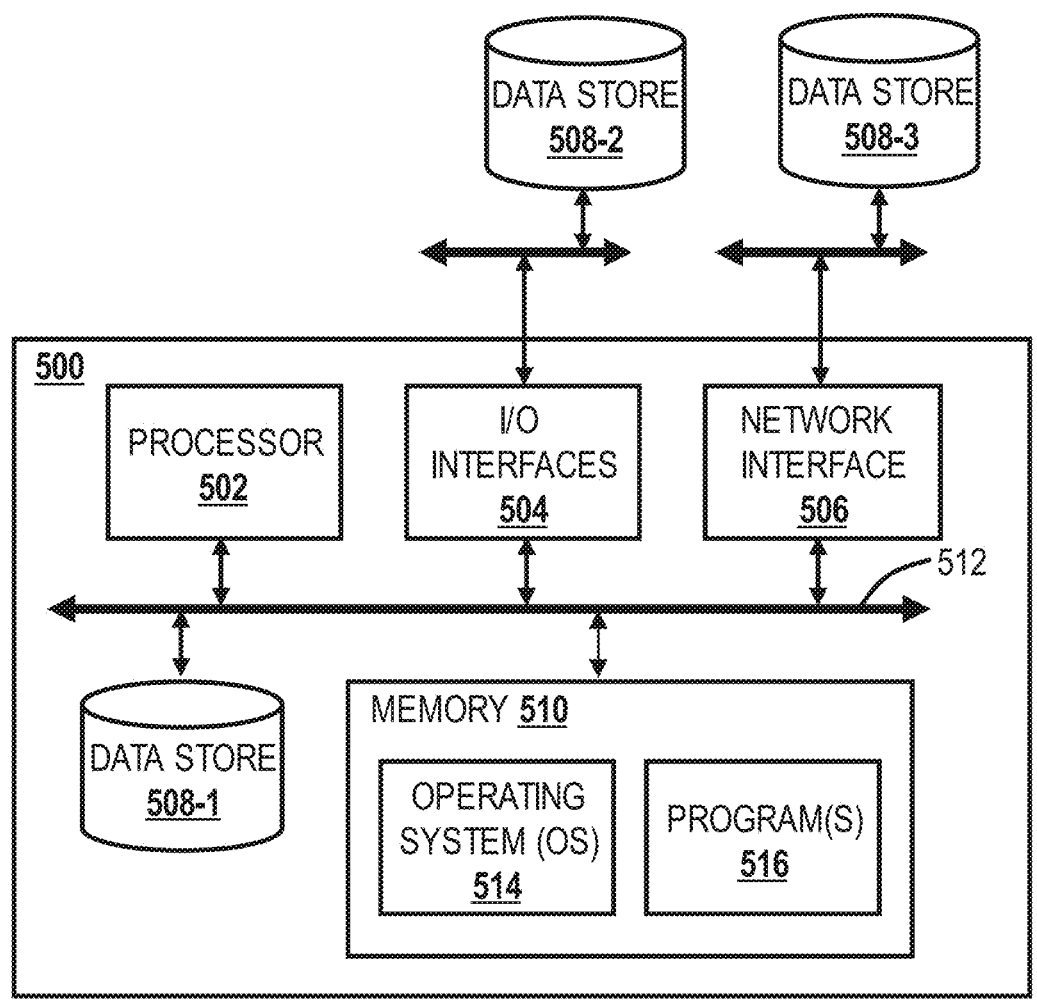
FIG. 32 is a block diagram of a server which may be used to implement the systems and methods described herein.

FIG. 32 is a block diagram of a server 500 which may be used to implement the systems and methods described herein. The server 500 can implement the various processes associated with the systems and methods described herein. The server 500 may be a digital computer that, in terms of hardware architecture, generally includes a processor 502, input/output (I/O) interfaces 504, a network interface 506, a data store 508-1, and memory 510. It should be appreciated by those of ordinary skill in the art that FIG. 32 depicts the server 500 in an oversimplified manner, and practical embodiments may include additional components and suitably configured processing logic to support known or conventional operating features that are not described in detail herein. The components (502, 504, 506, 508, and 510) are communicatively coupled via a local interface 512. The local interface 512 may be, for example, but not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chip set), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate over a network, such as the Internet, a wide area network (WAN), a local area network (LAN), and the like, etc. The network interface 506 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 506 may include address, control, and/or data connections to enable appropriate communications on the network. A data store 508-3 may be used to store data. The data store 508-3 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508-3 may incorporate electronic, magnetic, optical, and/or other types of storage media. In one example, the data store 508-1 may be located internal to the server 500 such as, for example, an internal hard drive connected to the local interface 512 in the server 500. Additionally, in another embodiment, a data store 508-2 may be located external to the server 500 such as, for example, an external hard drive connected to the I/O interfaces 504 (e.g., SCSI or USB connection). In a further embodiment, the data store 508-3 may be connected to the server 500 through a network, such as, for example, a network attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Outlier Detection in Network Data

The present disclosure is further directed to embodiments for utilizing machine learning processes to detect outliers or network anomalies in network time-series data, particularly machine learning processes that are executed in an unsupervised manner. One of the current problems that exists with many types of Machine Learning (ML) systems is an issue referred to as labelling. In a supervised ML scenario, labels will be provided to the data to train the machines or machine-like models, particularly for training to detect certain patterns in a time-series. Since a supervised system requires human interaction to add the labels, the present disclosure describes systems and methods that remove the requirement to have the labels added manually, but instead relies on the software itself to detect patterns without human intervention.

One way that this can be done is by creating images from time-series data, as described above, and then passing the image data to a Generalized Adversarial Network (GAN), which is a Deep Neural Network that enables learning of a distribution of the data from the time-series. The approach of the present embodiments is therefore a distribution modelling approach. However, since this approach uses GANs, a model of the distribution is not assumed. The GAN learns the distribution from training samples. Also, the approach includes a windowing technique required for the GAN to work as well as the concept drift mitigation techniques to handle changes in network data.

The present disclosure addresses several problems that exist in previous solutions for outlier detection in network time-series. For instance, an unsupervised approach can be used, which is an improvement over existing supervised methods where a network expert is required to label data sets by going through network traces and network logs and then labelling the times when the outliers have occurred. Supervised methods are manually intensive and are typically something that many people try to avoid. For example, if a traffic distribution changes, a person in the supervised methodology will need to relabel the data and retrain it, which can be a manually intensive process. Unsupervised methods, as relied on in the following embodiments, do not require training action by a human, but are able to train the models without human intervention.

The unsupervised methods described in the present disclosure also provide an improvement over existing unsupervised methods, which have low outlier detection performance due to their low capacity. For example, KDE is an example of unsupervised detection. However, since KDE assumes that the underlying network data is Gaussian in nature, its capacity to generalize is limited by this assumption, which is not true in practice. Other unsupervised methods are also susceptible to decreased performance during periods of concept drift when the network data is changing.

The present systems and methods for detecting outlying network data in an unsupervised manner provide additional improvements over conventional systems and methods. The detection of the outlying data, as described herein, can be based on a Deep Neural Network (DNN) approach, which may have a performance comparable to supervised methods for detecting outliers. In addition, the present disclosure provides methods for enabling unsupervised outlier detection in changing network data, which allows the unsupervised methods described herein to work in real-life network scenarios.

Outliers in network data correspond to unanticipated network events, detection of which may assist the network operator with root cause analysis of their network problems. Detection of network outlier data may be useful for many reasons, as described below.

One example of the usefulness of outlier detection is as follows: Consider a sudden dip in the Signal-to-Interference-plus-Noise Ratio (SINR), which may have been caused by a lightning strike. A lightning strike may cause a temporary increase in Bit Error Rate (BER), which may seem like a drop in SINR at the receiver. A root cause analysis system may use a network inventory system working in conjunction with an SINR monitoring system detecting dips (outliers in SINR measurements) to correlate the existence of the dip with the loss of connectivity in an upper layer, thus giving the network operator the real reason for the loss of connectivity in the upper layer.

Also, consider a sudden increase in network bandwidth usage, which could have been caused by a Distributed Denial of Service (DDoS) attack. The DDoS attack may present itself as a decreased level of service on, for example, a website and may be difficult to detect and diagnose. For instance, since there may not be a single user of the service who notices the degradation, the absence of any reporting may be an issue. A monitoring system may be provisioned to measure a level of traffic from a certain region of the world (e.g. Russia), or of a specific type (e.g., Domain Name System, or DNS), and would trigger a notification if the level of traffic from the region suddenly increases, or its characteristics change (a statistical outlier). This trigger would then activate analysis of the traffic and potentially detect that all of the increase in traffic is going to a specific destination in the network. The analysis identifies the service under the attack and also gives the root cause of its performance degradation and a way to improve it (e.g., by rate limiting the suspicious traffic).

Another problem that can be solved by the systems and methods of the present disclosure is the issue of changes to the distribution of time-series data over time. The changes in the distribution of time-series data can be detected. For instance, according to some embodiments, two windows covering different lengths of time (e.g., a one-hour window, a one-day window, etc.) can be used to encompass the time-series data. The data in each window can be processed and then provided to a Deep Neural Network, such as the GAN. A difference in the windows (e.g., obtained by subtraction) can be calculated to handle the changes in the distribution. If the probability detected in each window changes rapidly, this can be an indication of a data distribution change.

The systems and methods for detecting network data outliers, as described in the present disclosure, overcomes many of the shortcomings of previous known methods. For example, the present embodiments use processes that are unsupervised and therefore have a cost benefit compared to existing supervised solutions. Also, the embodiments of the present disclosure may use a high capacity Deep Neural Network (DNN) to learn the distribution of the network data without assuming the model of the distribution and may have a performance comparable to supervised learning. Furthermore, the present embodiments may include concept drift mitigation techniques, such as drift removal and detection.

The embodiments of the present disclosure show that for the specific use case of outlier detection, unsupervised learning has performance similar to the performance of supervised learning. This means that the cost of training models may go down as the labeling of data by hand would not be necessary. Labelling of data by hand by an expert can be very costly as it typically also requires a highly paid expert to do it.

The pattern detection methods described above with respect to FIGS. 1-32 may use a supervised pattern detection approach, which could be used to detect known anomalies in network data. The pattern detection approaches described above may use a CNN-based network (e.g., masked R-CNN network) and can obtain an outlier detection accuracy or True Positive Rate (TPR) of about 95%. With respect to the unsupervised approach described with respect to FIGS. 33-41, the present outlier detection techniques may use a Generalized Adversarial Network (GAN) to obtain a TPR of about 92%. The advantage of the unsupervised approach is that it does not require a network expert to label the patterns in the network data, which are associated with network anomalies. Also, the unsupervised approach can be used to detect previously unknown patterns.

Regarding the accuracy or TPR, a value may be calculated to refer to an Area Under the Curve (AUC). The relationship between AUC and True Positive Rate/False Positive Rate (TPR/FPR), which may be used for defining the quality of the results in the present disclosure, may be determined by FPR=TPR+1−2*AUC. For an AUC of 0.92, the FPR is at most 16%. In the experiments performed on the systems described in the present disclosure, the TPR was found to be in the 92-94% range, making the FPR at most 8%. Further tuning may be performed on the present system, which may likely improve the performance. Regarding drift and windows, it may be possible to make my two windows that are significantly different in size. However, there may be situations in which the difference in size will not be big enough to deal with the drift.

The unsupervised techniques may be incorporated into a suitable product (e.g., a part of a BP Analytics product). A version of a Network Health Predictor (NHP) product may use Kernel Density Estimation (KDE) for outlier detection. In comparison, the approach described in the present disclosure may be found to work better than NHP and may therefore be a good alternative. Since the embodiments of unsupervised learning may be used to provide results similar to supervised learning, the cost of producing models may be greatly decreased and would make the present approaches attractive to network operators.

Unsupervised Outlier Detection

The methods presented in the present disclosure are based on learning the statistical distribution of the underlying network data and using it to determine the probability that never-before-seen network data is from the same distribution, or a rare occurrence in that distribution. The method may be done in two phases. For example, the first phase may include a training phase in which the distribution of the network data is learned by a GAN. The second phase may include a detection phase in which some parts of the trained GAN are used to determine the probability that currently observed network data belongs to the historically observed network data. If the probability of observing a network sample is very low, it is flagged as an outlier.

The following description discusses how the distribution of network data may be related to outliers in the network data. An n-dimensional vector of network data may be denoted with the character "x" and the set of "normal" network data may be denoted with the character "D." The definition of normal data may depend on how the network is operated. For example, all network data could be defined as normal, or network data could be defined to be normal if it is collected while the network does not have any "serious" alarms. Normal data may be defined as data obtained while the network is running in a lab under perfect conditions. Also, normal network data may be data obtained while the network is not under any security attacks. An outlier may be defined as x in D with a small probability $P[x, x \in D] \le \varepsilon_o$ for a small $\varepsilon_o$, where this probability is expressed as:

$$P[x, x \in D] = P[x | x \in D] P[x \in D].$$

A different probability of importance is that of observing any x in normal and abnormal network data and may be expressed as:

$$P[x] = P[x | x \in D] P[x \in D] + P[x | x \notin D] P[x \in D].$$

We can define a sample x of network data as novel if $P[x | x \notin D] P[x \notin D] \le \varepsilon_n$ for a small constant $\varepsilon_n$.

If the distributions of $P[x|x \in D]$ and $P[x \in D]$ are known, checking if a network data sample is an outlier is the same as checking if $P[x, x \in D] > \varepsilon_o$.

Distribution Learning with Generalized Adversarial Networks (GANs)

Figure 33:
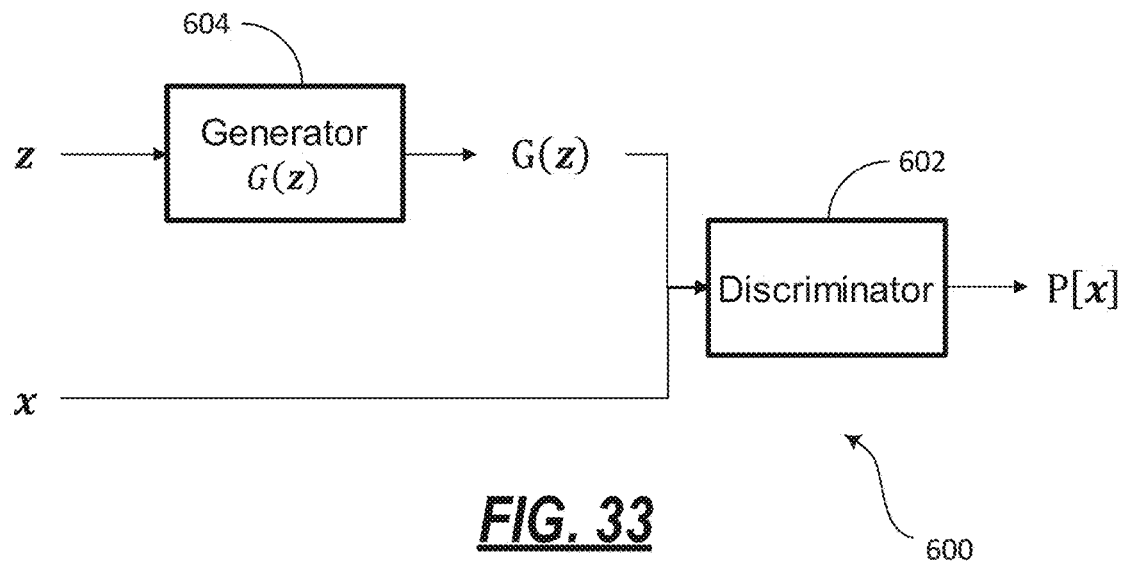
FIG. 33 is a block diagram illustrating an embodiment of a basic network architecture of a Generalized Adversarial Network (GAN)

FIG. 33 is a block diagram illustrating an embodiment of a basic network architecture 600 of a GAN. The GAN network architecture 600 in this embodiment may have two major components, including a discriminator sub-network 602 and a generator sub-network 604. During training, the GAN 600 internally generates z, an n-dimensional vector of random data points from a known distribution. The vector z is an input to the generator component 604, which generates G(z) at its output. The inputs to the discriminator 602 are the network data x (which may be labelled as "real") and the generated data G(z) (which may be labelled as "generated"). The generator 604 and the discriminator 602 may be trained jointly, so that at the end of training the discriminator 602 may have a low false positive rate for "generated" samples.

Figure 34:
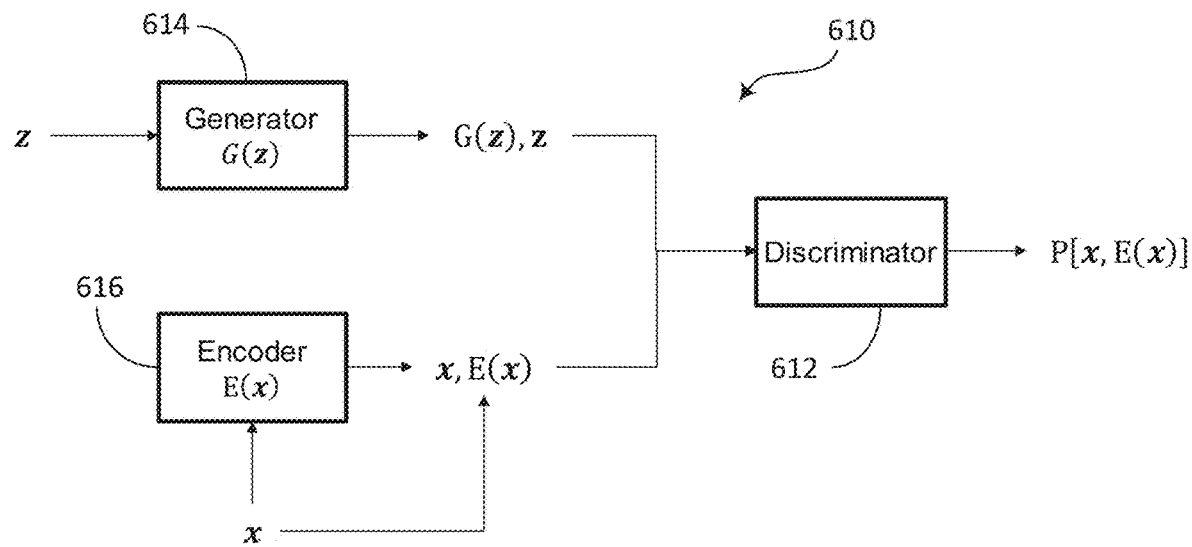
FIG. 34 is a block diagram of an embodiment of a network architecture of a bidirectional GAN (BiGAN)

FIG. 34 is a block diagram of an embodiment of a network architecture 610 of a bidirectional GAN (BiGAN). In this embodiment, the BiGAN network architecture 610 may have three major components, such as a discriminator network 612, a generator network 614, and an encoder network 616. The generator and discriminator networks 614, 612 work the same as in the GAN architecture 600 of FIG. 33. During the joint training of the three networks 612, 614, 616, the encoder 616 is trained to reverse the generator 614 by mapping network samples x to z.

A useful way to think of the GAN architectures is in terms of the "inverse transform sampling." If the distribution of x is F_X (x), the distribution of z is F_Z (z), and the distribution of G(z) is F_G (G(z)), then F_G (G(z)) may be expressed as F_X (x). If the distribution of E(x) is F_E (E(x)), then F_E (E(x))≈F_Z(z). Thus, a trained GAN discriminator (e.g., discriminator 602) may be used to determine the probability that a never-before-seen sample x has come from the same probability distribution as the training data, while a trained encoder (e.g., encoder 616) can be used to find the probability of observing x in the training data.

Outlier Detection with Trained GAN Architectures

Figure 35:
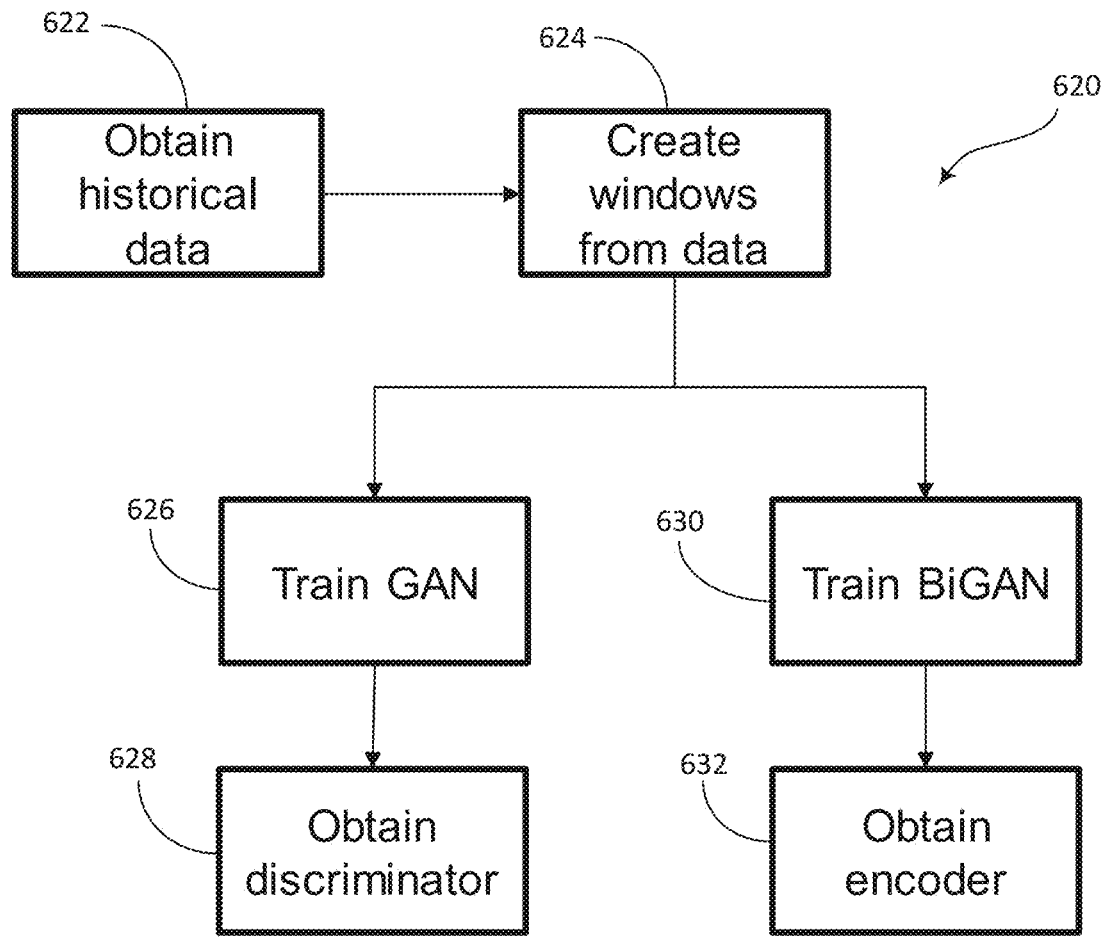
FIG. 35 is a flow diagram illustrating an embodiment of a first method for training with normal data and detection of outliers with GANs and BiGANs.

FIG. 35 is a flow diagram illustrating an embodiment of a first method 620 for training with normal data and detecting outliers with GANs and BiGANs. The method 620 includes a step of obtaining historical data (e.g., network time-series data), as indicated in block 622, and a step of creating windows from the historical data, as indicated in block 624. From this point, the method 620 branches off into training processes for GAN and BiGAN. For GAN, the method 620 includes training the GAN, as indicated in block 626. Then, the method 620 includes obtaining an output from a discriminator (e.g., discriminator 602), as indicated in block 628. In the BiGAN branch, the method 620 includes training the BiGAN, as indicated in block 630, and obtaining an output from an encoder (e.g., encoder 616), as indicated in block 632.

Figure 36:
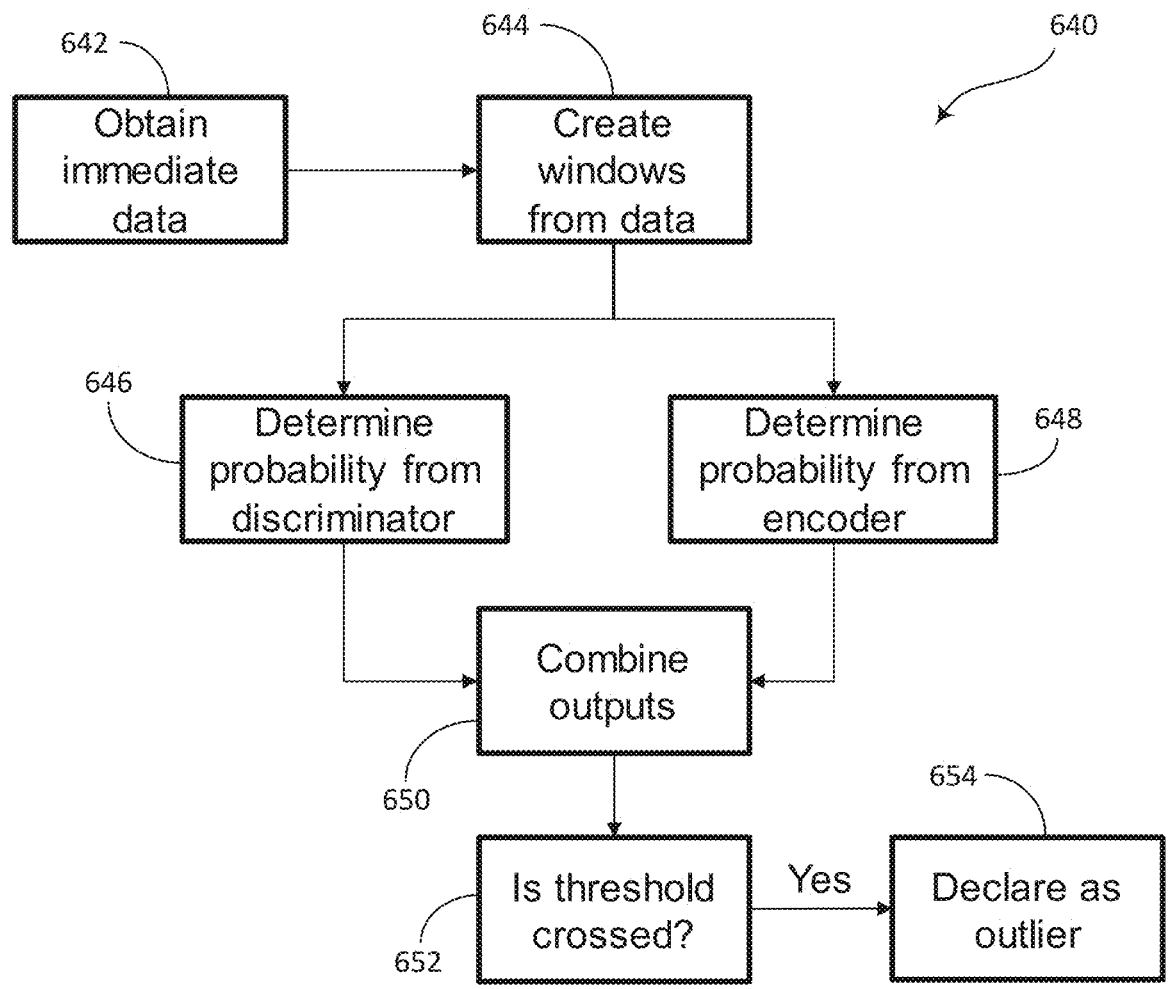
FIG. 36 is a flow diagram illustrating an embodiment of a second method for training with normal data and detection of outliers with GANs and BiGANs.

FIG. 36 is a flow diagram illustrating an embodiment of a second method 640 for training with normal data and detection of outliers with GANs and BiGANs. In this embodiment, the method 640 includes obtaining immediate data (e.g., network time-series data), as indicated in block 642, and creating windows from the immediate data, as indicated in block 644. The method 640 further includes parallel processes of determining a probability parameter from a discriminator (e.g., discriminator 602), as indicated in block 646, and determining a probability parameter from an encoder (e.g., encoder 616), as indicated in block 648.

Block 650 indicates that the method 640 includes the step of combining the outputs (e.g., probability parameters) from the steps corresponding to blocks 646, 648. The method 640 further includes a question block 652, which includes determining if the combined outputs cross a threshold established to define outliers. If it is determined that a threshold has been crossed, the method 640 includes declaring the outputs as outliers, as indicated in block 654.

Figure 37:
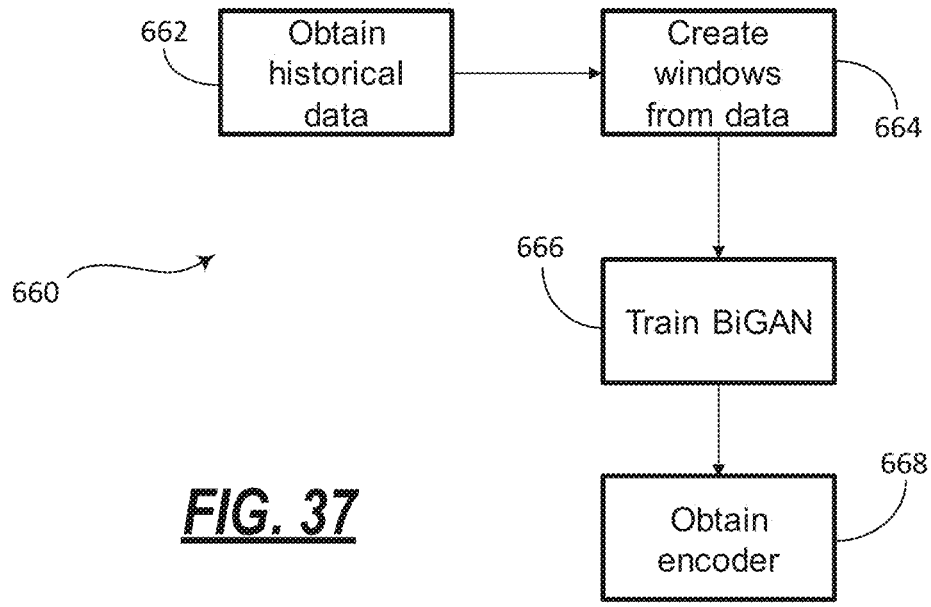
FIG. 37 illustrates a flow diagram of an embodiment of a method for training and outlier detection with a BiGAN.

FIG. 37 illustrates a flow diagram of an embodiment of another method 660 for training with all obtained data as well as detecting for outliers using BiGAN. The method 660 includes a step of obtaining historical data (e.g., time-series data), as indicated in block 662, and a step of creating windows from the obtained data, as indicated in block 664. The method 660 further includes training a BiGAN, as indicated in block 666, and a step of obtaining an output from an encoder, as indicated in block 668.

Figure 38:
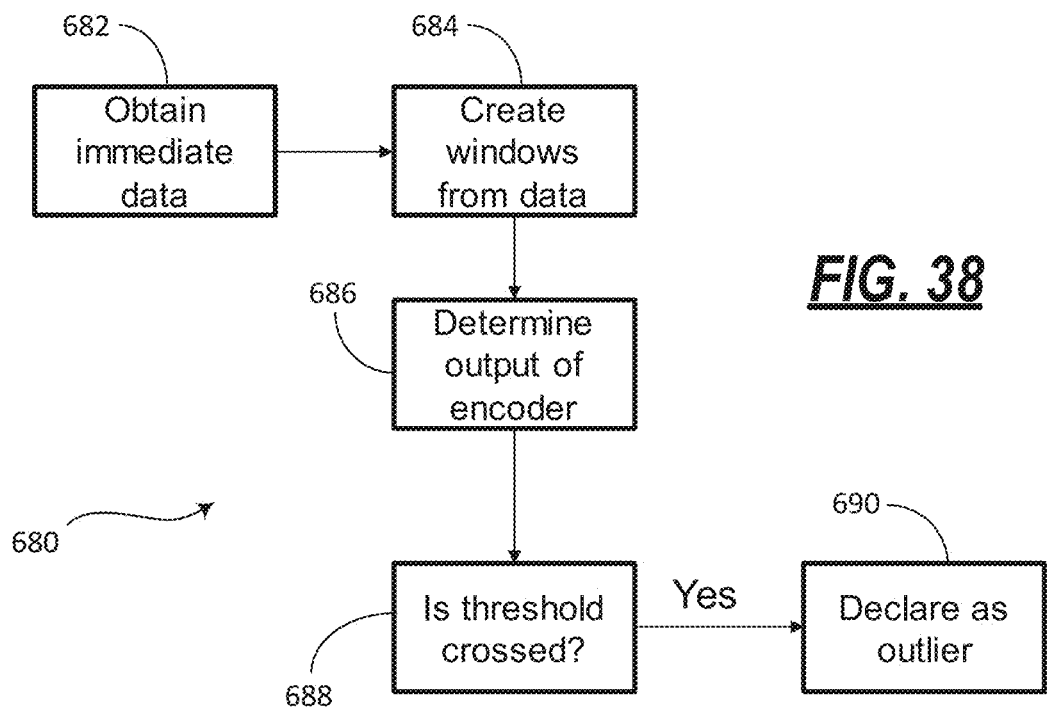
FIG. 38 is another method for training and outlier detection.

FIG. 38 is another method 680 for training and outlier detection. Method 680 includes obtaining immediate data, as indicated in block 682, and creating windows from the immediate data, as indicated in block 684. The method 680 further includes determining an output of the encoder, as indicated in block 686. Block 688 is a question block where the method 680 determines whether the output crosses a threshold separating normal data from outlier data. If it is determined that the encoder output crosses the threshold, the method 680 includes declaring the output as an outlier, as indicated in block 690.

Figure 39:
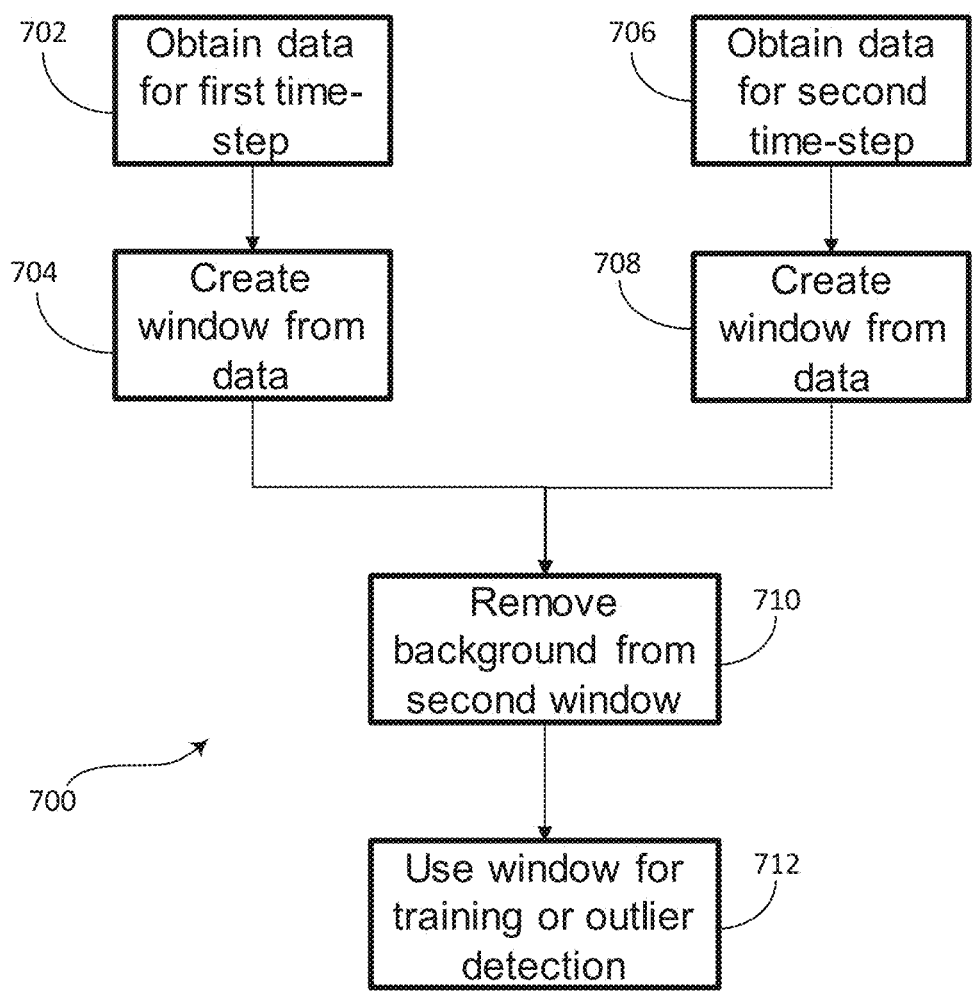
FIG. 39 is flow diagram illustrating an embodiment of a method for training and outlier detection, where the windows are made to be invariant in time.

FIG. 39 is flow diagram illustrating an embodiment of a method 700 for training and outlier detection, where the windows are made to be invariant in time. The method 700 includes two parallel paths. A first path includes obtaining data for a first time-step, as indicated in block 702, and creating a window from this obtained data, as indicated in block 704. A second path includes obtaining data for a second time-step, as indicated in block 706, and creating a window from the obtained data, as indicated in block 708. From these two parallel paths, the method 700 further includes the step of removing a background from the second window, as indicated in block 710, where the second window is created in block 708. The method 700 further includes using the resulting window for the purpose of training and/or for outlier detection, as indicated in block 712.

Figure 40:
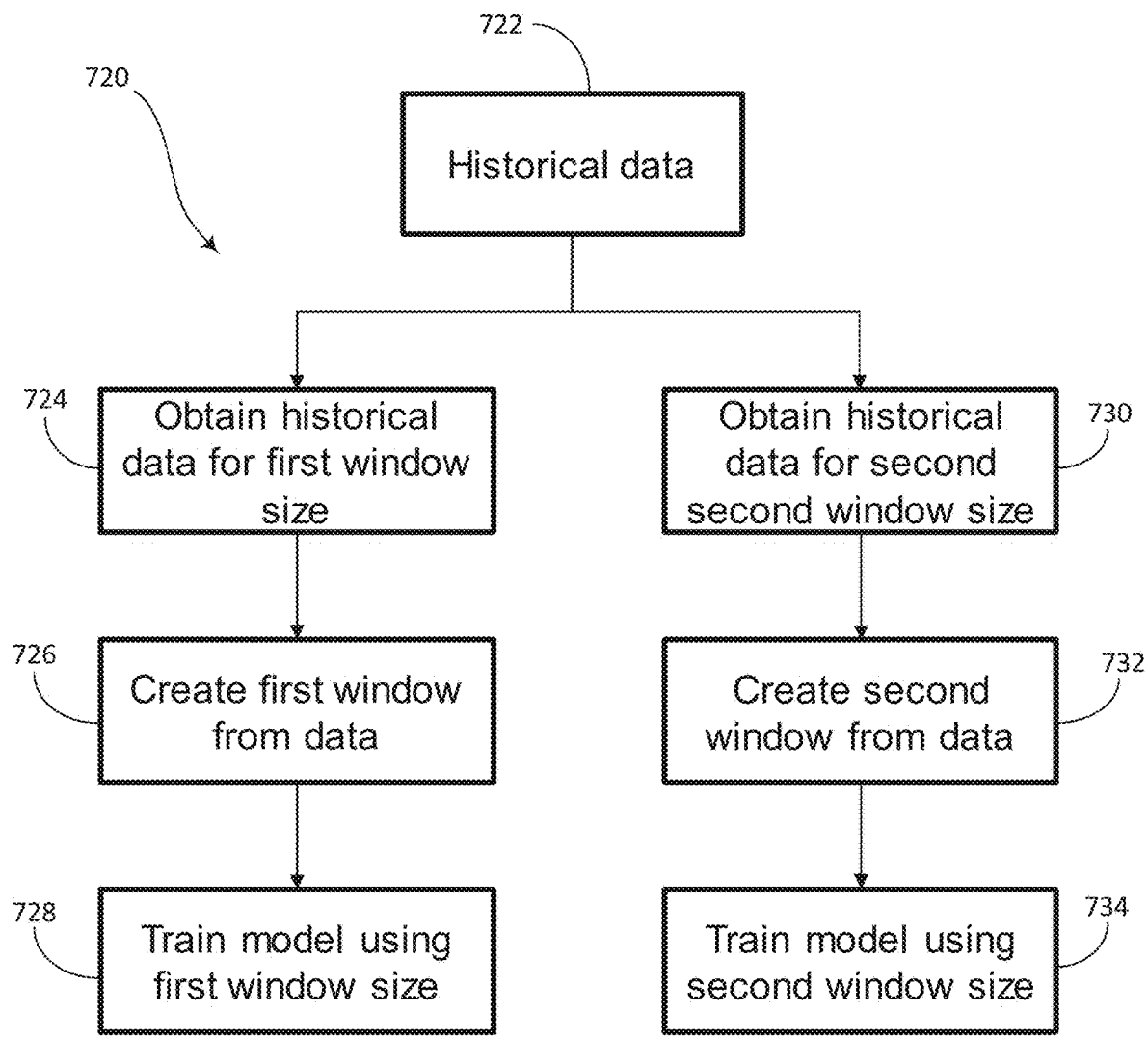
FIG. 40 is a flow diagram illustrating a first method for training and/or outlier detection, using two windows to detect concept drift.

FIG. 40 is a flow diagram illustrating a first method 720 for training and/or outlier detection, using two windows to detect concept drift. The method 720 includes a first step of obtaining historical data (e.g., time-series data), as indicated in block 722. As this point, the method 720 branches into two parallel paths. The first path includes obtaining historical data for a first window size (e.g., a first time period, such as a one-hour time period), as indicated in block 724, creating a first window from the historical data, as indicated in block 726, and training a model using the first window size, as indicated in block 728. Similarly, in the second path, the method includes obtaining historical data for a second window size (e.g., a second time period, such as a one-day time period), as indicated in block 730, creating a second window from the historical data, as indicated in block 732, and training a model using the second window size, as indicated in block 734.

Figure 41:
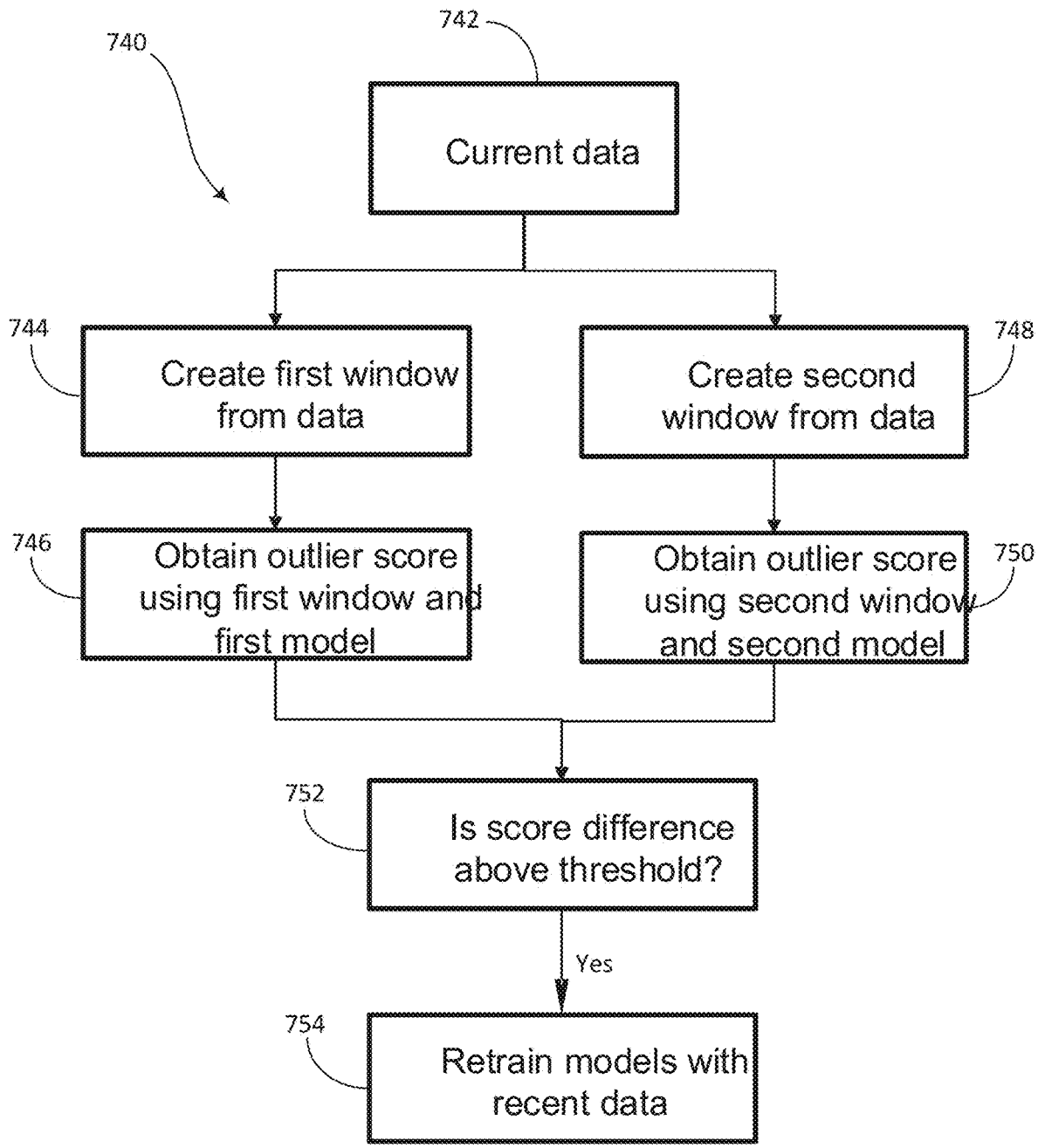
FIG. 41 is a flow diagram illustrating a second method for training and/or outlier detection, using two windows to detect concept drift.

FIG. 41 is a flow diagram illustrating a second method 740 for training and/or outlier detection, using two windows to detect concept drift. The method 740 includes the step of obtaining current data, as indicated in block 742. The method 740 then branches into two parallel paths. The first path includes the step of creating a first window from the current data, as indicated in block 744, and obtaining an outlier score using the first window and a first model, as indicated in block 746. The second path includes the step of creating a second window from the current data, as indicated in block 748, and obtaining an outlier score using the second window and a second model, as indicated in block 750. The method 740 further includes comparing the outlier scores from block 746 and block 750 and determining if the difference in outlier scores exceeds a threshold, as indicated in question block 752. If it is determined in question block 752 that the score difference is above the threshold, then the method 740 includes retraining the models with more recent data, as indicated in block 754.

Additional Use Cases

Although many of the examples described herein are related to detecting patterns in time-series data that is specifically obtained from a network, it should be noted that the systems and methods described herein are also applicable to any systems in which time-series data is obtained, not just network data. In this respect, the time-series data can be processed by converting the data into image data and then performing ML techniques (e.g., GAN) on the data. The time-series data may be obtained from periodic samples from electrical equipment, on a network, on traffic patterns, on system behavior patterns, or any other suitable type of data that can be obtained in a time-series format. By using ML, it is possible to detect anomalies occurring on the network that may be problematic, detect possible equipment failure, detect traffic surges, detect shift of traffic from one part of a network to another, and/or other various characteristics of a system. In some embodiments, the ML techniques may be used in an optical layer, packet layer, or other layers.

The ML processes described herein may include many use cases. For example, according to some embodiments, the present systems and methods may be used for forecasting alarms. If there is a pattern in a time-series that is likely going to trigger an alarm, the patterns can be detected as anomalies. Then, alarms can be predicted at a later time if the patterns reoccur.

Another use case includes forecasting a quality experience for a user. For example, by analyzing a buffer size, it may be possible to detect patterns. In a video streaming example where labelling was performed, a buffer of a certain size may be responsible for causing an outage of the video. By looking at the buffer alone without looking at the video, it can be determined if the buffer is out of place. If so, a forecast can be triggered to flag the buffer as potentially being problematic with regard to outages.

Yet another use case may include anomaly detection to determine if equipment is about to fail. If equipment operates in a predictable fashion during normal use, it can be determined if there are one or more times when the equipment performs differently. In this case, the equipment can be flagged and can be further analyzed at a specific part of the system of particular equipment within the system.

The outlier detection processes mentioned above may use trained GANs. The user of the outlier detector can train the GANs in two distinct modes. In a first mode, the operator may be configured to divide the historical network data into "normal" and "abnormal" samples. In a second mode, the operator may be configured to use the entire historical data set to train the GANs. Separating the normal data out of the historical network data may provide better performance of the above-described methods. Therefore, it may be advantageous for the user to automate this process, by, for example, categorizing various times of network operation as "normal" by the absence of signals that may make the data "abnormal" (e.g., critical alarms, intrusions, etc.).

After the GANs and BiGANs are trained, the discriminator (e.g., discriminator 602, 612) and the encoder (e.g., encoder 616) may be used to determine various probabilities of outliers. For example, the discriminator 602 of the GAN architecture 600 may be used to determine that a never-before-seen sample belongs to the distribution of the training samples. Thus, if the GAN is trained with "normal" network data, as defined by the operator, then the output of the GAN decoder $D(x)=P[x \in D]$. Regarding the BiGAN architecture 610, the encoder 616 of the BiGAN architecture 610 may be used to determine the probability that a given sample is in the training data distributions. Thus, if the BiGAN is trained with "normal" data, the output of the encoder 616 is $E(x)=P[x|x \in D]$. On the other hand, if the BiGAN is trained without the notion of "normal" data, the output of the encoder 616 is $E(x)=P[x] \approx P[x|x \in D]P[x \in D]$, for very small $P[x \notin D]$.

Using the output of the GAN discriminator 602 and the BiGAN encoder 616, the systems of the present disclosure are able to obtain probability $P[x|x \in D]$, $P[x \in D]$, and $P[x]$ of never-before-seen network data x. These probabilities are then used to determine if x is an outlier or not using a thresholding technique. The variable x may be declared an outlier if $P[x|x \in D] \, P[x \in D] > \varepsilon$ for a user defined $\varepsilon$.

Network Data Processing

The input to the outlier detector is appropriately processed network data. Network data may typically be collected as a time-series of real or categorial values. To create an input for a Deep Neural Network (DNN) having a fixed size, a window is passed over the data and the data in the window is processed to present it to the DNN. One way to process the data in the window is described above with respect to FIGS. 1-32. Alternatively, the windows may be passed to the outlier detector, as described with respect to FIGS. 33-41, where the data can be presented as unlabeled.

Mitigation of Changes in Network Data

Unlike supervised learning methods, which look for known patterns in changing data and are resilient to changes in network data distribution, unsupervised learning methods are susceptible to distribution changes in the network data, as they use the historical distribution to determine if a never-before-seen sample is an outlier. Changes in network data distribution are called "concept drift." Suppose, for example, that the outlier detector is trained on historical data in a time period [t, t+T]. This corresponds to a distribution $F\_X[t, t+T](x)$. If the network changes after time t+T, the network data x observed after training will be from the distribution $F\_X[t+T, t+T+\Delta](x)$, so a model trained with data obtained before time t+T would not work after that time.

Generally, there are two exemplary methods to improve the performance of the outlier detection system. The first method is by processing network samples in a way that makes them invariant to the changes in the network data distribution. This method can be used on the network data after windowing, similar to the "first difference" methods used on single variable time-series. The first method has been tested in experiments and has been found to be very effective.

The second method is to retrain the GANs after the concept drift has been detected. In this method, two window sizes are used and the outlier probability is calculated for each window size. The first outlier probability is determined for a small window size $P\_(W\_s)[x, x \in D]$ and the second is determined for a large window size $P\_(W\_L)[x, x \in D]$. A threshold may be used to determine if the retraining is necessary. For example, if $|P\_(W\_s)[x, x \in D] - P\_(W\_L)[x, x \in D]| > \varepsilon$, the systems may be configured to retrain the GANs with truncated historical data set.

The embodiments described in the present disclosure are different from previous solutions and contain various advantages over the prior art. For example, the present disclosure includes the simultaneous use of multiple unsupervised learning techniques and change management on network data. Also, the present disclosure may be directed to using BiGANs on network data for unsupervised outlier detection. Furthermore, the windowing technique described in the present disclosure has not been used on any type of unsupervised outlier detection system. Also, it has not been used for unsupervised outlier detection of time-series, including network time-series and has not been used specifically with the BiGAN network architecture.

In addition, the present embodiments include change detection methods of using two windows, which has not been used for unsupervised outlier detection in network time-series. The method of time-differencing based on our windowed time-series data has not been used on network time-series in the prior art systems.

In Machine Learning (ML), performance of a training algorithm can be measured using Area Under the Curve (AUC) and Receiver Operating Characteristics (ROC) curves. These parameters can be used for checking the classification of a model. The AUC/ROC curve is a performance measurement for classification problems at various thresholds, where ROC represents a probability curve and AUC represents the degree separability. This value indicates how well the AI model can distinguish between classes or forecast predictions. The closer the AUC value is to 1.0, the better the model is at predicting and distinguishing points above or below the curve.

In the present disclosure, the algorithm or AI model can be used in an unsupervised manner to make predictions. During experimentation, a synthetically-generated dataset was created to evaluate an algorithm resulting from the systems and methods described in the present disclosure. The results indicated a relatively high AUC/ROC value, indicating a good performing algorithm, particularly considering the fact that the generation of the algorithms were based on unsupervised methods. By considering AUC/ROC, it is possible to use a valid approach of supervised learning evaluation methods and compare the predictions of the unsupervised models obtained using the method described herein with the classic supervised model.

It may be possible to have two ROC curves on a single graph, which may provide a compelling argument in favor of the present approach. Given that AUC is similar, the two curves may be reasonably similar, demonstrating the benefit of using unsupervised learning and achieving performance comparable to more constraining supervised learning.

During experimentation, the False Positive Rate (FPR) of the unsupervised results were at most 8%, which is a high achievement for unsupervised learning. Although supervised learning may achieve better results, one problem with the supervised learning techniques is that there may be a large upstart cost of manually labeling data, which may also make the data unusable. Unsupervised learning approaches do not have this cost. Although unsupervised learning may introduce additional false positives, the results of the unsupervised learning described herein may not require a significant extra expense with respect to man-hours evaluating any issues with the FPR. The present disclosure therefore provides a good balance between initial accuracy and required human interaction.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium configured to store a program executable by a processing system, the program including instructions configured to cause the processing system to:
   obtain raw, heterogeneous time-series data from multiple components of a communication network to be monitored at the processing system,
   convert all of the raw, heterogeneous time-series data to a two-dimensional image format by constructing tensors from all of the raw, heterogeneous time-series data,
   create a multi-dimensional matrix comprising a plurality of image windows formed from the raw, heterogeneous time-series data using the processing system,
   detect or forecast at least one of a network threshold crossing, a network alarm, a network user quality-of-experience, or a network anomaly by detecting, utilizing a deep neural network, outliers of the raw, heterogeneous time-series data with respect to the multi-dimensional matrix using an unsupervised deep learning process on the two-dimensional image format of all of the raw, heterogeneous time-series data, the unsupervised deep learning process including training a first path utilizing a Generalized Adversarial Network (GAN) learning technique to obtain a discriminator from a trained GAN data and training a second path utilizing a Bidirectional GAN (BiGAN) learning technique to obtain an encoder from a trained BiGAN data and executed by the processing system to transfer knowledge of other experimented domains for imbalanced datasets anomaly detection by identifying portions of the raw, heterogeneous time-series data as normal by the absence of an indicator that the identified portions are abnormal such that a determined low probability that another portion of the raw, heterogeneous time-series data is within the normal portions of the raw, heterogeneous time-series data indicates an anomaly, wherein a first probability is determined from the discriminator, a second probability is determined from the encoder, and the detected outliers are determined based on a combination of the first probability and the second probability; and
   localize the detected or forecasted at least one of the network threshold crossing, the network alarm, the network user quality-of-experience, or the network anomaly within the raw, heterogeneous time-series data by localizing the detected outliers in the obtained, raw, heterogeneous time-series data by detecting at least one image window of the plurality of image windows containing the detected outliers.

2. The non-transitory computer-readable medium of claim 1, wherein detection of outliers includes a determination if the network threshold has been crossed.

3. The non-transitory computer-readable medium of claim 1, wherein the raw, heterogeneous time-series data is obtained for a first time-step and for a second time-step, and wherein the plurality of image windows are each created through creation of a first image window from the raw, heterogeneous time-series data for the first time-step and creation of a second image window from the raw, heterogeneous time-series data for the second time-step.

4. The non-transitory computer-readable medium of claim 3, wherein the instructions further cause the processing system to
   subtract a background from the second image window to remove changes in the raw, heterogeneous time-series data and to obtain a resulting image window, and
   use the resulting image window for training and outlier detection.

5. The non-transitory computer-readable medium of claim 1, wherein the plurality of image windows are each created by creation of a first image window covering a first time period and creation of a second image window covering a second time period, the first time period covering a shorter time than the second time period, and wherein the step of transferring knowledge of other experimented domains for imbalanced datasets anomaly detection includes the steps of training a first model using the first image window and training a second model using the second image window.

6. The non-transitory computer-readable medium of claim 5, wherein the instructions further cause the processing system to
   calculate a first outlier score using the first image window and the first model,
   calculate a second outlier score using the second image window and the second model,
   calculate a score difference between the first outlier score and the second outlier score, and
   if the score difference exceeds a predetermined threshold, retrain the first and second models with subsequent data.

7. The non-transitory computer-readable medium of claim 5, wherein the instructions further cause the processing system to
   create a first prediction using the first image window having the first time period,
   create a second prediction using the second image window having the second time period, and
   compare the first prediction with the second prediction to detect a changing distribution in the data.

8. A system for detecting outliers of network data, the system comprising:
   one or more processors; and
   a memory in communication with the one or more processors, the memory configured to store instructions for detecting outliers of network data,
   wherein the instructions, when executed, cause the one or more processors to
   obtain raw, heterogeneous time-series data from multiple components of a communication network to be monitored,
   convert all of the raw, heterogeneous time-series data to a two-dimensional image format by constructing tensors from all of the raw, heterogeneous time-series data,
   create a multi-dimensional matrix comprising a plurality of image windows from the obtained, raw, heterogeneous time-series data,
   detect or forecast at least one of a network threshold crossing, a network alarm, a network user quality-of-experience, or a network anomaly by detecting, utilizing a deep neural network, outliers of the obtained, raw, heterogeneous time-series data with respect to the multi-dimensional matrix using an unsupervised learning process on the two-dimensional image format of all of the raw, heterogeneous time-series data, the unsupervised deep learning process including training a first path utilizing a Generalized Adversarial Network (GAN) learning technique to obtain a discriminator from a trained GAN data and training a second path utilizing a Bidirectional GAN (BiGAN) learning technique to obtain an encoder from a trained BiGAN data, wherein the unsupervised learning process transfers knowledge of other experimented domains for imbalanced datasets anomaly detection by identifying portions of the raw, heterogeneous time-series data as normal by the absence of an indicator that the identified portions are abnormal such that a determined low probability that another portion of the raw, heterogeneous time-series data is within the normal portions of the raw, heterogeneous time-series data indicates an anomaly, wherein a first probability is determined from the discriminator, a second probability is determined from the encoder, and the detected outliers are determined based on a combination of the first probability and the second probability; and localize the detected or forecasted at least one of the network threshold crossing, the network alarm, the network user quality-of-experience, or the network anomaly within the raw, heterogeneous time-series data by localizing the detected outliers in the obtained, raw, heterogeneous time-series data by detecting at least one image window of the plurality of image windows containing the detected outliers.

9. The system of claim 8, wherein the instructions are further configured to cause the one or more processors to
obtain the raw, heterogeneous time-series data for a first time-step,
obtain the raw, heterogeneous time-series data for a second time-step,
create a first image window from the raw, heterogeneous time-series data for the first time-step,
create a second image window from the raw, heterogeneous time-series data for the second time-step,
subtract a background from the second image window to remove changes in the raw, heterogeneous time-series data and to obtain a resulting image window, and
utilize the resulting image window for training and outlier detection.

10. The system of claim 8, wherein the instructions are further configured to cause the one or more processors to
create a first image window for a first time-period size,
create a second image window for a second time-period size,
train a first model using the first image window, and
train a second model using the second image window.

11. The system of claim 10, wherein the instructions are further configured to cause the one or more processors to
calculate a first outlier score using the first image window and the first model,
calculate a second outlier score using the second image window and the second model,
calculate a score difference between the first outlier score and the second outlier score, and
if the score difference exceeds a predetermined threshold, retrain the first and second models with subsequent network time-series data.

12. The system of claim 10, wherein the instructions are further configured to cause the one or more processors to
create a first prediction using the first image window having the first time-period size,
create a second prediction using the second image window having the second time-period size, and
compare the first prediction with the second prediction to detect changing network distribution data.

13. A method comprising the steps of:
obtaining raw, heterogeneous time-series data from multiple components of a communication network to be monitored at a processing system;
converting all of the raw, heterogeneous time-series data to a two-dimensional image format by constructing tensors from all of the raw, heterogeneous time-series data;
creating a multi-dimensional matrix comprising a plurality of image windows formed from the raw, heterogeneous time-series data using the processing system;
detecting or forecasting at least one of a network threshold crossing, a network alarm, a network user quality-of-experience, or a network anomaly by detecting, utilizing a deep neural network, outliers of the raw, heterogeneous time-series data with respect to the multi-dimensional matrix using an unsupervised deep learning process on the two-dimensional image format of all of the raw, heterogeneous time-series data, the unsupervised deep learning process including training a first path utilizing a Generalized Adversarial Network (GAN) learning technique to obtain a discriminator from a trained GAN data and training a second path utilizing a Bidirectional GAN (BiGAN) learning technique to obtain an encoder from a trained BiGAN data and executed by the processing system to transfer knowledge of other experimented domains for imbalanced datasets anomaly detection by identifying portions of the raw, heterogeneous time-series data as normal by the absence of an indicator that the identified portions are abnormal such that a determined low probability that another portion of the raw, heterogeneous time-series data is within the normal portions of the raw, heterogeneous time-series data indicates an anomaly, wherein a first probability is determined from the discriminator, a second probability is determined from the encoder, and the detected outliers are determined based on a combination of the first probability and the second probability; and
localizing the detected or forecasted at least one of the network threshold crossing, the network alarm, the network user quality-of-experience, or the network anomaly within the raw, heterogeneous time-series data by localizing the detected outliers in the obtained, raw, heterogeneous time-series data by detecting at least one image window of the plurality of image windows containing the detected outliers.

* * * * *